(12) United States Patent
Hart et al.

(10) Patent No.: US 8,372,470 B2
(45) Date of Patent: Feb. 12, 2013

(54) APPARATUS AND METHODS FOR CONTROLLED GROWTH AND ASSEMBLY OF NANOSTRUCTURES

(75) Inventors: Anastasios John Hart, Somerville, MA (US); Alexander Henry Slocum, Bow, NH (US); Lucas Carolus van Laake, Eindhover (NL)

(73) Assignee: Massachusetts Institute of Technology, Cambridge, MA (US)

( * ) Notice: Subject to any disclaimer, the term of this patent is extended or adjusted under 35 U.S.C. 154(b) by 1206 days.

(21) Appl. No.: 11/586,310

(22) Filed: Oct. 25, 2006

(65) Prior Publication Data
US 2008/0187648 A1    Aug. 7, 2008

Related U.S. Application Data

(60) Provisional application No. 60/729,881, filed on Oct. 25, 2005.

(51) Int. Cl.
*D01F 9/12* (2006.01)
(52) U.S. Cl. .................. 427/8; 423/445 B; 977/842
(58) Field of Classification Search ........... 427/8, 249.1; 423/447.1–447.3, 445 B; 977/712, 742, 977/750, 752
See application file for complete search history.

(56) References Cited

U.S. PATENT DOCUMENTS

| | | | |
|---|---|---|---|
| 5,821,537 A | | 10/1998 | Ishihara et al. |
| 6,297,063 B1 * | | 10/2001 | Brown et al. .................. 438/2 |
| 6,673,392 B2 | | 1/2004 | Lee et al. |
| 7,718,223 B1 * | | 5/2010 | Delzeit et al. .............. 427/248.1 |
| 2004/0053440 A1 | | 3/2004 | Lai et al. |
| 2004/0265210 A1 | | 12/2004 | Shinohara et al. |
| 2005/0207965 A1 | | 9/2005 | Shimoyama et al. |

\* cited by examiner

*Primary Examiner* — William Phillip Fletcher, III
(74) *Attorney, Agent, or Firm* — Wolf, Greenfield & Sacks, P.C.

(57) ABSTRACT

A method and apparatus providing controlled growth and assembly of nanostructures is presented. A first substrate including at least one reaction site is provided. Energy is provided to the reaction site and a reaction species is introduced to the first substrate. A nanostructure is grown from the reaction site. The growth process of the nanostructure is controlled while continuously monitoring the properties of at least one of the nanostructure and the at least one reaction site, and by controlling process variables based on the monitored properties of the nanostructure and the at least one reaction site.

13 Claims, 50 Drawing Sheets

APPARATUS AND METHODS FOR CONTROLLED GROWTH AND ASSEMBLY OF NANOSTRUCTURES

CROSS REFERENCE TO RELATED APPLICATIONS

The present application claims the benefit of U.S. Provisional Patent Application No. 60/729,881, filed on Oct. 25, 2005, which is incorporated herein by reference in its entirety.

GOVERNMENT RIGHTS

This invention was made with government support under grant number DMI0521985 awarded by the National Science Foundation. The government has certain rights in this invention.

BACKGROUND

The process of synthesizing nanostructures such as Carbon Nanotubes (CNTs) by chemical vapor deposition (CVD), or more generally by a mechanism such as the Vapor-Liquid-Solid (VLS) mechanism is widely known in the field of materials science, involves growth of a rod or tube-like solid nanostructure from a catalyst or seed particle. The particle assists in the decomposition of reactive precursors, and under appropriate conditions the nanostructure grows from the particle. Rod or tube-like nanostructures have been grown by this method to have exceptional aspect ratios. While these nanostructures and the seed particles are commonly only nanometers (e.g., 1-100 nm) in diameter, reaction zones in traditional growth systems for nanomaterials, such as tube furnaces, are centimeters to meters in size. In these systems, the growth reactions are mediated in part by the flow rates, pressure, and temperature established at the macro-scales of the growth chambers, rather than the micro- and nano-scales of the growth processes. In addition, because the forces experienced by the nanostructures during growth are dominated by phenomena such as thermal vibration, free convection, or surface interactions, growth systems are not capable of efficiently directing the growth and assembly of individual nanostructures or groups of nanostructures into ordered macroscopic configurations, such as fibers with exceptional mechanical properties. Often, the only localized control of growth conditions is achieved by the location of the catalyst particles, which determine where growth initiates and where the growth reaction occurs. While recent developments have shown that these systems can produce bulk quantities of nanostructures, these systems fail to produce assemblies of nanostructures having properties approaching those of individual nanostructures. Furthermore, proposed methods of assembly by post-processing of bulk quantities of nanostructures, such as spinning solutions of carbon nanotubes into or directly assembling CNTs end-to-end into fibers or sheets by dry methods have only seen moderate success because the individual nanostructures are not sufficiently long, aligned, and connected for sufficient transmission of mechanical loads.

Since before the concentric-graphene-layer structure of carbon nanotubes (CNTs) was confirmed, the applications of CNT-based materials have been desired, yet production of materials containing a high weight fraction of CNTs, such as CNT fibers, has not been realized at large scales or at reasonable cost. CNTs have many times the normalized stiffness and strength of steel, are very flexible, and have outstanding electrical and thermal properties. To be commercially successful, CNT-based materials must replicate the properties of individual CNTs. Today, systems for bulk CNT growth often produce tangled nanotubes, bundles, and agglomerates in large reaction chambers.

Chemical vapor deposition (CVD) is the most successful method of producing CNTs, whereby CNTs precipitate from nanometer-scale metal particles in a hydrocarbon gas (e.g., methane, ethylene, acetylene, alcohol vapor) environment, because the metals (e.g., Fe, Ni, Co) catalyze decomposition of hydrocarbons at temperatures below those at which the hydrocarbons self-pyrolyze. CVD growth of CNTs typically occurs at up to 1300 degrees Celsius, when the catalytic reaction is energetically favorable. The nanotube diameter is roughly equal to the diameter of the catalyst particle.

The sciences of preparing and characterizing catalysts for CNT growth, and understanding the reaction mechanisms between the catalysts, support materials, and different chemicals used to grow CNTs, are wide areas within the CNT and nanomaterials research fields. The most common embodiment of CVD growth of CNTs involves placing a substrate such as a piece of a silicon wafer, coated with a nanostructured metal film which contains catalyst particles, inside a reaction chamber such as a tube furnace.

There are a variety of typical furnace configurations for CVD growth of CNTs, such as horizontal and vertical tube furnaces, and vacuum chambers. In a "floating" or "fluidized" catalyst system, catalyst particles are typically introduced in the gas phase, and CNTs grow from these suspended catalyst sites. Floating catalyst mixtures, for example using ferrocene dissolved in toluene or acetylene also produce dense films of well-aligned nanotubes on quartz (oxide) surfaces (e.g., the inside of a quartz tube) because the catalyst particles adhere to oxide. Delivery of the catalyst in the gas phase, rather than pre-patterning of metal the substrate, can significantly reduce the preparation time required for growing CNT films. Furthermore, because many more catalyst sites can be active in a gas volume than on a small substrate coated with a catalyst film, and because of continuous operation, floating catalyst methods are more attractive for synthesizing bulk quantities of CNTs. However, with the exception of carefully-designed thermal and plasma-enhanced methods for producing vertically-aligned CNT arrays and the direct dry spinning methods, these CVD techniques produce a majority of tangled CNTs which must be sorted and separated before being useful for applications in composite materials.

While CNT growth from floating catalytic sites is readily more scalable for bulk synthesis, growth from substrates offers greater control of the arrangement, density, and length of CNTs. Typically, growth of aligned CNTs on a substrate is achieved using an unsaturated hydrocarbon gas such as acetylene or ethylene and a predeposited catalyst film or by evaporating a solution of an organometallic catalyst precursor and a liquid hydrocarbon. Millimeter-scale architectures of aligned multi-wall CNTs (MWNTs) have been routinely achieved using floating catalyst precursors; however, these structures typically have lesser crystallinity and higher impurity content (e.g., metal catalyst periodically along the tube axis) than structures grown from pre-deposited catalyst films. Further, by adding an optimal amount of ferrocene to acetylene feedstock during growth, increased the terminal length of VA-MWNTs, grown from a Al/Fe/Mo catalyst film, from less than 0.5 mm to greater than 3 mm. This is attributed to ferrocene increasing the effectiveness of ethylene by promoting its dehydrogenation before reaching the catalyst site. Further study has shown that homogeneous gas phase reactions critically affect the CNT growth process in many systems, and that a minimum incidence rate of carbon-containing molecules is necessary for vertically aligned growth. Overall, the balance between the decomposition and diffusion rates of active carbon at the catalyst is a major determinant of the CNT growth rate, and of the duration of growth before the reaction terminates. Recently, atmospheric pressure synthesis of vertically aligned single-wall CNTs (SWNTs) was reported, where introduction of a controlled concentration of water vapor gives rapid growth of high-purity SWNT films to a thickness of up to 2.5 mm, possibly due to selective removal of catalyst-bound amorphous carbon by water. Since, plasma-enhanced CVD growth of VA-SWNT and VA-DWNT films has been achieved, without using an oxygen-containing additive.

Growth of continuous CNT strands having macroscopic lengths is perhaps the only way to replicate the fantastic mechanical properties of individual CNTs in large-scale materials. Fundamental obstacles must be overcome before bulk production processes give exceptionally stiff and strong CNT materials. These issues include interconnection, alignment, and dense packing of CNTs for effective load transfer, and incorporation of high CNT loadings in matrix materials. Concomitantly, rapid growth rates have been achieved from catalyst particles situated on substrates, where self-alignment of CNTs into ordered structures can be achieved by suitable choice of the CVD conditions. To our knowledge, the highest reported CVD growth rate of a SWNT is 0.61 mm/min., while growth of carbon nanofibers has been observed at 10's of mm/min., and CNT growth by arc discharge occurs at up to 100 m/s for very short times. Only a moderate increase in the growth rate and active duration of fixed substrate CVD growth processes is necessary to produce centimeter or meter long continuous CNT strands.

Studies involving rapid heating and thermal cycling have shown that temperature magnitude and its temporal variation can influence the progress of chemical reactions. For example, formation of single-wall carbon nanotubes occurred only under rapid heating of a supported catalyst powder. Although the effects of unsteady conditions have been widely studied for other parameters such as reactant composition, rapid thermal control cannot be studied using traditional reactors due to their large thermal mass. Many high-temperature gas-phase reactions such as chemical vapor deposition (CVD) processes utilize tube furnaces, where the reaction sample (e.g., a substrate coated with a catalyst) is sealed inside a ceramic (e.g., quartz) tube, and the reactant atmosphere flows through the tube. A laboratory-scale tube furnace which is externally controlled using resistively-heated coils is typically limited to a heating rate of $\sim 10\,\dgc/min$. Effects of rapid heating using tube furnaces have thus been studied by moving the sample or tube with respect to the heater coils or by injecting floating catalyst particles into the heated zone. Alternatively, electrically conductive substrates and/or particles can be directly heated inductively~or by using microwave radiation. However, continuous temperature control of the reaction surface is not routinely achieved by these methods. Further, in traditional CVD setups, the substrate temperature is not directly measured, and is rather assumed to be equal to the temperature measured by a thermocouple outside the tube.

Traditional CNT growth chambers are customarily inches to meters in size, dwarfing the size of their products by several orders of magnitude. Alternatively, microreactors confine reactions to micron-millimeter scales, where very precise kinetic and thermal control can be achieved. For example, a device with 256 parallel channels etched in silicon was used to establish a uniform pressure drop across a packed bed of catalyst beads, synthesized CdSe nanocrystals and nanorods in etched glass microchannel reactors, and demonstrated that the size of the nanostructures could be controlled by changing the temperature of the device, which was heated by a thin-film heater attached to the bottom of the reactor chip. Furthermore, micro-scale fluid flows can be used to align and subsequently pattern nanowires on a substrate, flowing a suspension of pre-grown semiconducting nanowires through microchannels. The degree of alignment of the nanowires is related to the flow rate of the liquid through the channels, and after alignment the channel template is removed and the nanowires are anchored to the surface. Thin-film elements in microreactors, such as platinum-titanium traces, have been used as local heaters and temperature sensors, eliminating the need for expensive and bulky furnace systems. The only CNT example here is localized CVD growth in a room-temperature hydrocarbon ambient by resistive heating of a catalyst-coated polysilicon microbridge.

Resistive heating has been used to reach the growth temperature, by passing current through an electrically conductive growth substrate. For example: a piece of carbon paper; a metallic wire, a silicon substrate; or a microfabricated silicon bridge. On all these examples including the silicon nanobridge, the temperature is constant during growth.

In situ monitoring of CNT growth process has been used to gain insight into the time evolution of CNT films and structures and growth sites, in relation to the reaction conditions; however this monitoring has not been used to directly control the growth process in a feedback scheme. Examples of in-situ monitoring include optical measurement of film thickness and optical properties, Raman spectroscopy, and characterization of the catalyst by photoelectron spectroscopy and X-ray diffraction.

SUMMARY

Conventional apparatuses for CVD synthesis such as those explained above suffer from a variety of deficiencies. One such shortcoming is that rapid control of reaction variables (e.g., temperature, gas composition, flow rate) is difficult in traditional growth system for nanomaterials, such as tube furnaces, due to their relatively large volume, and the coupling of flow, temperature, and reaction progress. A limiting result has been achieved by rapidly introducing the gas into a tube furnace, where rapid initial growth was shown when acetylene was rapidly introduced to start the reaction. Further, traditional growth systems for nanomaterials, such as tube furnaces, suffer long heat-up times on the order of one hour, due to high thermal mass. This high thermal mass prevents rapid control over the reaction temperature.

Embodiments of the invention significantly overcome such deficiencies and provide mechanisms and techniques that provide controlled growth and assembly of nanostructures, specifically long nanostructures, and more specifically long carbon nanotubes, using apparatus which mechanically confine the growth of groups of nanostructures. Simultaneous chemical and mechanical control of nanostructure growth processes is established, using real-time feedback to control the process variables (e.g., temperatures, forces, and flows) in rapid response to in situ measurements of the quality, composition, and structure of the products and substrate components during growth. Forces may be introduced to the nanostructures during the growth process, and these forces assist the growth and assembly of nanostructures into ordered configurations such as fibers. A wide variety of chemical species, catalyst and support materials, and operating conditions, in accordance with reaction processes known to those skilled in the art, can be introduced within these apparatus, to enable growth and assembly of a wide variety of nanomaterials and nanostructures.

A particular embodiment of a method of providing controlled growth and assembly of nanostructures the method includes providing a first substrate including at least one reaction site, and providing energy to the reaction site. The method further includes introducing a reaction species to the substrate and growing a nanostructure from the reaction site. Additionally, the method includes controlling the growth process of the nanostructure by continuously monitoring the properties of the nanostructure and the at least one reaction site, and by controlling process variables based on the monitored properties of the nanostructure and the at least one reaction site.

Another embodiment includes an apparatus for providing controlled growth and assembly of nanostructures. The apparatus includes a closed container; and a first substrate including at least one reaction site disposed within the closed container. The apparatus further includes a heating apparatus for heating the first substrate and/or reaction site, and at least one aperture in the closed container capable of use for introducing a reaction species to the first substrate, wherein a nanostructure is grown from the reaction site upon introduction of the reaction species to the reaction site. The growth process of the nanostructure is controlled by continuously monitoring the properties of the nanostructure and the at least one reaction site, and by controlling process variables based on the monitored properties of the nanostructure and the at least one reaction site.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1A:
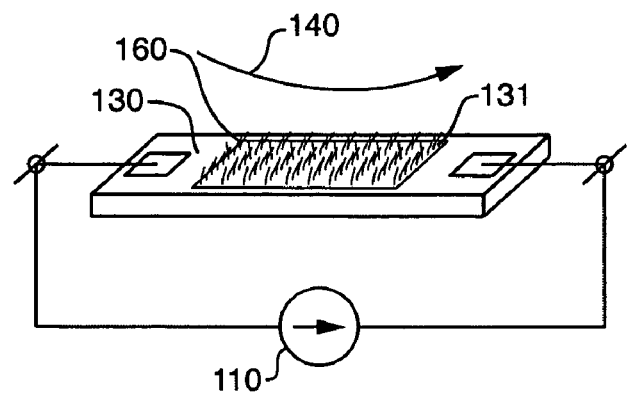
FIGS. 1A and 1B shows a substrate for growth of nanostructures, where a current is passed through the substrate so the substrate is heated resistively.

The present invention enables simultaneous chemical, electrical, thermal and mechanical control of nanostructure growth processes, using real-time feedback to control the process variables (temperatures, forces, and flows) in rapid response to in-situ measurements of the quality, composition, and structure of the products and substrate components during growth.

Chemical aspects of the growth process include but are not limited to the supply and composition of reactants needed for proper growth at any stage of the reaction or any stage of operation of an apparatus in accordance with the present invention; as well as the chemical state, morphology, etc. of growth sites (e.g. the catalyst); and interactions between growth sites and the substrate (e.g., catalyst-support interactions).

Control of mechanical aspects of the growth process focuses on maintaining appropriate forces on nanostructures (e.g., CNTs) and among nanostructures during the growth process, or at any stage of operation of an apparatus in accordance with the present invention. Forces acting on CNTs during growth include but are not limited to an extrusive force during growth, which pushes the CNT away from the growth site; surface (e.g., van der Waals) forces among CNTs or among CNTs and the substrate or other surfaces inside an apparatus in accordance with the present invention; any pulling, bending, or pushing forces which are externally exerted on the growing CNTs by aspects of an apparatus in accordance with the present invention; and any support forces which are externally exerted on the growing CNTs by aspects of an apparatus in accordance with the present invention.

Use of a conditioning catalyst, to catalytically pre-treat the reactants for CNT growth, by contacting the reactants with a first catalytic compound before contacting the reactants with the catalyst sites at which CNT growth occurs, is well-precedented in the literature. For example, placing a Mo compound in the flow path ahead of a Fe-based catalyst can increase the yield of single-walled or double-walled CNTs.

Further, while many substrate materials can be used for substrate-bound growth of nanostructures in accordance with the present invention, and growth sites can be deposited on each material by a variety of methods and in a variety of arrangements, silicon and conductive ceramics are preferred choices of substrate material. Silicon is proffered for the following reasons: its electrical properties can be readily controlled by doping; high mechanical strength, large-area (e.g., wafer) substrates are readily available with well-defined flatness and surface finish; versatility of fabrication of features such as structures, microchannels, holes, or pores, in or on silicon substrates by a variety of methods known to those skilled in the art, including dry or wet chemical etching and electrochemical etching; as discussed further elsewhere, the temperature dependence of its electrical resistivity gives a self-stabilizing effect when the silicon is heated resistively by passing a current through the substrate.

In the case of carbon nanotube growth, it is well established that a buffer or supporting layer may be introduced between the metal catalyst (e.g. Fe, Co, Ni) particles and the silicon substrate, to prevent interdiffusion of the catalyst and silicon at high temperature (e.g., above 650 degrees C.). This may be achieved by a variety of methods, such as deposition of a thin alumina layer, and the supporting layer can also increase the efficiency and performance of the catalyst for nanotube growth.

A substantial objective of the invention is to monitor and control the growth process to, for example in the growth of very long carbon nanotubes, prevent accumulation of amorphous carbon which leads to deactivation of the catalyst and otherwise maintain the growth site, and thereby enable continuous growth of carbon nanotubes. A further substantial objective is to apply forces to the nanostructures during growth, to favorably affect the growth reaction and to prevent unfavorable mechanical interactions between the nanostructures, and to direct the path of the nanostructures during growth. A further substantial objective of the invention is to decouple the nucleation process from the growth process by using time-varying operating conditions, such that a high density of growth sites can be activated initially, and then maintained continuously, for the continuous growth of nanostructures.

With these objectives in mind, particular embodiments of the invention are explained by a detailed description of the drawings as follows.

The basic principle of nanostructure production from a porous or opaque substrate, or a substrate having holes, pores, or microchannels (collectively referred to as cavities), where the substrate is resistively heated or in contact with a resistively heated substrate, is schematically illustrated in FIGS. 1-6C.

FIG. 1A shows a substrate 130, on which reaction sites 131 are present, and the substrate is resistively heated. An electrical current source 110 provides the power by which the substrate is heated. Reaction species 140 are brought in contact with the reaction sites and nanostructures 160 form. Depending on the substrate material used, a voltage source may be used instead. In particular, if a material with a positive coefficient of resistivity (like most metals) is used, using a voltage source results in a stable situation, i.e. thermal runaway is prevented; for a material with negative coefficient of resistivity (like silicon at high temperatures) a current source prevents thermal runaway. Alternatively, any combination of current and voltage, including, but not limited to, their product (i.e. electrical power) can be controlled. In fact, in a closed loop configuration, a controller that is fast enough can stabilize the system regardless of the material used, but the aforementioned combinations (positive coefficient of resistivity with voltage source, negative coefficient of resistivity with current source) are preferred. This note should be considered to apply throughout the document where an electrical source is mentioned, in particular to all figures where a voltage or current source is explicitly depicted to provide electrical power to heat a substrate.

Figure 1B:
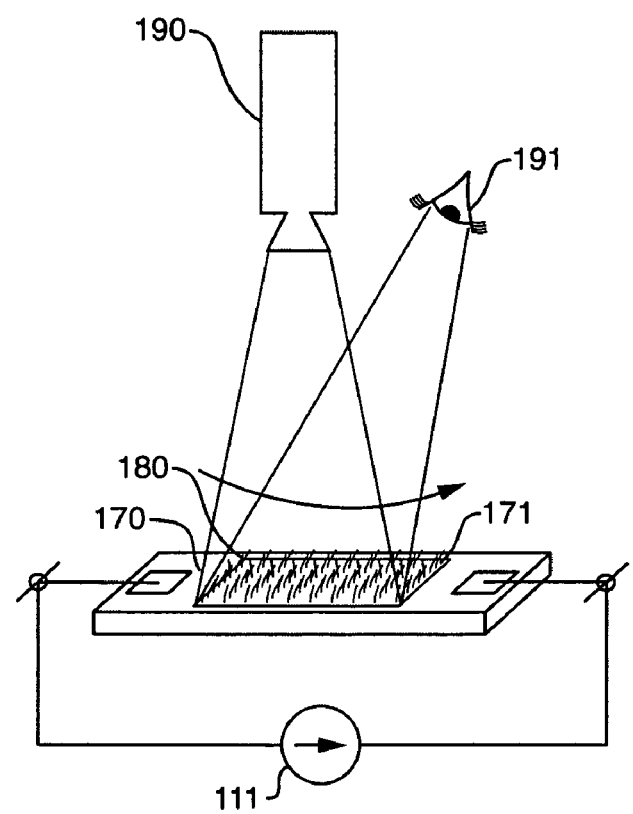

FIG. 1B shows a substrate 170, on which reaction sites 171 are present, and that is resistively heated. An electrical current source 111 provides the power by which the substrate is heated. Reaction species are brought in contact with the reaction sites and nanostructures 180 form. The nanostructures 180 are observed by a camera 190, or by an operator 191, during growth. This is possible because substrate 170 is resistively heated inside an enclosure that provides good optical access, instead of placed inside a tube furnace, as is commonly done.

Figure 2:
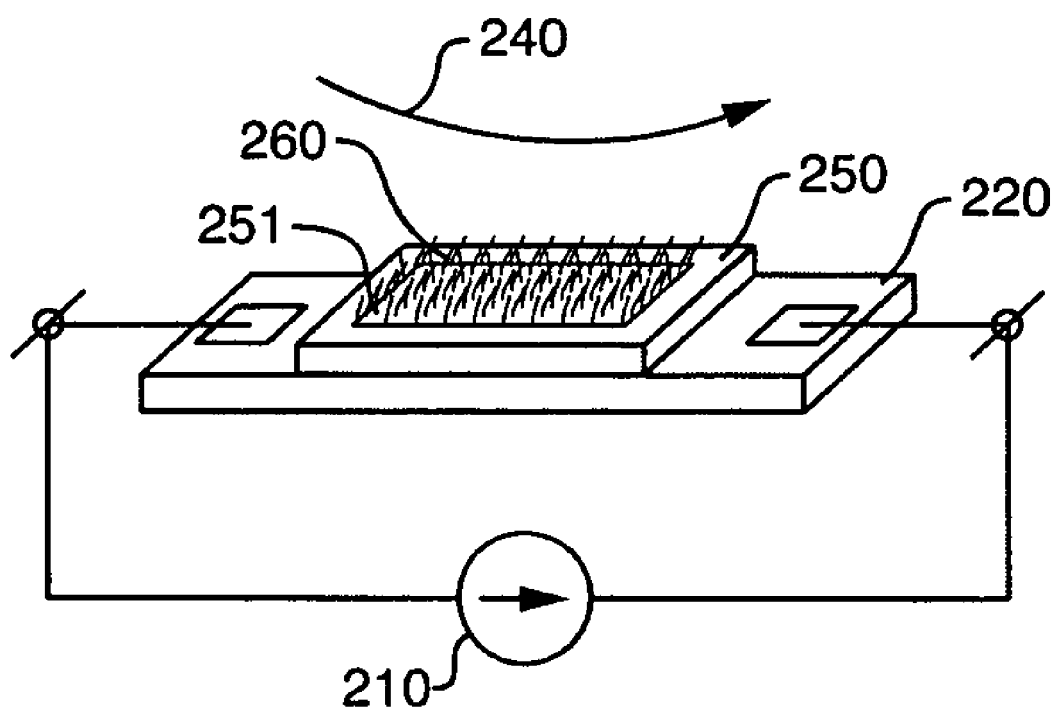
FIG. 2 shows a substrate for growth of nanostructures, which is in contact with a second substrate, through which a current is passes so the substrate is heated resistively.

FIG. 2 shows a substrate 250, with reaction sites 251, in contact with another substrate 220, where the latter is resistively heated by a current provided by current source 210. Reaction species 240 are brought in contact with the reaction sites and nanostructures 260 form.

Figure 3:
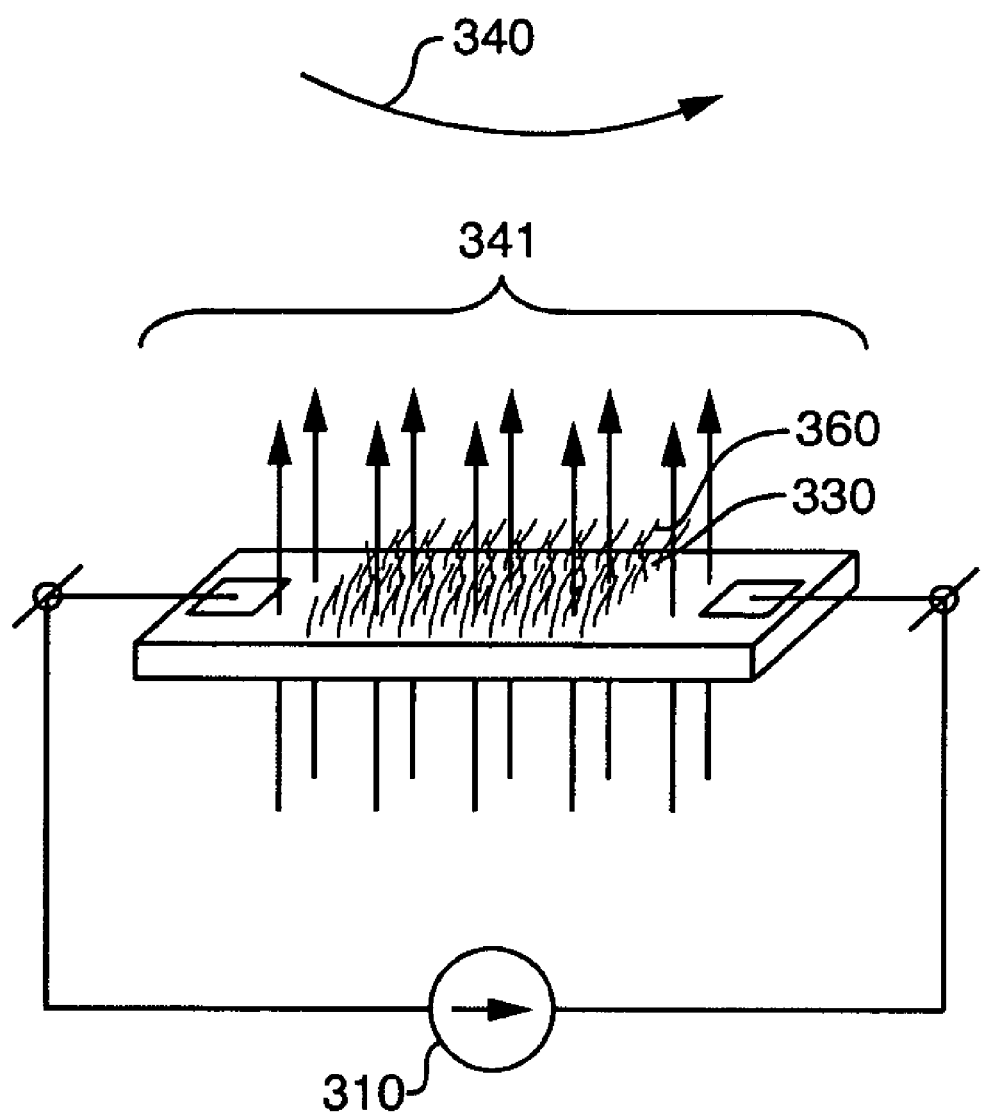
FIG. 3 shows a substrate for growth of nanostructures, where fluid passes through cavities in the substrate and a current is passed through the substrate so the substrate is heated resistively.

FIG. 3 shows a substrate 330, having holes, pores, or microchannels. Reaction sites may reside inside the holes, pores, or microchannels, on the surface of the substrate, or provided by one or both of the flows of reaction species 340 and 341. An electrical current source 310 provides the power by which the substrate is heated. Reaction species 340 and/or 341 are brought in contact with the reaction sites, causing growth of nanostructures 360.

Figure 4A:
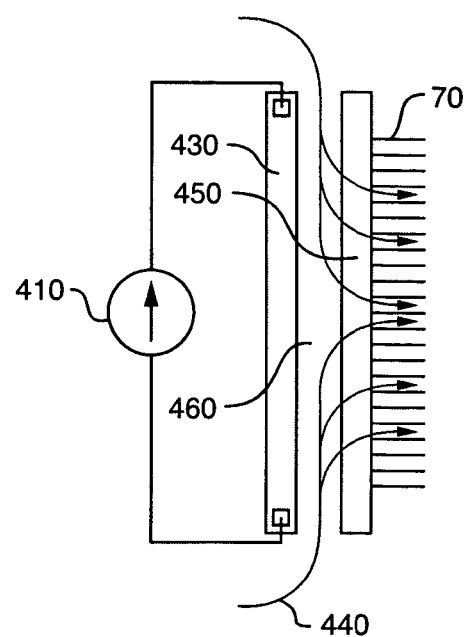
FIGS. 4A and 4B show an apparatus for growth of nanostructures from growth sites within cavities of a substrate, where the substrate is in close proximity to, or in contact with, a second substrate which is heated resistively, thus preheating the reaction species before reaching the growth sites.
Figure 4B:
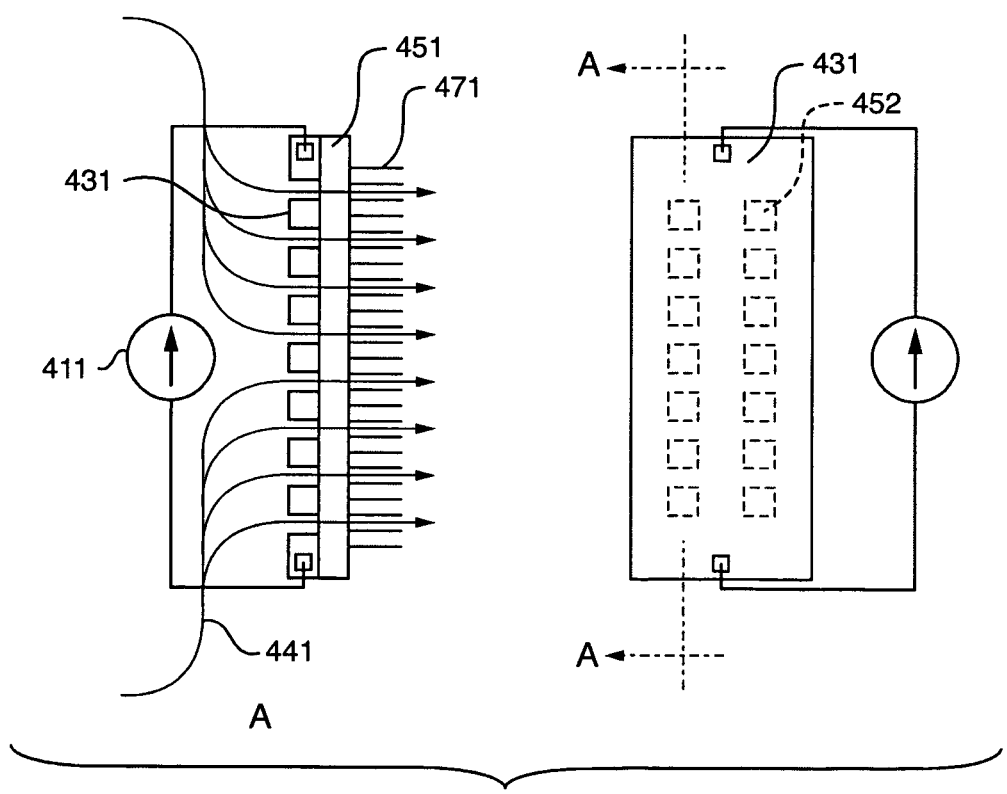

FIGS. 4A and 4B schematically show an apparatus for growth from a substrate having holes pores or microchannels, where the substrate is not itself resistively heated, but is in contact with or is close to a heated substrate.

FIG. 4A shows a growth substrate 450 having holes, pores, or microchannels, and a resistively heated substrate 430 and its current source 410. Reaction species 440 are directed through the space 460 between the two substrates, then through the growth substrate 450's holes, pores, or microchannels, to growth sites, for example located inside the pores, holes or microchannels of growth substrate 450 or on another surface of the growth substrate 450, so that nanostructures 470 are formed in accordance with the objects of the invention.

FIG. 4B shows a growth substrate 451 having holes, pores, or microchannels, and a resistively heated substrate 431 and its current source 411. The heated substrate 431 and the growth substrate 451 are in contact, leaving no space between them for reaction species to pass through; holes, pores or microchannels 452 are therefore provided in the heated substrate 431, through which reaction species 441 pass. Thus, the reaction species 441 are brought into contact with reaction sites located inside the pores, holes or microchannels of growth substrate 451 or on another surface of the growth substrate 451, so that nanostructures 471 are formed in accordance with the objects of the invention.

Figure 5:
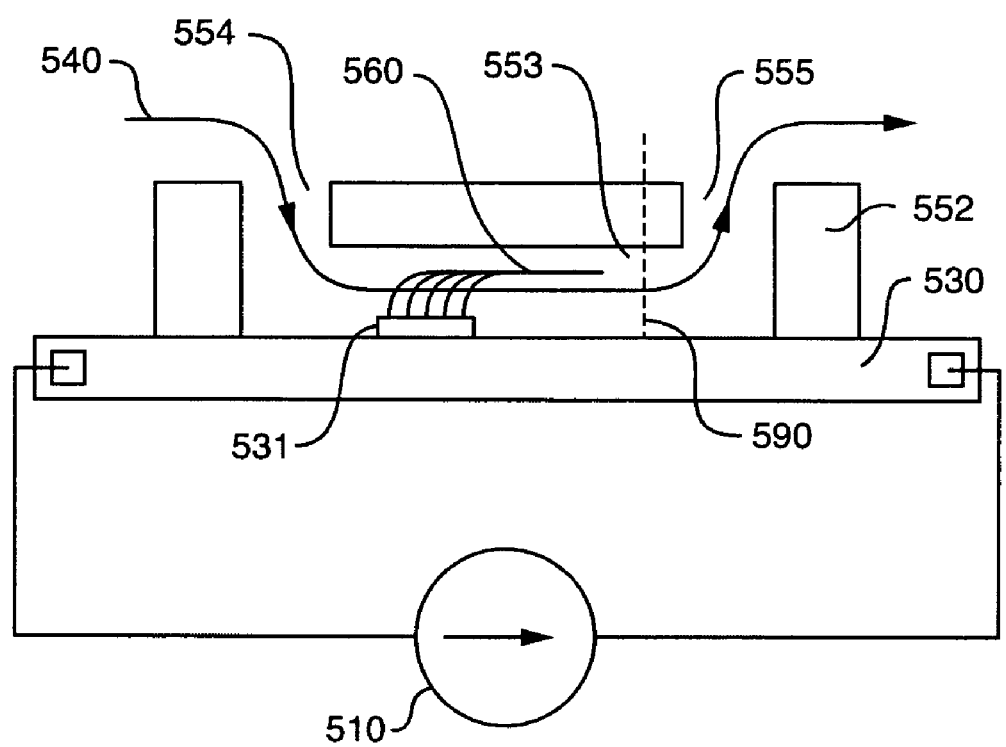
FIG. 5 shows a substrate for growth of nanostructures within microchannels in a substrate, where a current is passed through the substrate so the substrate is heated resistively.

FIG. 5 shows a microchannel device consisting of a resistively heated substrate 530, with growth sites 531, covered by another substrate 552 defining microchannels 553. An electrical current source 510 provides the power by which the substrate 530 is heated. Reaction species 540 are brought in contact with the growth sites 531 and nanostructures 560 form. In the form presented here, the microchannel 553 runs between inlet 554 and outlet 555. Nanostructures 560 may optionally be aligned by the flow 540, but do not pass the outlet 555. Alternatively, the microchannel 553 can end in an open end (as if the microchannel were cut over line 590) allowing the nanostructures 560 to grow to lengths exceeding the length of the microchannel, in principle infinitely, in accordance with the objects of the invention.

Figure 6A:
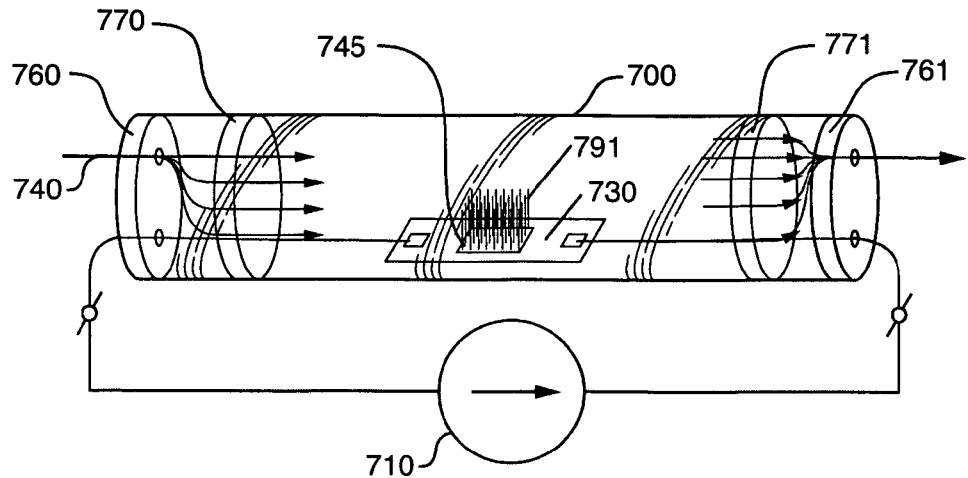
FIGS. 6A, 6B and 6C show exemplary apparatus for enclosing a restively heated substrate for growing nanostructures.
Figure 6B:
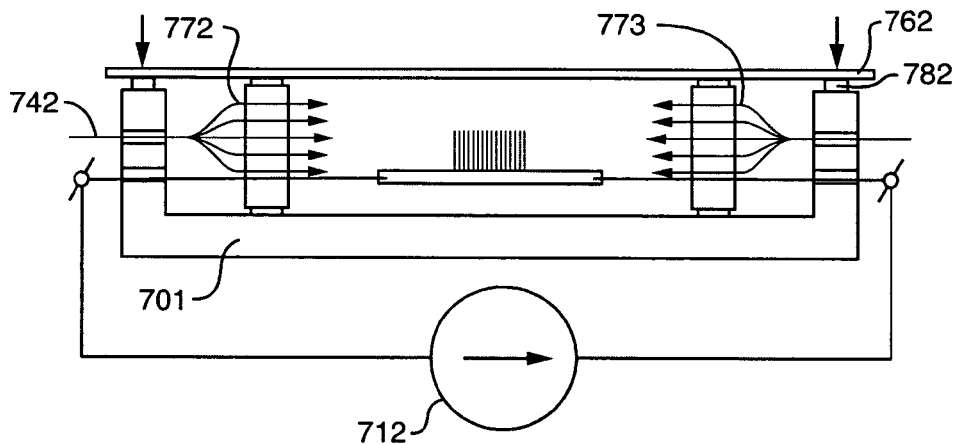
Figure 6C:
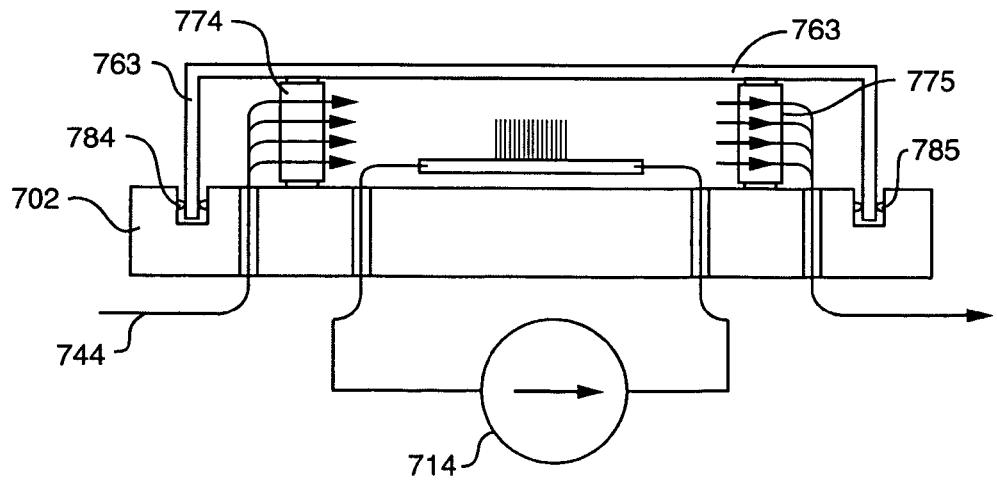

FIGS. 6A-6C shows exemplary apparatus for nanostructure production. FIG. 6A shows a tube 700 of preferably transparent, heat resistant material, such as quartz, fused silica, or borosilicate glass, closed by endcaps 760 and 761. Reaction species 740 are brought in contact with growth sites 745 on a substrate 730 that is resistively heated, and nanostructures 791 form. The electrical power is provided by current source 710. Optionally, flow restrictions 770 and/or 771 are placed in the tube to provide a more uniform flow in the part of the tube between them.

FIG. 6B shows a cross-section of a hollow, half open platform 701, covered by a pane 762 of preferably transparent, heat resistant material. The pane 762 is pressed on a seal 782 between the platform 701 and the pane 762 to provide an airtight connection. Reaction species 742 are brought in contact with growth sites on a substrate that is resistively heated, and nanostructures form. The electrical power is provided by current source 9712. Optionally, flow restrictions 772 and/or 773 are placed in the enclosure to provide a more uniform flow in the part of the enclosure between them.

FIG. 6C shows a cross-section of an essentially flat platform 702, covered by a dish, bell jar, or other cover 763 of preferably transparent, heat resistant material. The cover rests against a seal 784, such as an o-ring or lip seal, to provide an airtight connection. Reaction species 744 are brought in contact with growth sites on a substrate that is resistively heated, and nanostructures form. The electrical power is provided by current source 714. Optionally, flow restrictions 774 and/or 775 are placed in the enclosure to provide a more uniform flow in the part of the enclosure between the restrictions.

Figure 7:
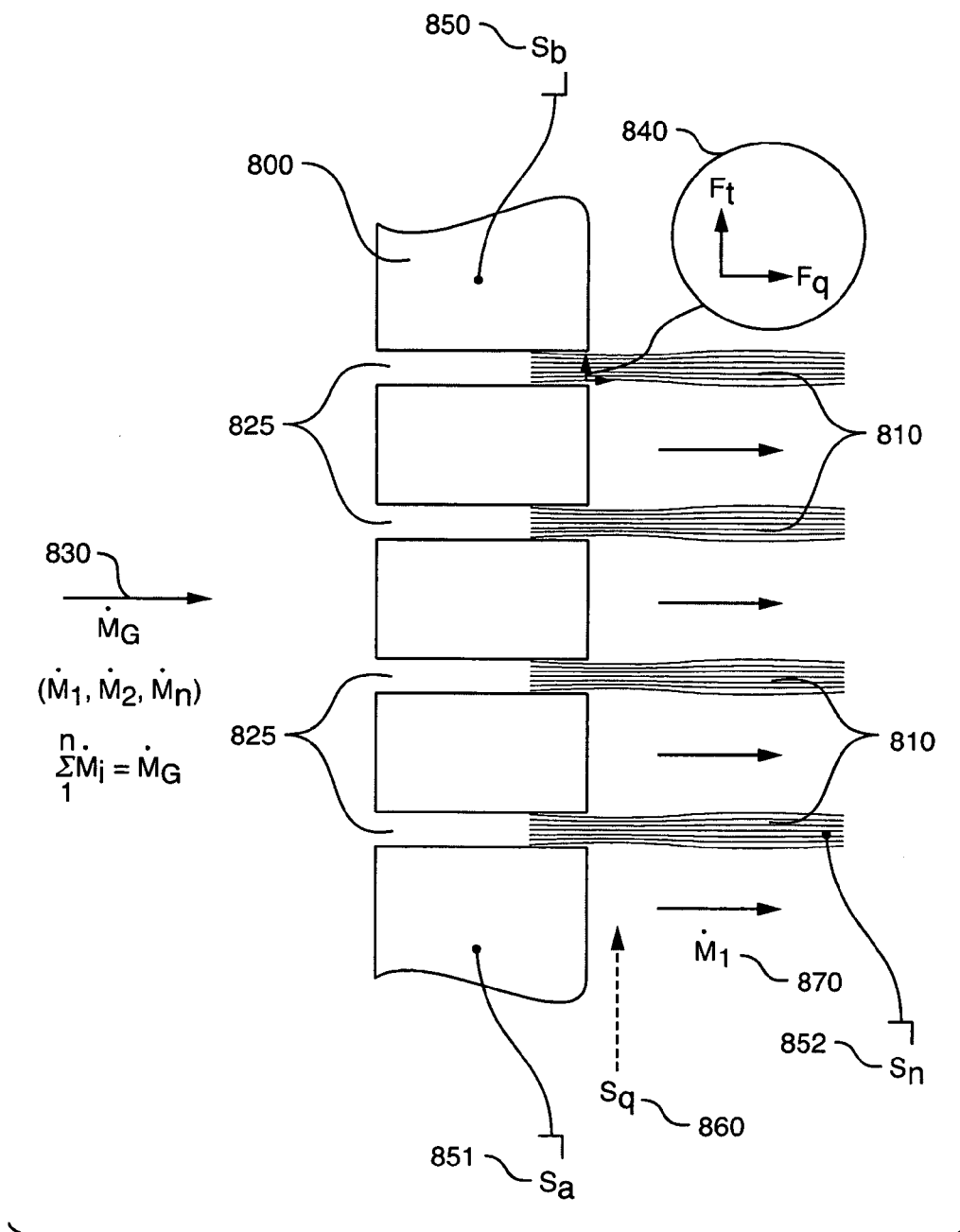
FIG. 7 shows an exemplary method for growing long nanostructures from growth sites positioned within cavities of a substrate, where control is maintained over the flows through the substrate and the forces acting on the nanostructures.

FIG. 7 is a schematic representation of a substrate 800 for growth of long nanostructures, with emphasis on the maintenance of spatial and temporal control on the chemical and mechanical conditions for growth of nanostructures. The substrate 800 contains a plurality of parallel flow paths 825, such as holes, pores, or microchannels in the substrate such as a silicon wafer, to give a spatially uniform flow through the substrate. The composition and rate of the flow 830 is controlled by suitable flow control apparatus, and the flow is divided among the parallel paths. Forces 840 applied to the nanostructures are controlled. Electrical or optical signals are used to monitor the growth of nanostructures by electrically or optically interrogating the substrate and the nanostructures, such as at points 850, 851, 852, or 860. Possible methods of interrogation include measuring the DC or AC impedance of the substrate or the nanostructures, measuring the temperature of the substrate or the nanostructures using contact or non-contact (e.g. infrared) thermocouples, or measuring the properties of the growth sites or the nanostructures using infrared, x-ray, or Raman spectroscopy.

In other embodiments, many units of three substrates, each unit consisting of a heated substrate, a substrate having catalytic species on one surface, and a substrate defining an array of microchannels, are stacked. This method is easily scalable by changing the number of units that are stacked. Also shown are symbolic representations of exemplary measurements that may be performed to monitor the status or progress of the reaction process, such as temperature measurement with a thermocouple, or by measuring the infra-red radiation with an IR-camera or pyrometer, electrical measurements such as resistance or capacitance of the assembly, Raman spectroscopy on the nanostructures, or gas composition analysis by a spectrometer or a gas analyzer on the effluent gases.

Figure 8:
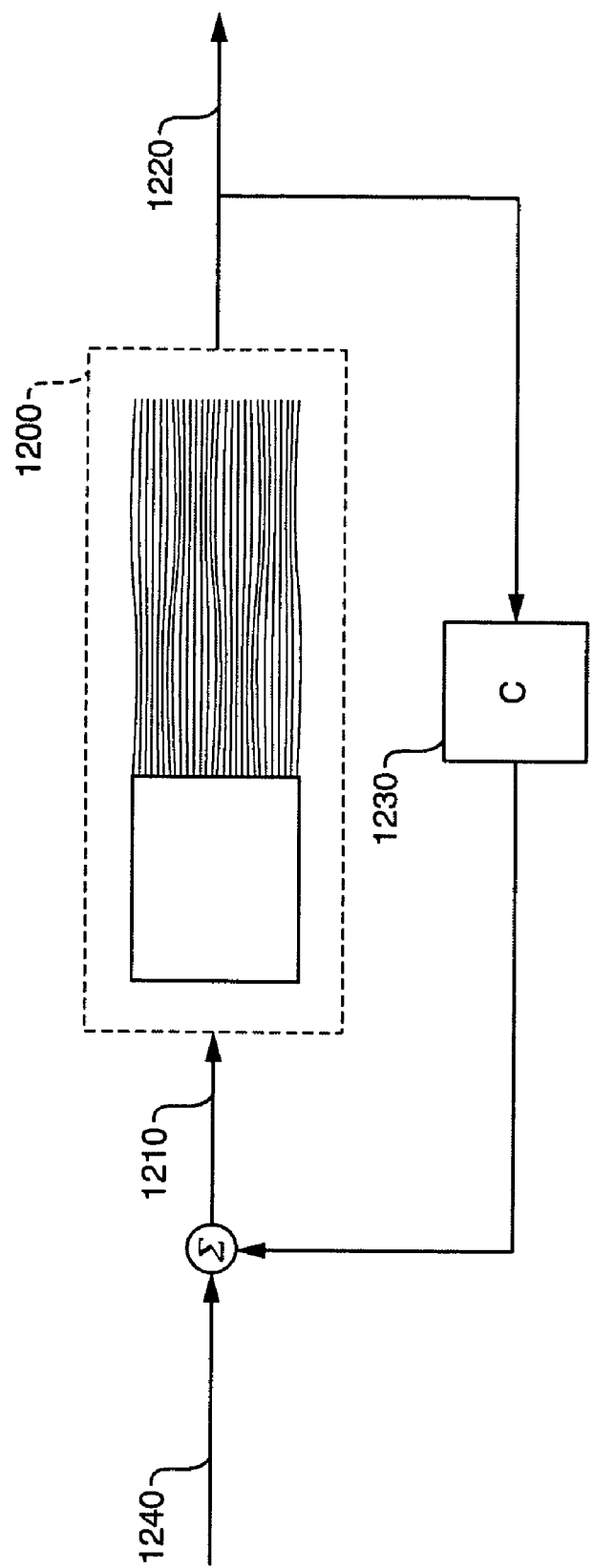
FIG. 8 is a schematic representation of an apparatus for the continuous growth of long nanostructures, where a generalized feedback scheme is used to control operation of the apparatus.

FIG. 8 is a schematic representation where the growth apparatus 1200, including a substrate connected in a schematic feedback loop for control of the growth of nanostructures. Controller 1232 takes output signals 1220, and error signal 1210 is produced in response to the output of the controller and the reference signal 1240, and the error signal is provided to the growth apparatus as an input signal to maintain desired operation of the apparatus. This feedback operation is novel above those practiced by those skilled in the art, because the present invention enables control of the growth process based on continuous monitoring of the properties of the nanostructures and growth sites, as well as rapid control of the process variables such as flow rates, composition, and substrate temperature. Traditionally, process conditions are established and maintained in an open-loop fashion, without feedback of the properties of the nanostructures and growth sites.

Figure 9:
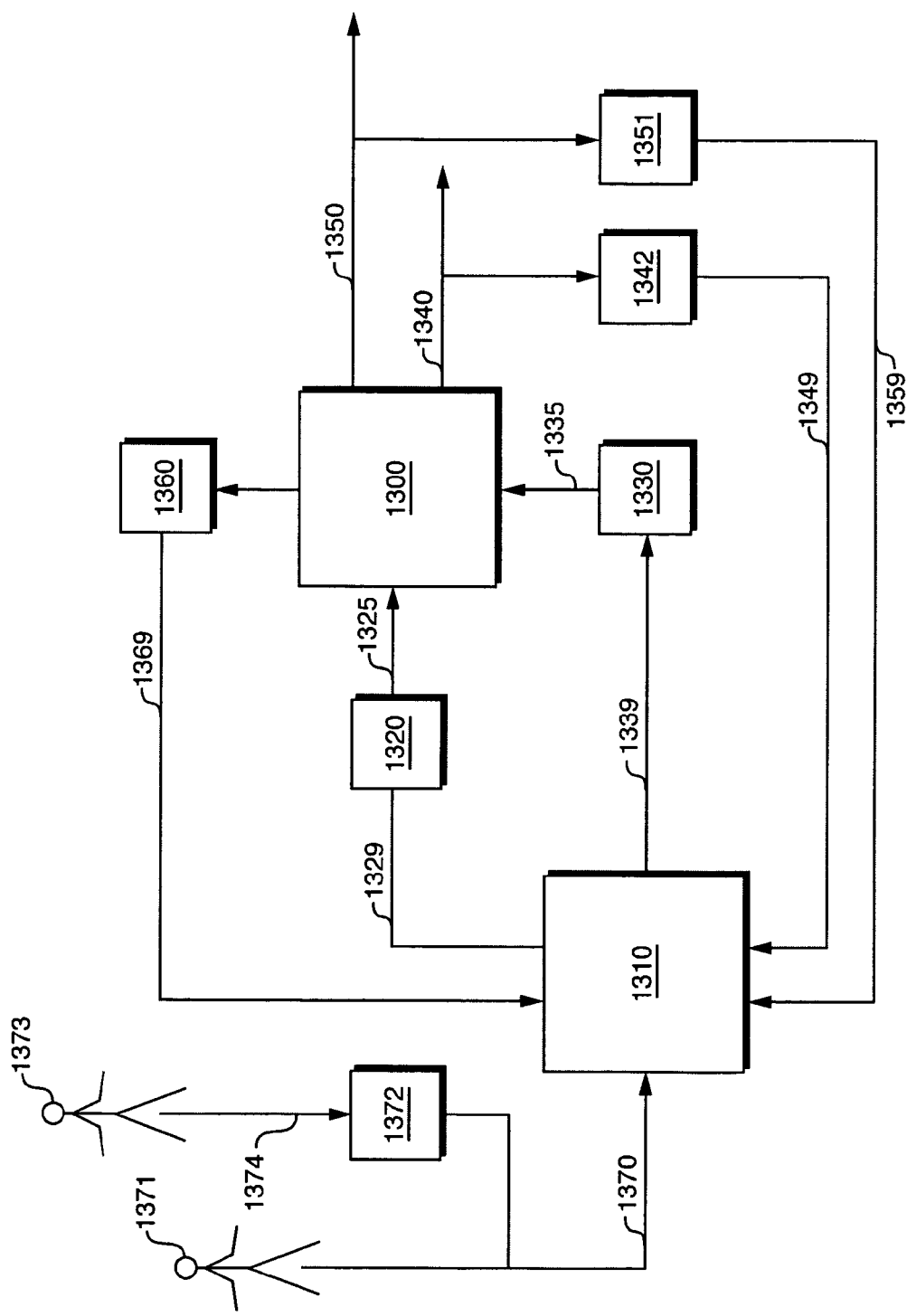
FIG. 9 shows a schematic representation of a system for controlled growth of nanostructures.

FIG. 9 schematically shows a system for the controlled production of nanostructures. Open arrowheads represent signals, filled arrowheads represent transport of mass or energy. Process 1300 completely or partially converts supplied species 1325 into nanostructures 1350. Effluent material 1340 may consist of unused reaction species and/or byproducts from the formation of nanostructures. Supply of reaction species 1325 is controlled by one or more valves, flow controllers, hoppers, and/or any other means of controlled supply of gas, fluid, or solid material, here represented by process 1321. Energy necessary to activate and maintain the reaction is provided by one or more controlled power sources (such as pulse width modulated, or current, voltage or power controlled), here represented by process 1330. One or more parameters indicating the status of process 1300 are measured by process 1360. One or more parameters indicating the quality and length and/or other features of produced nanostructures 1350 are measured by process 1351. One or more parameters indicating the composition and/or other features of effluent material 1340 are measured by process 1342. Controller 1310 receives measurement signals 1349, 1359, and 1369, and setpoints 1370, and sends actuation signals 1329 and 1339, following a certain control strategy. Setpoints 1370 may be provided during operation of process 1300 by an operator 1371, or by a higher level process control system 1372, programmed by an operator 1373 before operation of process 1300.

Figure 10:
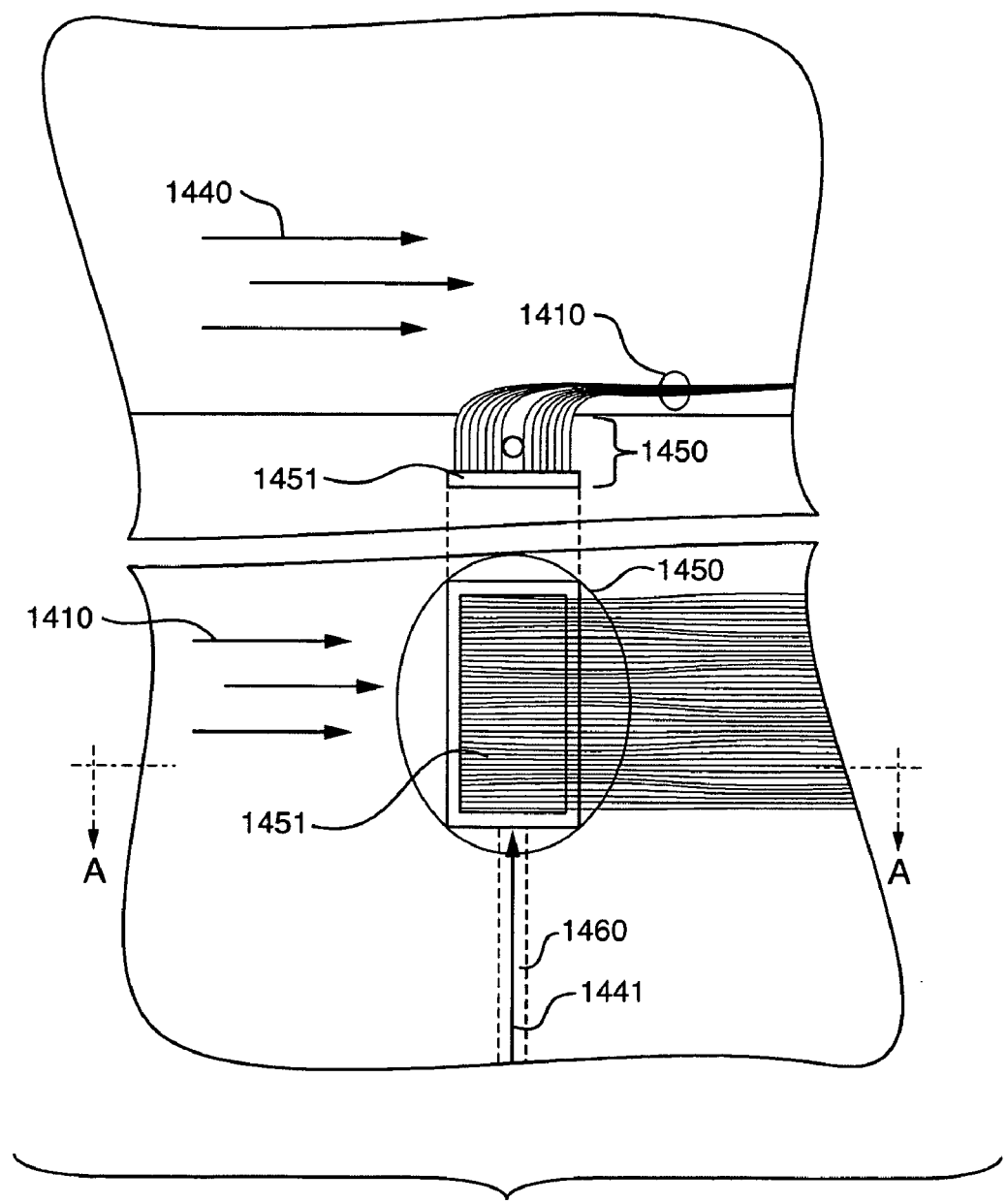
FIG. 10 shows an apparatus for growth of nanostructures, where a flow of reaction species passes through reaction sites inside a porous substrate and produced nanostructures are assembled by a second fluid flow, while that second fluid flow is constrained between the growth substrate and an other object having a cavity into which the nanostructures are collected.

FIG. 10 shows a top view and cross-section of a simple method for separation of a first flow 1441, consisting of reaction species and or auxiliary species intended for the growth of nanostructures 1410, from a second flow 1440 intended to exert forces on growing nanostructures 14210 after they have reached a certain length, e.g. to align them or assemble them in strands. Growth sites 1451 are thereto located in a trench 1450, protecting the nanostructures 1410 from being caught by second flow 1440 until they reach a certain length.

In other embodiments nanostructures are collected in a first flow that flows though a constriction, where the constriction is a structure with a hole. A second flow provides reaction species to growth sites in porous substrate, where the nanostructures form. The assembly may have any shape in the dimensions, including rotational symmetrical around axis of symmetry. It is appreciated that the shape of the hole may function as a template for the cross-section of the assembled nanostructures, so that a circular constriction results in an essentially round strand of nanostructures; a slit or rectangle results in a sheet or strip of nanostructures, etc.

Alternately, nanostructures are collected in a first flow that flows though a constriction, and the constriction is a funnel-shaped structure, with an open end. A second flow provides reaction species to growth sites in porous substrate, where the nanostructures form. The assembly may have any shape, including rotational symmetrical around axis of symmetry. It is appreciated that the shape of the open end may function as a template for the cross-section of the assembled nanostructures, so that a circular constriction results in an essentially round strand of nanostructures; a slit or rectangle results in a sheet or strip of nanostructures, etc.

Figure 11A:
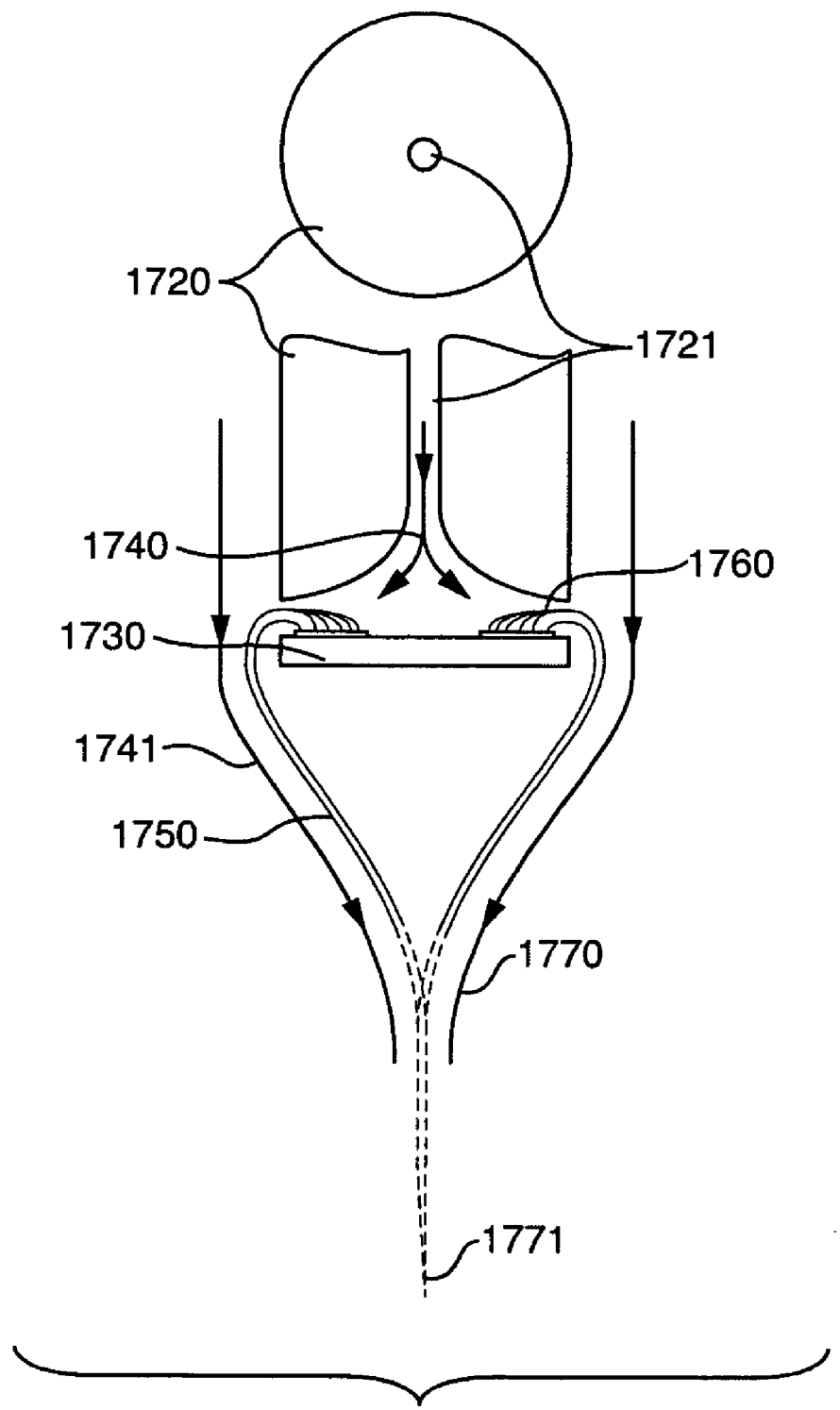
FIGS. 11A-11D show an apparatus for growth of nanostructures, where a flow of reaction species is directed at a circular substrate, and produced nanostructures are assembled in fibers or other 2 or 3-dimensional structures.

FIG. 11A-11D illustrates another apparatus for the production and assembly of long nanostructures. FIG. 11A shows an apparatus, where a first flow 1740 provides reaction species through a hole 1721 in a structure 1720 to growth sites 1760 on substrate 1730, where nanostructures 1750 form. The gap height above substrate 1730 decreases from the center to the edge, as defined by the bottom surface 1721 of structure 1720. Nanostructures are directed outward by first flow 1740, where they get caught in second flow 1741. Further downstream the nanostructures 1750 form a tubular assembly 1770, that may be further compressed into a strand 1771.

Figure 11B:
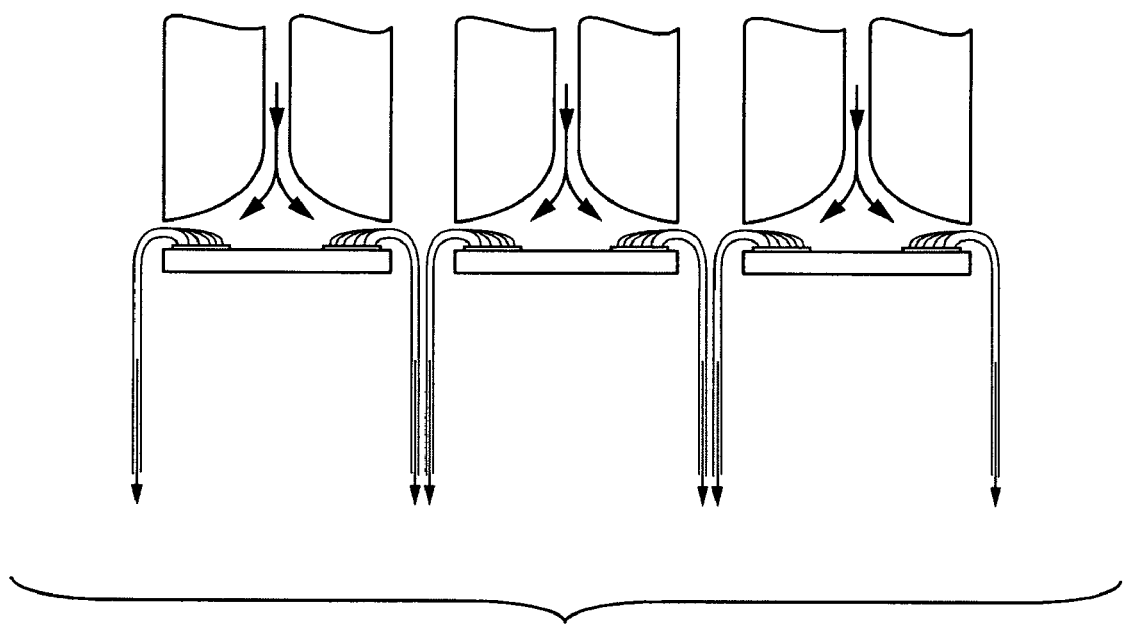
Figure 11C:
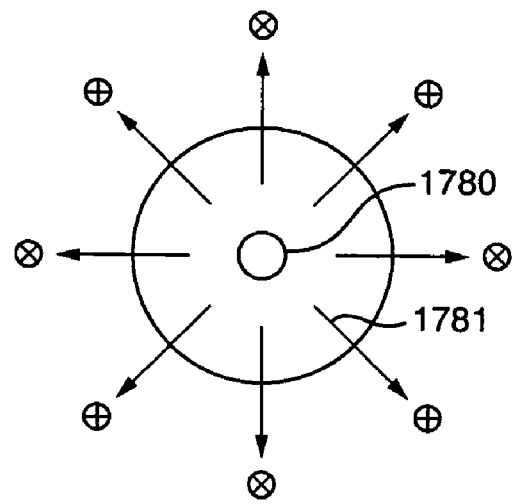
Figure 11C:
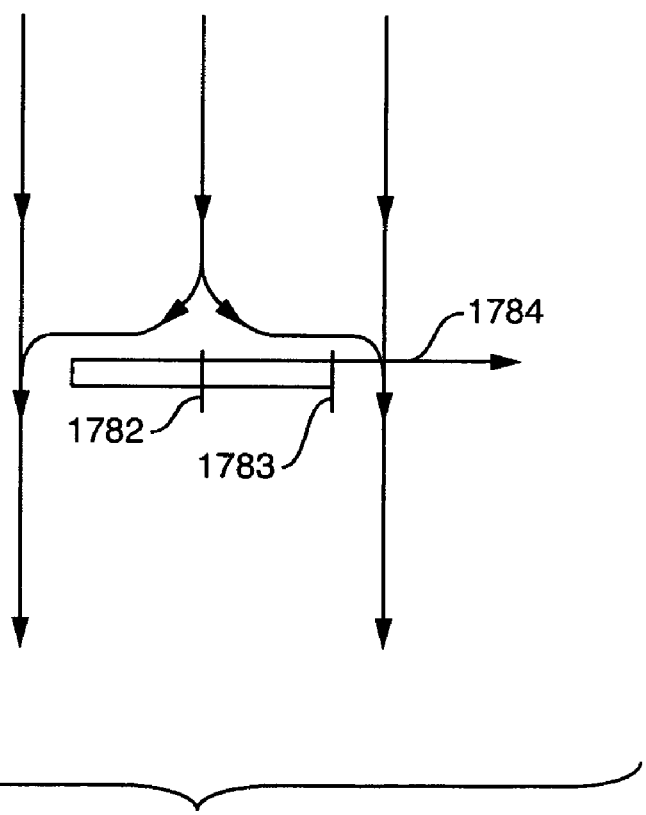
Figure 11D:
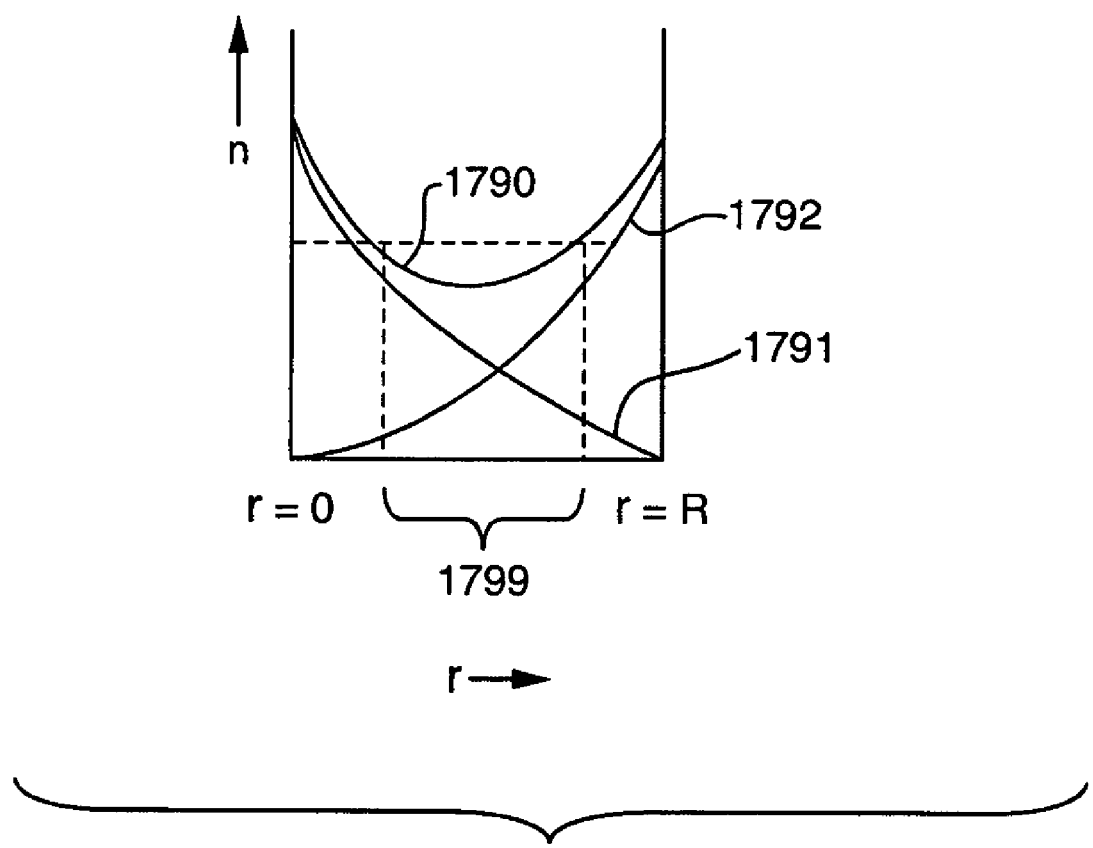

FIG. 11B shows an array of units depicted in FIG. 11A, resulting in the formation of many isolated strands, or an interconnected mesh, depending on the spatial density of the units. FIG. 11C shows substrate 1730 in FIG. 11A, with some more flow lines and a velocity profile. In the top view, the impinging flow 1780 and the radial flow 1781 are shown. In the cross-sectional view, radial coordinate r 1784 is defined. r=0 at the center 1782 of the substrate, r=R at the edge of the substrate 1783. FIG. 11D shows the radial flow velocity profile 1790 as a function of radial coordinate r. An impinging flow gives a logarithmically decaying radial velocity 1791. The decreasing gap height gives an increasing radial velocity 1792, the exact shape depending on the exact geometry. Superposition of the two profiles gives the radial flow velocity profile 1790, showing a minimum between the center and the edge. The advantage of such a profile is a longer residence time of reactive species over the substrate in an annular region 1799, favoring nanostructure growth, and a higher radial velocity away from that region, where a pull force directs the nanostructures and a higher velocity is beneficial.

Figure 12:
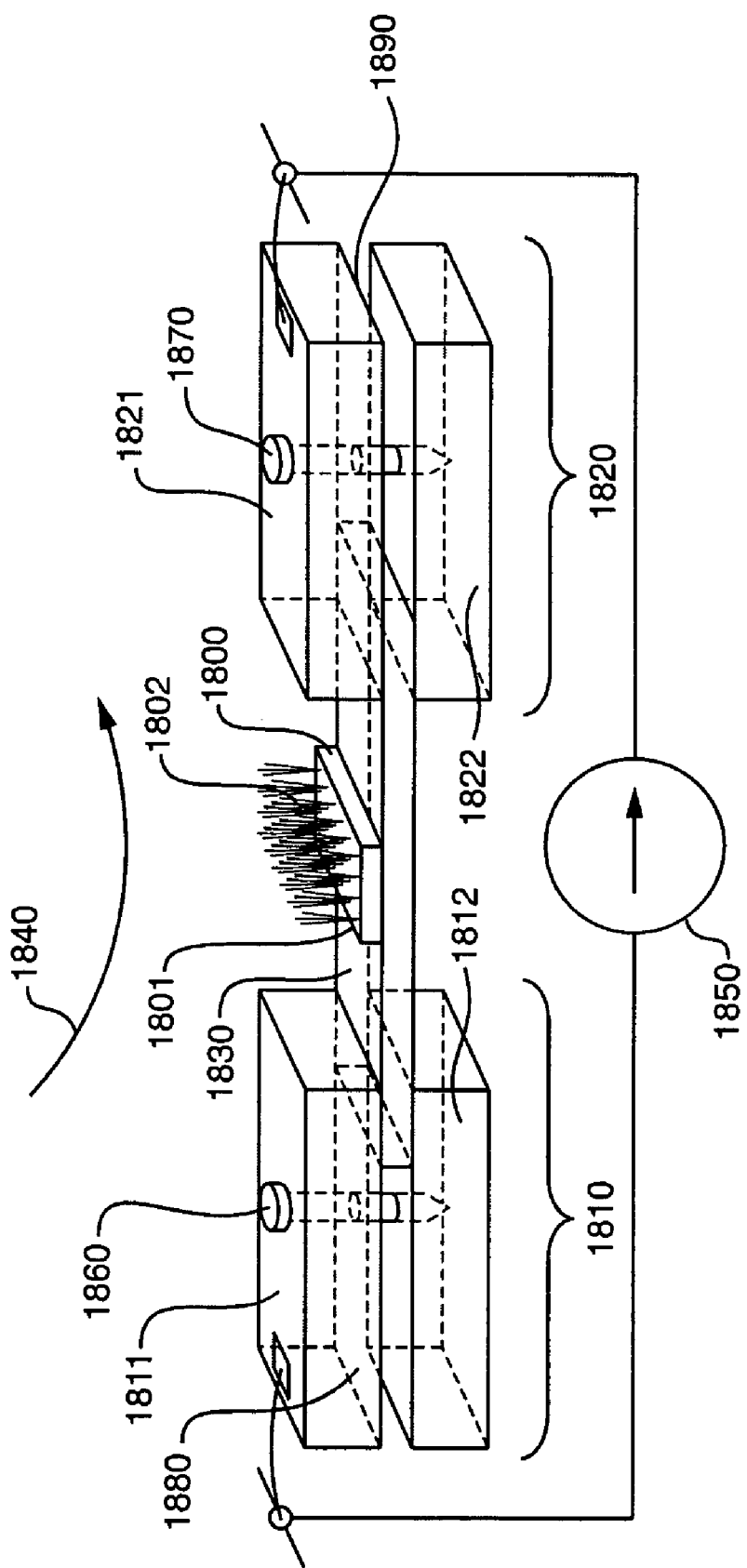
FIG. 12 shows an apparatus for growth of nanostructures, where a substrate is heated resistively, and both sides of the substrate are clamped to self-cooled electrodes, which make electrical contact to and mechanically support the substrate.

FIG. 12 shows a exemplary simple apparatus for heating a substrate, for the application of nanostructure growth, where a resistively heated substrate 1830 is clamped between the two halves 1811 and 1812 of electrode 1810 on one side and between the two halves 1821 and 1822 of electrode 1820 on the other side. The halves are pressed together by bolts 1860 and 1870, respectively. A current source 1850 provides the electrical energy to heat the substrate. As an example of using this apparatus for nanostructure growth, a silicon substrate 1800 is depicted, having a layer of catalytic material 1801 on its top surface, from which carbon nanotubes 1802 grow, when the substrate's temperature is around 750° C. and reaction species 1840 are brought in contact with the substrate. The electrodes may be actively cooled, but if the size and material of the blocks and the substrate are chosen appropriately the maximum temperature of the electrodes can be over 300° C. lower than the maximum temperature of the substrate without active cooling, allowing production of nanostructures on the substrate, while the electrodes are cold enough that problems like melting, diffusion of materials between electrode and substrate, creep of the electrodes do not occur.

Figure 13:
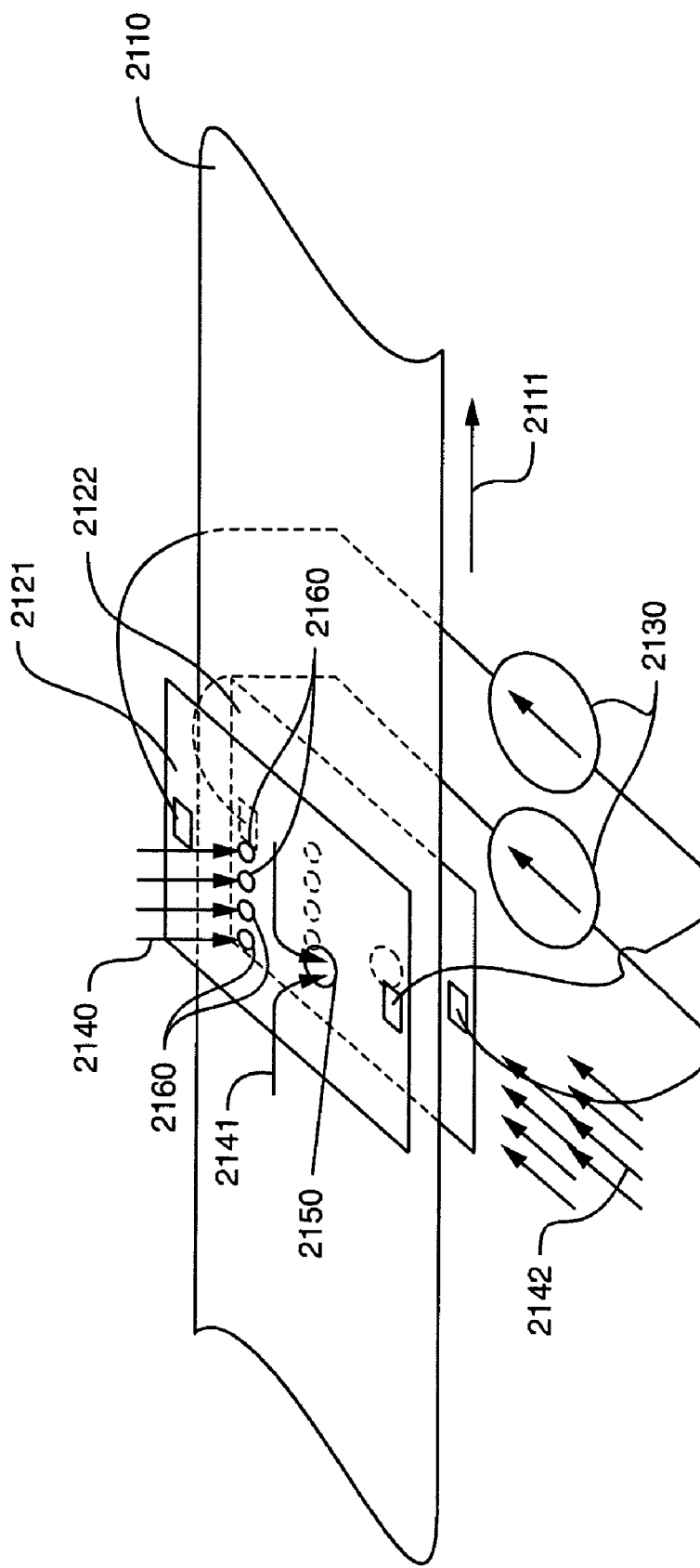
FIG. 13 shows an apparatus for growth of nanostructures on a continuously moving tape, where the tape moves between two resistively heated substrates and reaction species are supplied through a hole or an array of holes in the heated substrates, or in between the tape and the heated substrates.

FIG. 13 shows a method for the production of nanostructures, where a strip 2110 is continuously moving between two resistively heated plates 2121 and 2122 in direction 2111. Current sources 2130 provide the electrical power to heat the plates. Reaction species 2142, 2141, and/or 2140 are brought in the gap between the plates and the strip from the sides, through a hole 2150 or an array of holes 2160, to give a spatially uniform flow, such that nanostructures form on the strip.

Figure 14A:
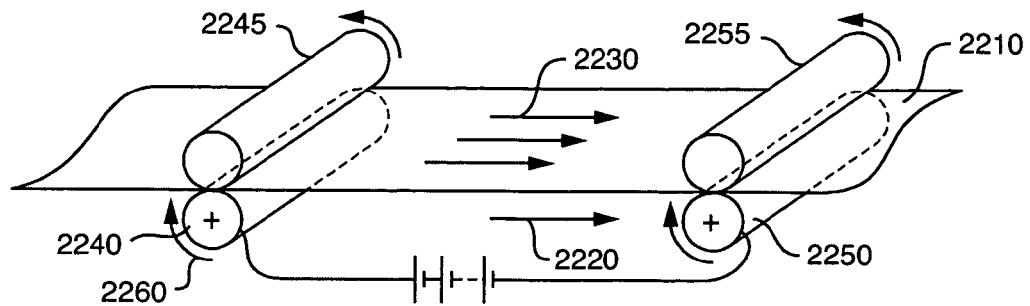
FIGS. 14A and 14B show an apparatus for growth of nanostructures on a continuously moving tape, where the tape moves over rolling contacts, through which an electrical current is passed, so as to resistively heat the tape.
Figure 14B:
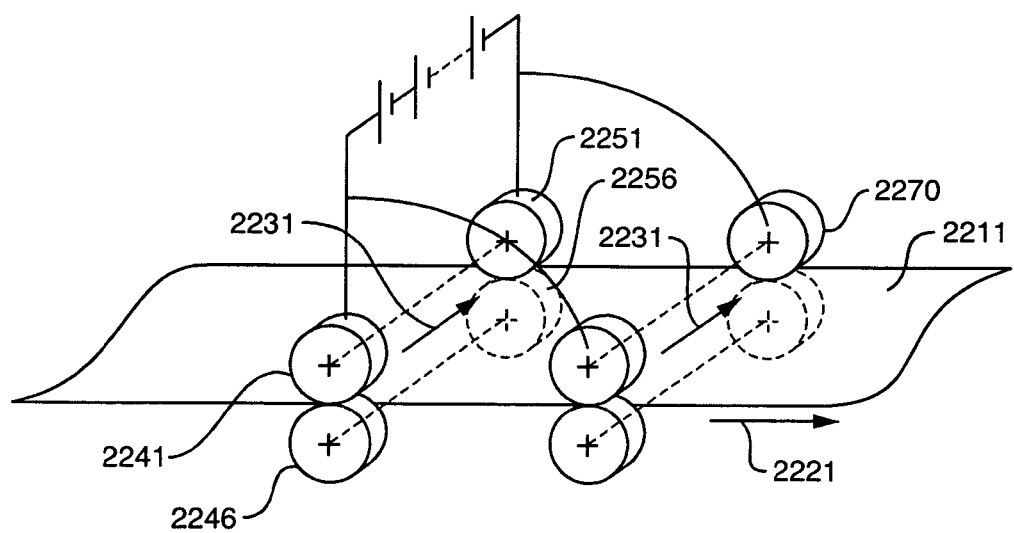

FIGS. 14A and 14B show a method for the production of nanostructures by resistively heating a strip of material. FIG. 14A shows a strip 2210 that is moving in direction 2220. An electrical current 2230 flows through the strip between electrode 2260, optionally opposed by electrode 2245, and electrode 2250, optionally opposed by electrode 2255, that is thus resistively heated. Optionally, more electrodes may be provided. As the strip moves, the electrodes turn accordingly, e.g. electrode 2240 moves in direction 2260. The electrodes may be driven, thus moving the strip, or the strip may be driven by other means (not shown), thus turning the electrodes.

FIG. 14B shows a strip 2211 that is moving in direction 2221. An electrical current 2231 flows through the strip between electrode 2241, optionally opposed by electrode 2246, and electrode 2251, optionally opposed by electrode 2256, and the strip is thus resistively heated. Optionally, more electrodes may be provided.

Figure 15:
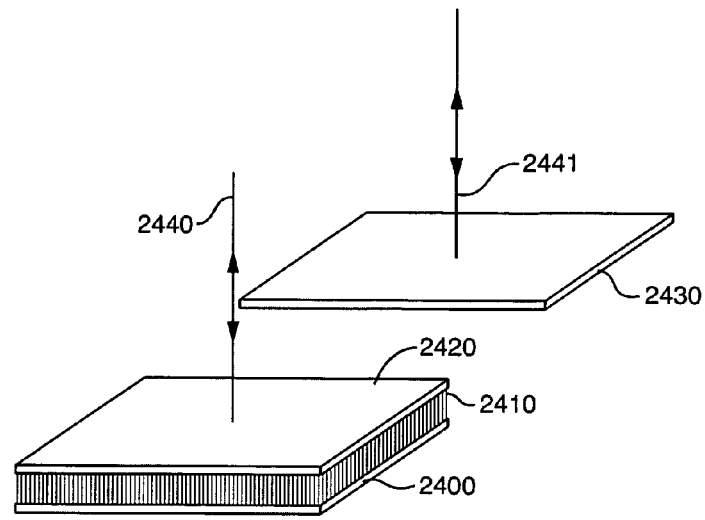
FIG. 15 shows a method for growth of nanostructures under a secondary substrate, where the height of the nanostructures is monitored by (laser) interferometry.

FIG. 15 shows a method of monitoring length and growth rate of nanostructures during growth. The measuring beam 2440 of a laser (e.g, an interferometer or CCD-based displacement sensor) reflects from a mirror or reflective substrate 2420 that is placed on top of nanostructures 2410 growing from reaction sites on substrate 2400. The reference beam 2441 of the interferometer reflects from a fixed mirror or fixed reflective substrate 2430. This method enables measurement of the traveled distance of substrate 2440 with respect to the fixed substrate 2430. The measurement beam may be at any suitable incident angle to the substrate, and therefore the beam may be reflected at any angle. Further, many measurement beams may be used, and/or individual beams may be scanned across the surface.

Figure 16:
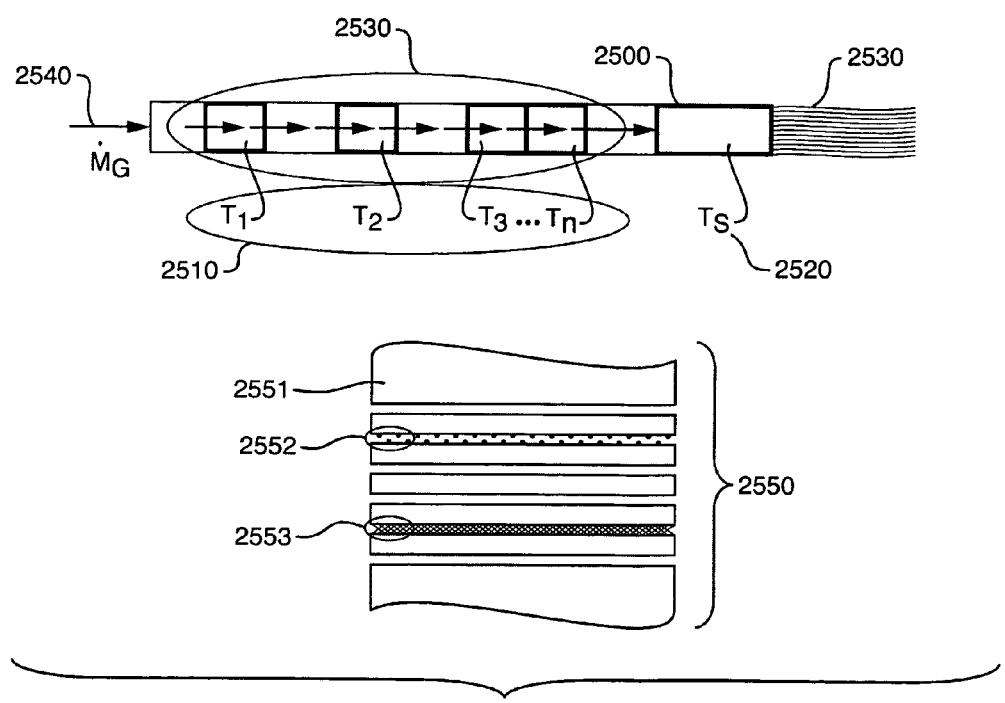
FIG. 16 is a schematic representation of a processing pathway for reactants for the growth of nanostructures, where the reactants pass through any number of processing zones prior to reaching the growth apparatus.

FIG. 16 shows a schematic representation of how a flow of reactants 2540, or more generally a flow of reactive and non-reactive chemical species 2540, may be thermally, chemically, and/or catalytically pre-processed prior to entering an apparatus 2500 for growth of nanostructures 2530. A preferred method in of pre-processing the flow in accordance with the present invention is to pass the flow through holes, pores, or microchannels in a series of substrates such as those schematically represented by 2530. Furthermore, the temperatures 2510 of the substrates may be controlled independently, such as by resistive heating if the substrates are conductive or are in contact with a conductive element which is heated resistively. An exemplary substrate 2550 constituting one of the pre-treatment zones in series 2530 is illustrated, where materials such as thin film 2551, nanoparticles 2552, or porous matrix 2553 may be arranged on the surfaces of the substrate and therefore be placed in the flow path to assist in pre-processing of the reactants.

Figure 17:
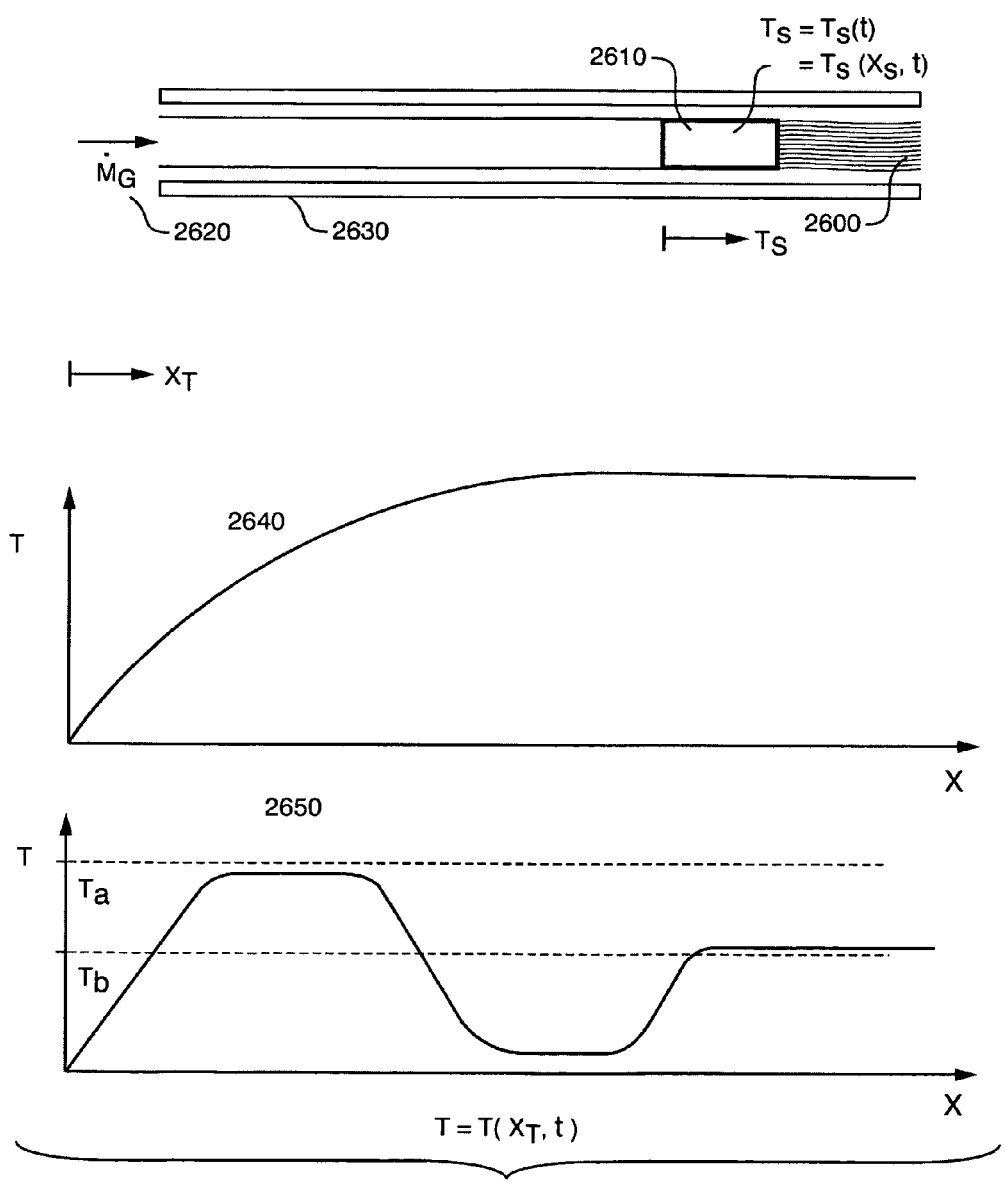
FIG. 17 is a schematic representation of a processing pathway for reactants for the growth of nanostructures, where the temperature of the reactants is spatially and temporally controlled as the reactants flow toward an apparatus for the growth of nanostructures, so as to influence thermal and/or catalytic pre-processing of the reactants.

FIG. 17 extends the method of pre-treating a flow 2620 prior to arrival at the growth apparatus 2610 for production of long nanostructures 2600, illustrating that the temperature of the flow 2620 may be varied spatially in an arbitrarily specified fashion. For example, the temperature may increase monotonically as the flow moves toward the growth apparatus as in 2640, or may first reach a temperature $T_a$, and later reach a temperature $T_b$ as in 2650.

Figure 18:
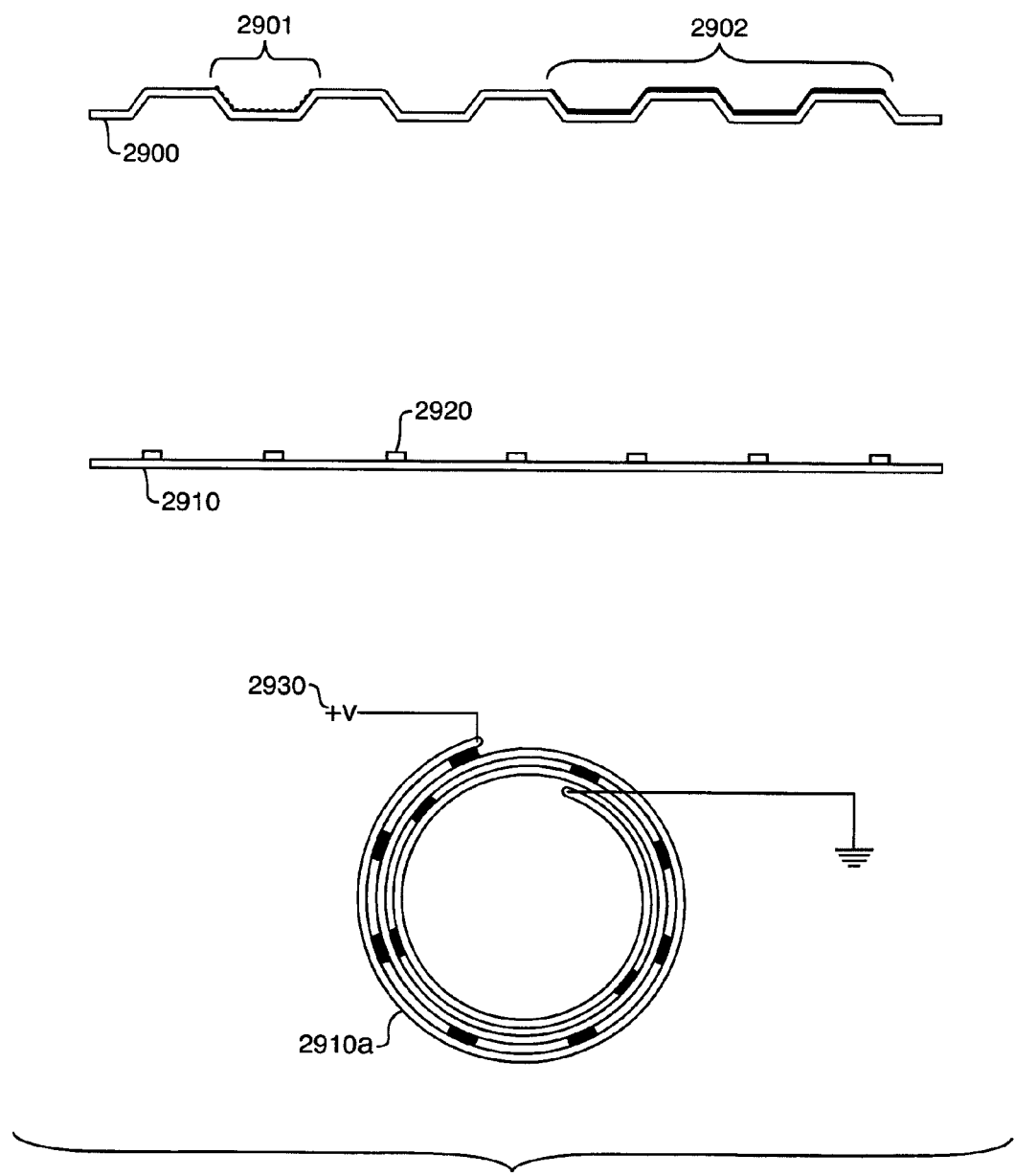
FIG. 18 shows an exemplary method of preparing a substrate for the growth of nanostructures, where the substrate is rolled from a flexible substrate such as a structured sheet, tape, or strip, and the substrate may be heated restively by passing a current through the wrapped assembly.

FIG. 18 illustrates an exemplary method for preparing a substrate for growth of nanostructures by rolling a flexible element such as a sheet, tape, or strip. Here, a corrugated strip 2900 is coated with growth sites for the growth of nanostructures, such as nanoparticles 2901 or a thin film 2902 (which may be processed accordingly so the film coarsens or de-wets into isolated growth sites). In one embodiment, the strip 2910 is electrically conductive and may have non-conducting spacers 2920. The substrate is rolled to form 2910A and heated resistively by applying voltage 2930, where the non-conducting spacers allow the current to flow around the rolled spiral, from a contact at the center of the spiral, to a contact at the terminal (outer) end of the spiral. Alternatively, the growth sites may be delivered by a gas-phase reaction after rolling the substrate or after inserting the rolled substrate in the growth apparatus, such as by flowing an organometallic precursor over the substrate.

Figure 19:
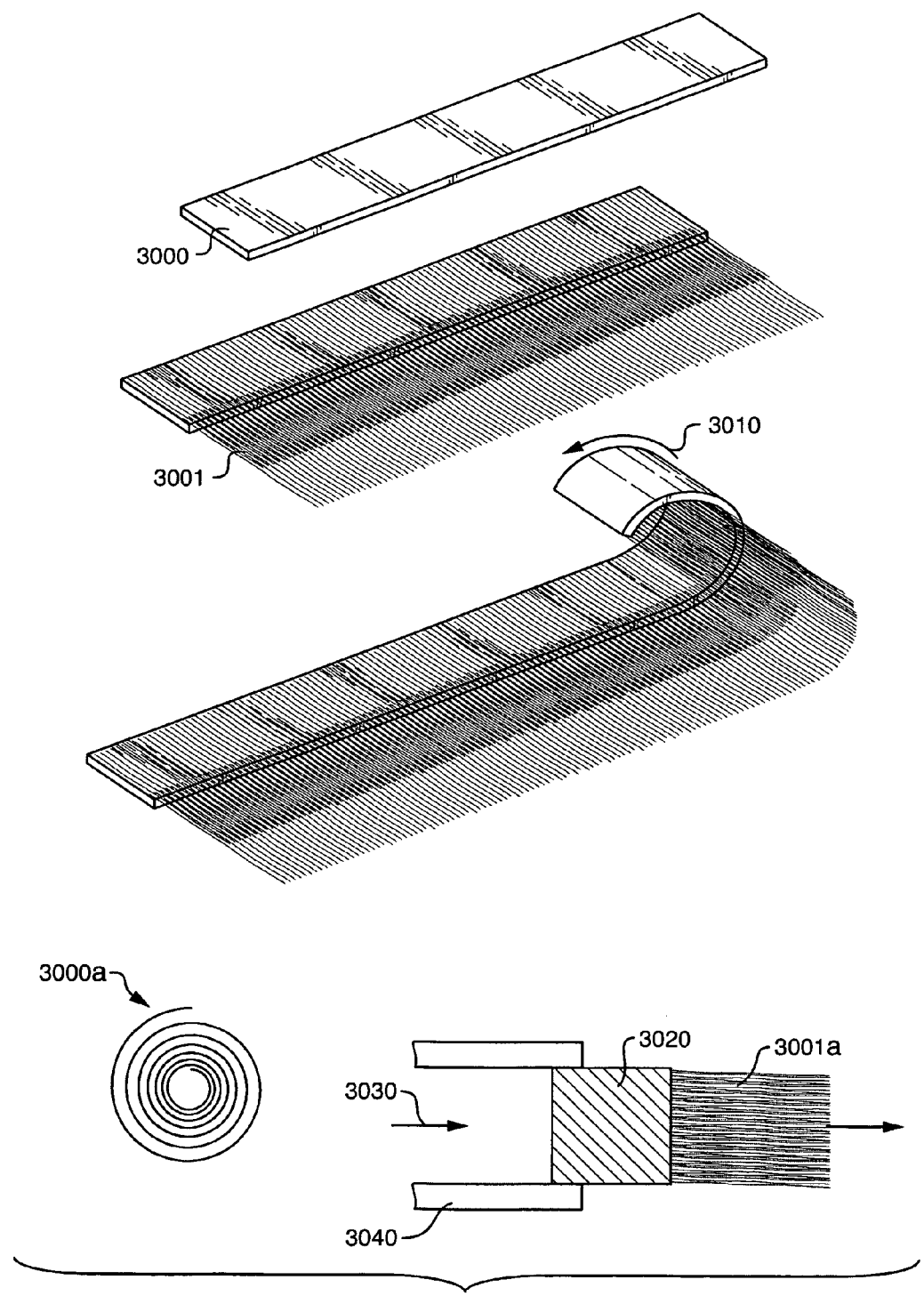
FIG. 19 shows an exemplary method for processing a substrate for the growth of long, aligned nanostructures, where nanostructures are first grown from growth sites on a flexible sheet, tape, or strip; then the substrate is rolled; then the substrate is assembled in an apparatus and the growth of nanostructures is continued.

FIG. 19 illustrates an additional exemplary method of substrate preparation by rolling, where nanostructures 3001 are first grown on the substrate 3000 prior to rolling, and then rolling process 3010 produces a spiral roll structure 3000A having nanostructures extending from one face of the spiral. Subsequently, the substrate is packaged in assembly 3020 in enclosure 3040, and flow 3030 is passed through the spiral, for continued growth of the nanostructures as 3001A under appropriate reaction conditions, which are issued outward from the assembly containing the rolled substrate.

Figure 20:
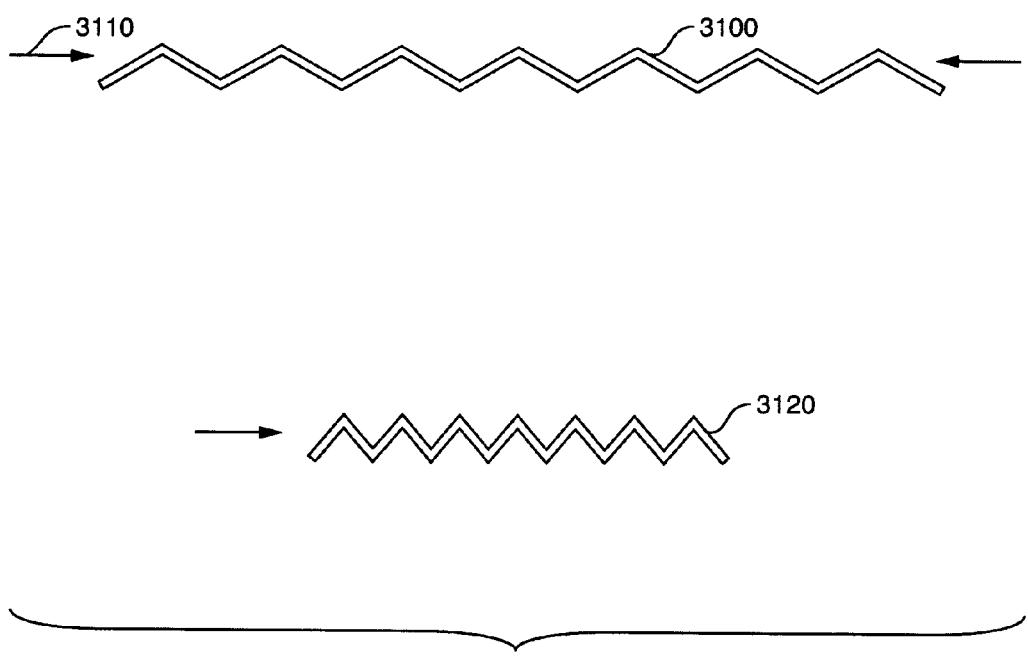
FIG. 20 shows an exemplary method for preparing a substrate for the growth of nanostructures, where the substrate is folded from flexible thin substrate such as a sheet, tape, or strip.

FIG. 20 illustrates an exemplary method of substrate preparation by folding, where substrate 3100 is compacted by force 3110, to produce tightly folded substrate 3120, which is used for the growth of nanostructures by placing the substrate in a flow path within a growth apparatus in accordance with the present invention.

Figure 21:
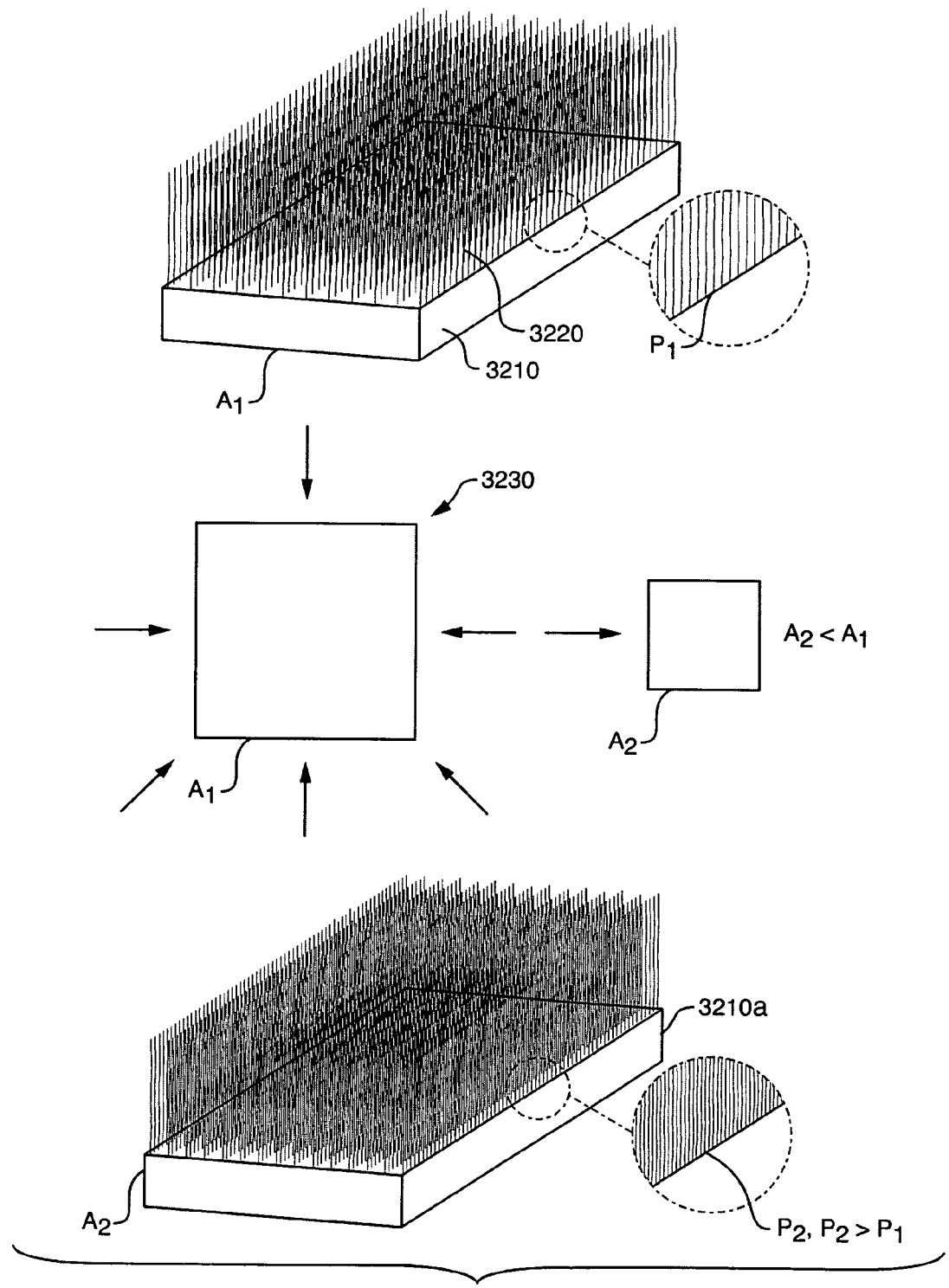
FIG. 21 shows a schematic representation of a process which increases the density of nanostructures on a substrate.

FIG. 21 schematically illustrates a process of two-dimensionally compacting a substrate to achieve a higher density of nanostructures on the substrate, such as a vertically aligned film of carbon nanotubes having a higher number of nanotubes per area. Nanostructures 3220 are first grown on substrate 3210, and then the substrate is compacted by action 3230 to decrease its cross-sectional area in one or two directions as in 3210A, giving a higher density of nanostructures on the substrate. One aspect of the invention is to first grow nanostructures to a prescribed length (and for a prescribed duration) on a substrate in a conventional apparatus such as in a tube furnace, then densify the substrate, then package the densified substrate in an apparatus for the continued and indefinite growth of long nanostructures. In this case, the short nanostructures may be lengthened indefinitely by processing in the second apparatus. For example, the substrate may be a porous substrate having nanostructures growing from sites within the pores, which is heated resistively.

Figure 22:
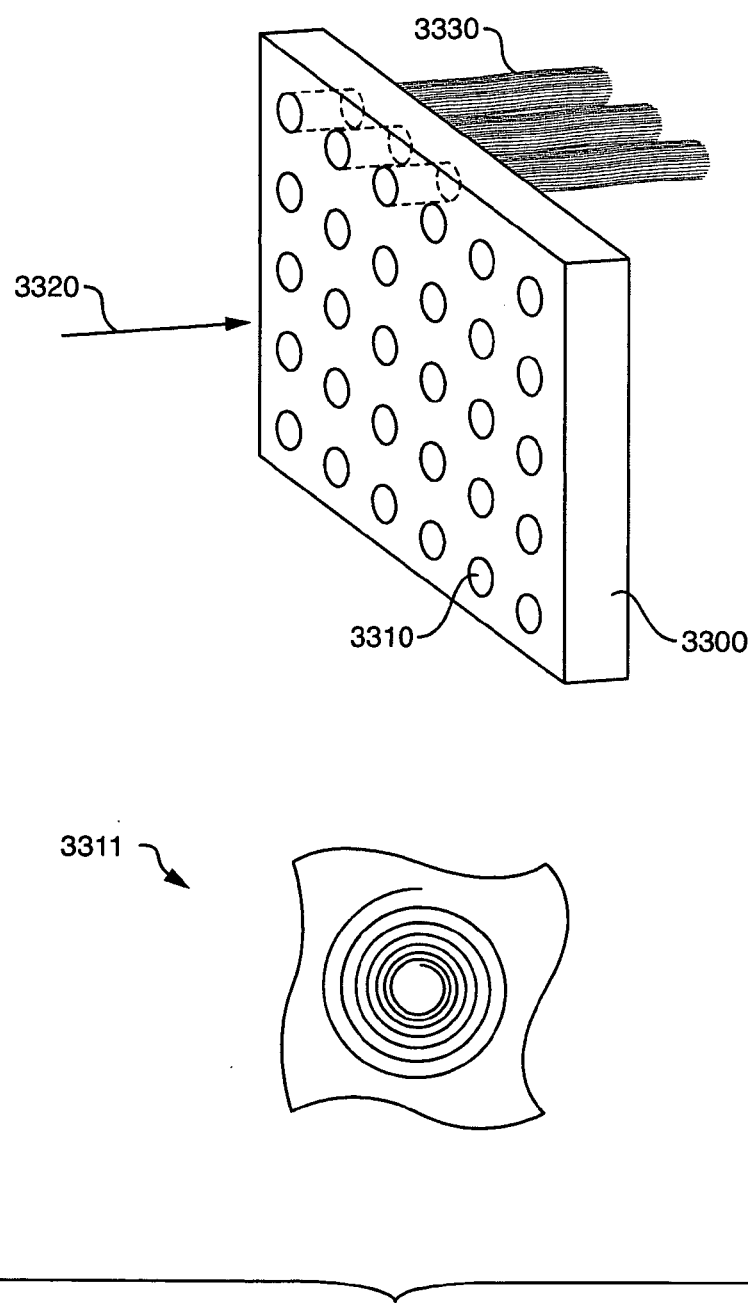
FIG. 22 shows an exemplary method for growing long nanostructures, where a plurality of substrates are held within holes in a plate, and a flow is directed perpendicular to the plate surface.

FIG. 22 illustrates placement of a plurality of substrates for growth of long nanostructures, where plate 3300 contains a large number of holes 3310, where each hole can accept a substrate such as a rolled strip containing growth sites and/or nanostructures fixed to the growth sites, or a substrate containing growth sites and/or nanostructures fixed to the growth sites and having pores or microchannels. Flow 3320 through the plate is used for the growth of long nanostructures 3330.

Figure 23:
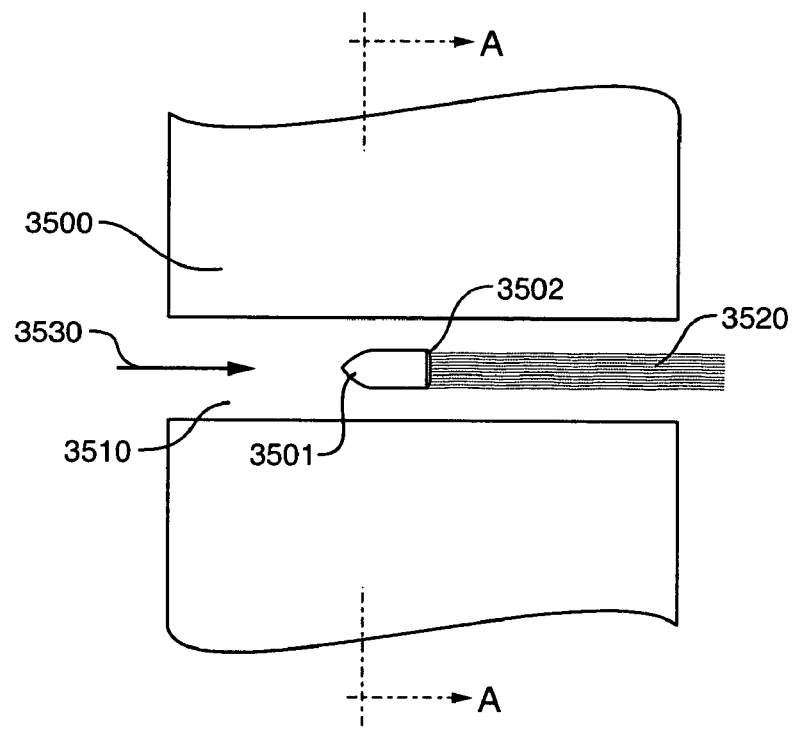
FIG. 23 illustrates an exemplary method for growing long nanostructures, where growth sites are positioned on an island positioned within a hole or microchannel in a substrate, which is positioned so the nanostructures grow in the direction and along the central axis of flow along the hole or microchannel.
Figure 23:
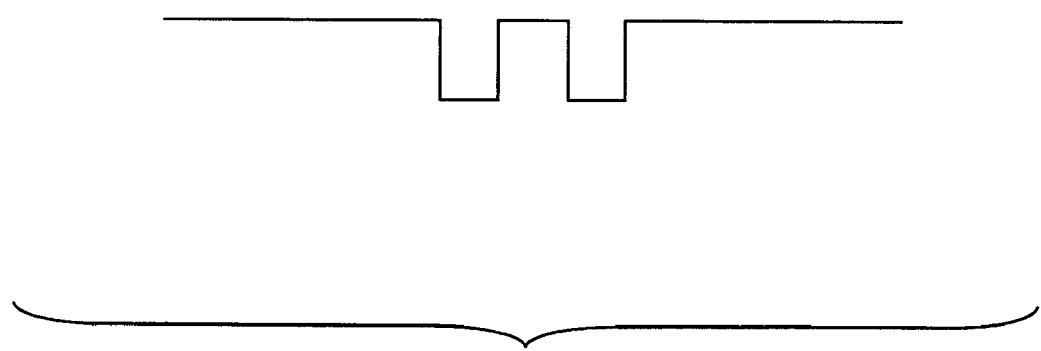
Figure 29:
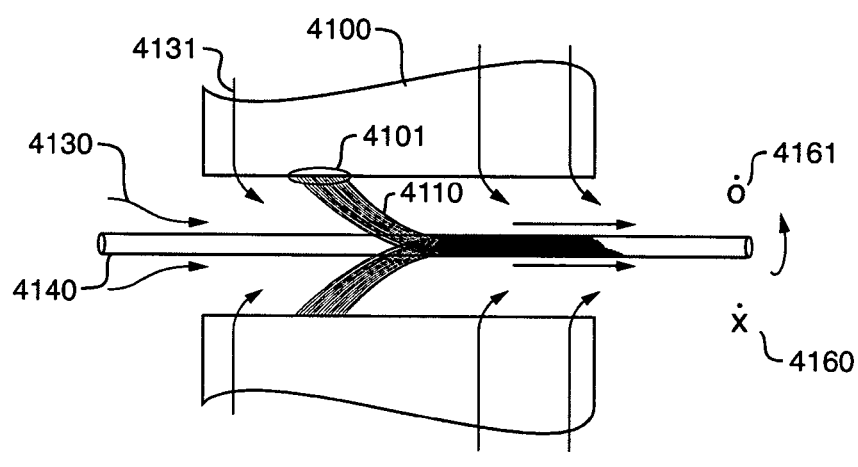
FIG. 29 collected on a second substrate which is moved along the central axis of the microchannel.

FIG. 23 is a schematic representation of placement of growth sites on a feature 3501 along the central axis of a microchannel 3510 within a substrate 3500, where the nanostructures 3520 originate from growth sites 3502. This feature may be in any form, such as an island, as illustrates here, or a wire, as illustrated in FIG. 29.

Figure 24:
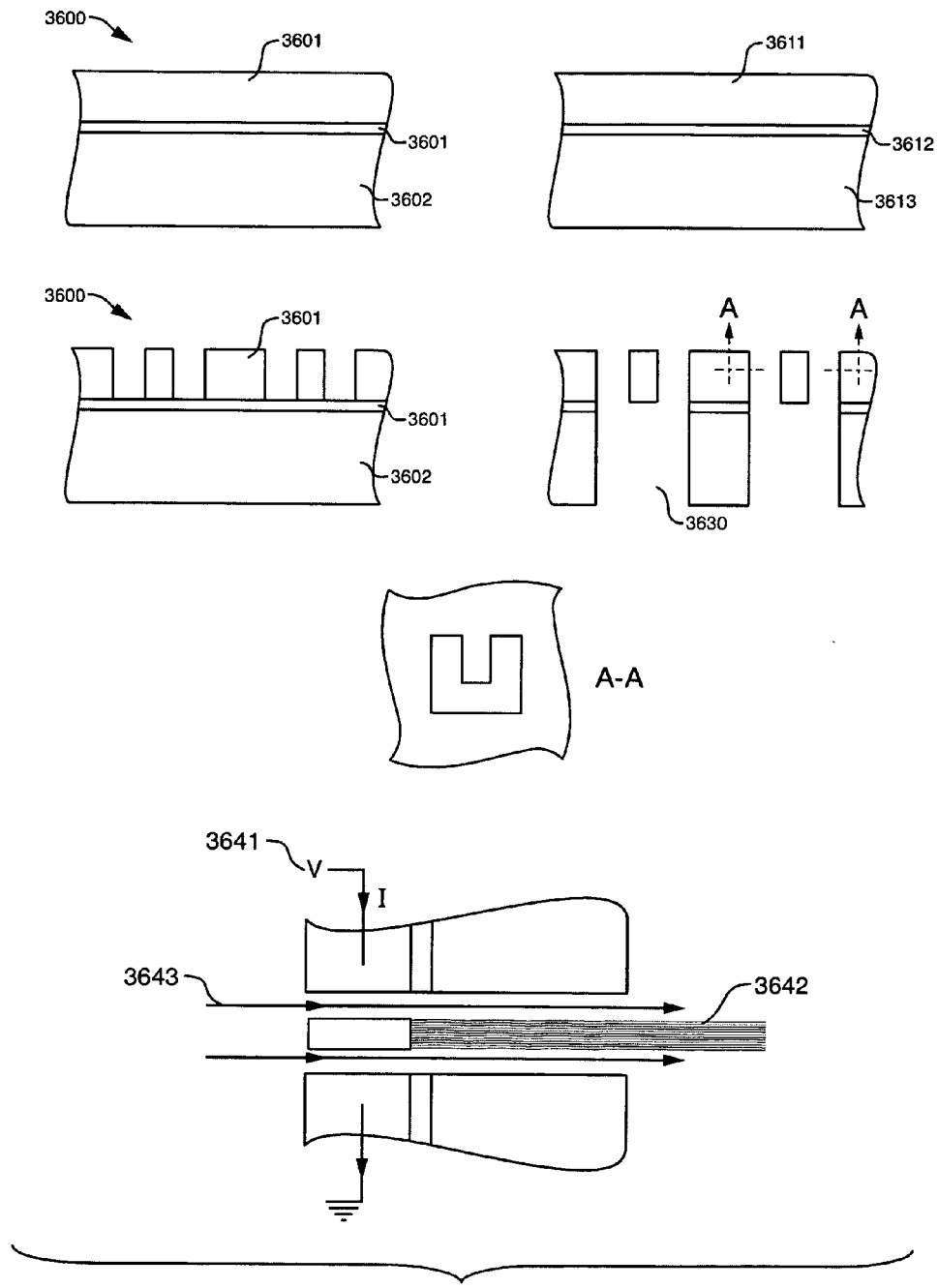
FIG. 24 illustrates an exemplary fabrication process for a substrate for the growth of long nanostructures, where the substrate is fabricated from a multilayer substrate such as a silicon-on-insulator (SOI) wafer.

FIG. 24 illustrates an exemplary fabrication process for a substrate for growth of nanostructures in accordance with the present invention, starting from a three-layer substrate such as a standard silicon-on-insulator (SOI) wafer. Substrate 3600 consists of a first layer 3601, such as a silicon layer ("device" layer), a second layer 3602, such as an $SiO_2$, and a third layer 3603, such as a silicon layer ("handle" layer). Optionally, the first layer may be made porous as in 3611, such as by electrochemical and/or acidic processing, while the second and third layers 3612 and 3613 remain as before. Cavities 3620 are etched into the first layer, and then cavities 3630 are etched into the third layer, and the second layer is removed where the cavities in the first and second layers are separated only by the second layer, so as to give through-substrate openings in these areas. Growth sites and necessary supporting materials are prepared and placed on the substrate surfaces, by any of several methods known to those skilled in the art, such as e-beam evaporation, magnetron sputtering, spin-coating, dip-coating, gas-phase delivery, etc. The substrate is contained in an apparatus for the continuous growth of nanostructures, where the top layer and growth sites are heated resistively by passing a current through the top layer as in 3641, leading to production of nanostructures along the direction of flow 3643. In this case, the growth sites are suspended on an element of the first layer which is placed along the central axis of the flow path through the substrate; however it is appreciated that the growth sites may be placed, and the fields and forces used to assist and direct nanostructures from surfaces within the flow path through the substrate may originate, from any elements of the apparatus described in accordance with the embodiments of the present invention.

Figure 25:
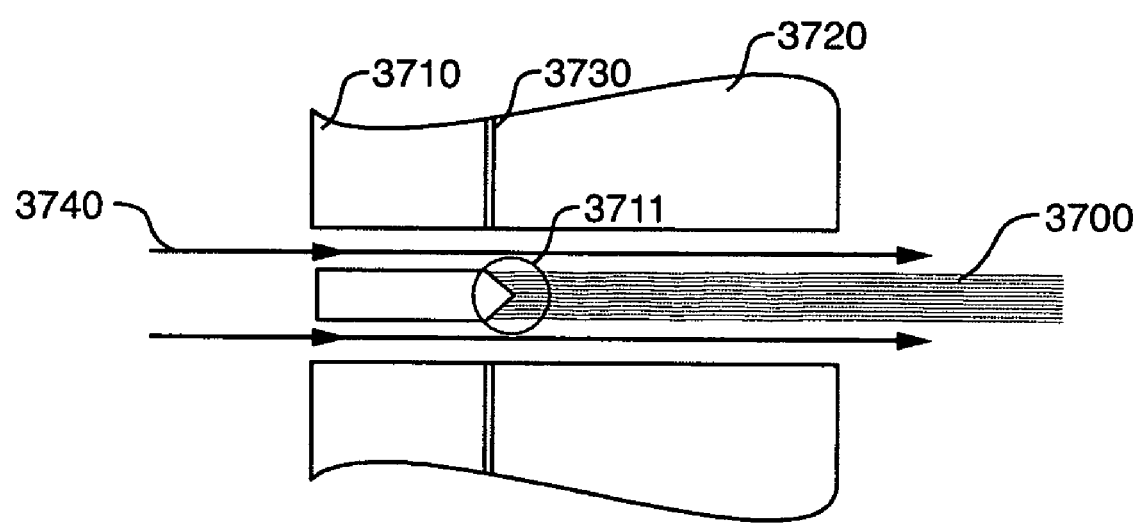
FIG. 25 illustrates an exemplary method for growing long nanostructures, where two substrates are stacked, and one substrate contains growth sites arranged on its surfaces, which anchor the growth of nanostructures from the first substrate, and along and through the primary axis of a passage through the second substrate.

FIG. 25 illustrates an exemplary substrate configuration for the continuous growth of nanostructures 3700 from the substrate, where the substrate is assembled from substrates 3710 and 3720. The microchannels or holes through the substrates are primarily aligned, and substrate 3710 contains protrusions which hold the growth sites and optionally extend into the flow path through substrate 3720. The substrates are optionally isolated by a barrier layer or material 3730, at the interface between the substrates. The surfaces on which the growth sites, such as 3711, are arranged, may be textured or structured as desired, such as a flat surface or a pointed or terraced surface. The growth of nanostructures is directed along the flow path through the microchannels or holes, with flow 3740.

Figure 26:
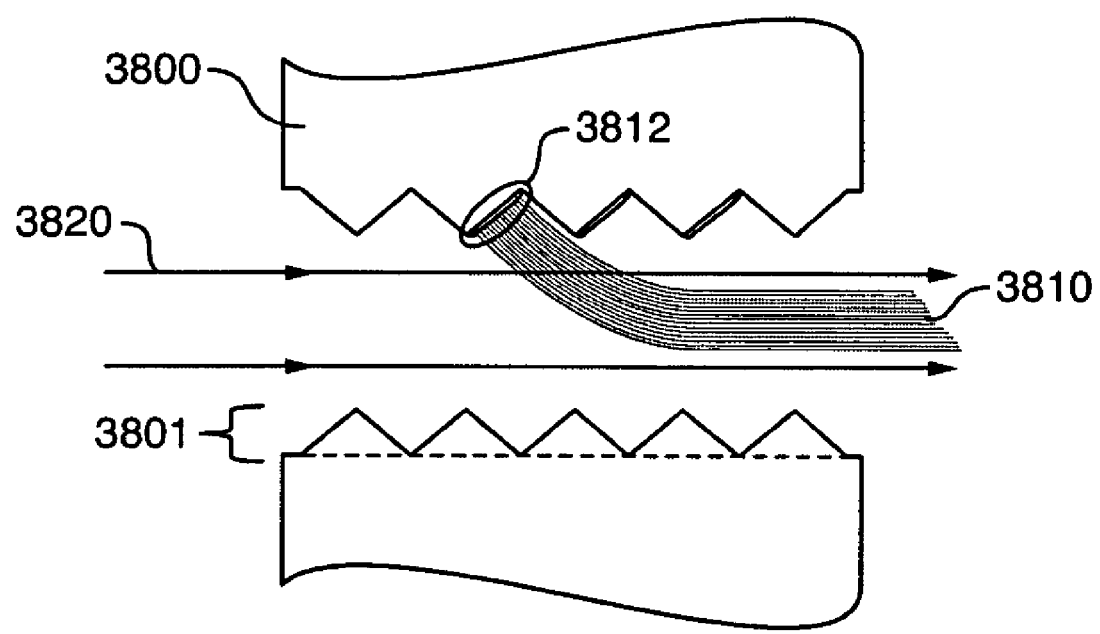
FIG. 26 shows an exemplary method for growing long nanostructures, where growth sites are positioned on angled surfaces fabricated within a hole or microchannel in a substrate, so as to direct the nanostructures toward the central axis of the hole or microchannel.

FIG. 26 illustrates an exemplary substrate configuration for growth of nanostructures from growth sites arranged within a hole, pore, or microchannel of a substrate 3800. The internal surfaces of the hole, pore, or microchannel are structured so as to initially direct the growth of nanostructures toward the central axis of the flow path. In this example, the surfaces are terraced as 3801, and growth sites are arranged on the terraced surfaces as shown for surface 3802, and the nanostructures are directed downstream through the path of flow 3820, and are continuously produced outward from the substrate.

Figure 27:
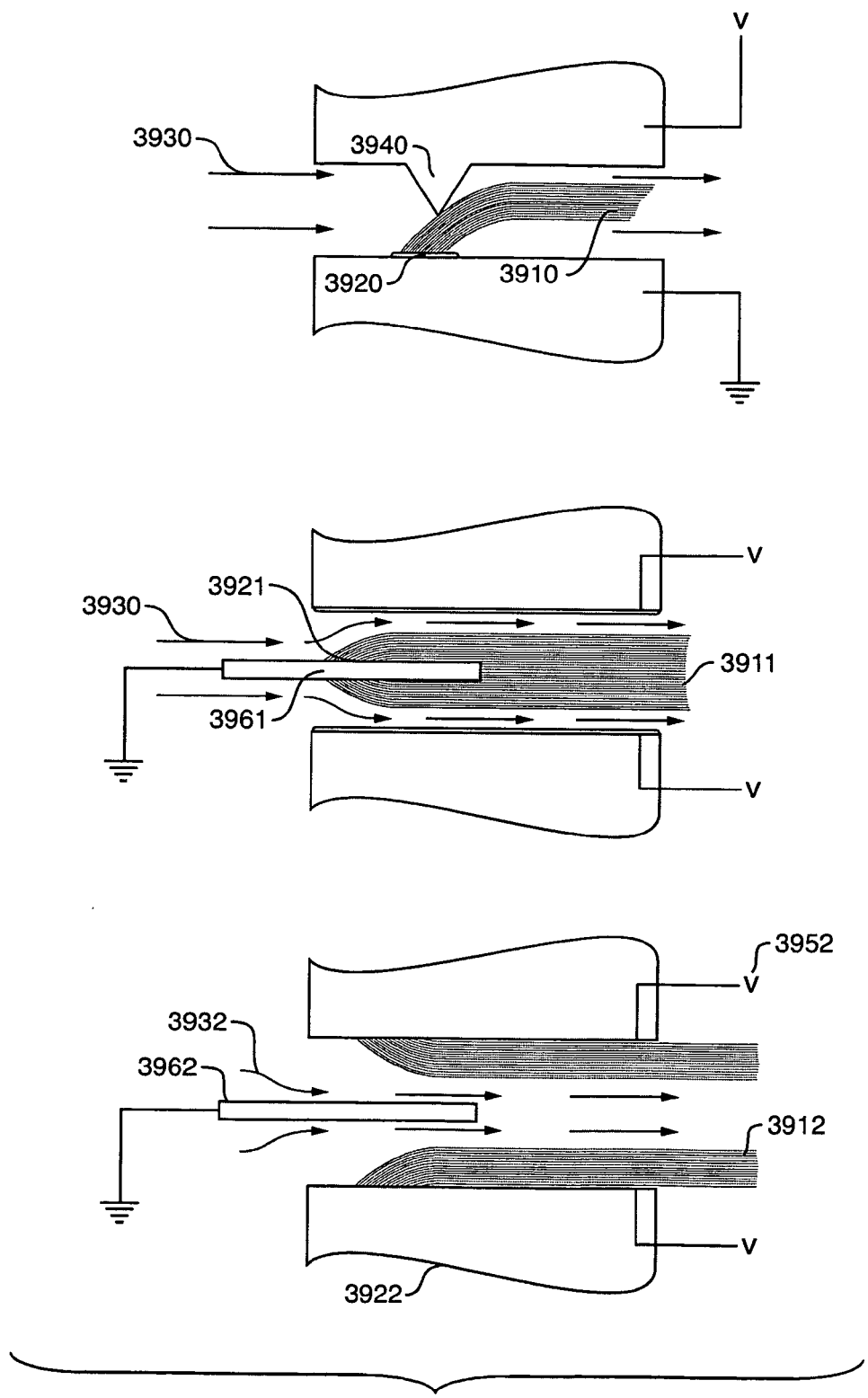
FIG. 27 illustrates exemplary methods for growing long nanostructures, where nanostructures grow from growth sites positioned within a microchannel or hole in a substrate, and growth is optionally assisted by application of an electric field between the nanostructures and an electrode element of the substrate apparatus.

FIG. 27 is a schematic representation of methods to apply an electric field to direct and assist the growth of nanostructures from growth sites positioned within a hole, pore, or microchannel. In the first case, flow 3930 directs growth of nanostructures from growth sites 3920, downstream through the microchannel, while an electric field 3950 is applied between the nanostructures and the substrate. Feature 3940, such as a sharp tip, such as a pyramidal structure etched in silicon, may be used to enhance the field strength in the proximity of the growth sites. In the second case, nanostructures 3911 grow from growth sites 3921 positioned on an element 3961 placed along the central axis of the microchannel, such as an electrically conductive wire, and are directed downstream by flow 3931. Electric field 3951 is applied between the substrate and the nanostructures. In the third case, an element 3962, such as an electrically conductive wire, is placed along the central axis of the microchannel, and nanostructures 3912 grow from growth sites 3922 positioned on the internal walls of the microchannel. Electric field 3952 is applied between the nanostructures (by electrical contact to the substrate and the electrode. The nanostructures are directed downstream by the flow 3932. While these drawings typically show only a single hole, pore, or microchannel, it is appreciated that a plurality of holes, pores, or microchannels are typically distributed throughout a substrate, so as to enable growth of nanostructures from large substrate areas.

Figure 28:
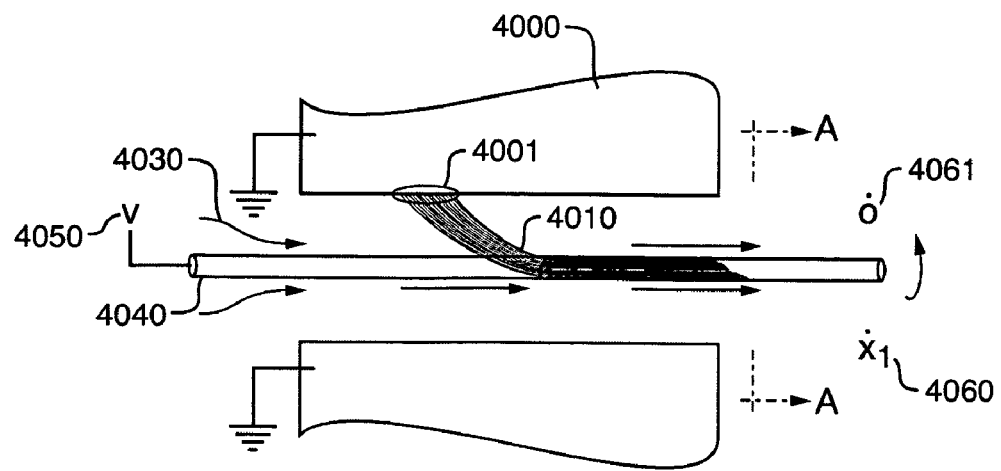
FIG. 28 shows an exemplary method for growing long nanostructures, where nanostructures are deposited on a collector which moves along the central axis of a hole or microchannel, and an electric field is optionally applied between the growth substrate and the core of the collector.
Figure 28:
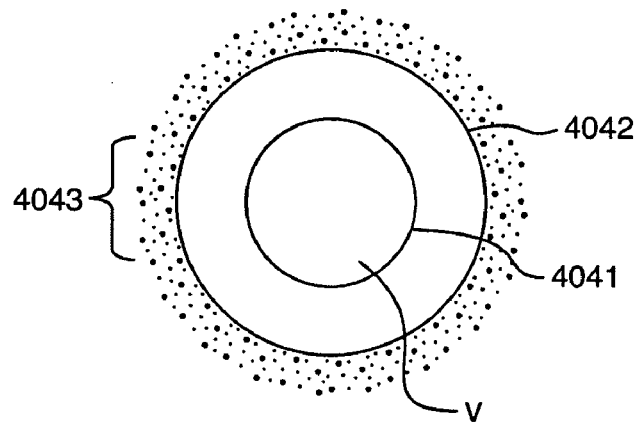

FIG. 28 illustrates an exemplary apparatus for growth of nanostructures from growth sites arranged within a hole, pore, or microchannel of a substrate 4000. Nanostructures 4010 grow from growth sites 4001, and are directed along the central axis of the hole, pore, or microchannel, in the primary direction of flow 4030. A slender element 4040 such as a wire is placed in along the central axis, and optionally an electric field 4050 is applied between the substrate and the wire. In this case, the wire may be structured to consist of a conducting core 4041, and an insulating coating 4042, to prevent the nanostructures from shorting the electrical path from the substrate to the wire. The nanostructures collect on the wire as schematically shown 4043. The terminal (starting) ends of the nanostructures, and the nanostructures are continuously drawn onto the wire as growth proceeds. The wire may be moved with respect to the central axis with axial motion 4060, and/or rotating motion 4061. In one embodiment, the wire may exert a pull force on the nanostructures which acts to assist the growth of nanostructures at the growth sites.

FIG. 29 illustrates an exemplary apparatus, wherein the substrate material is porous, which allows an additional flow 4131 to pass through the surfaces of the substrate and reach the growth sites such as those indicated 4101, placed on the internal surfaces of a hole, pore, or microchannel which is fabricated within the substrate which is itself made of a porous material. The pores of the substrate material are substantially smaller than the holes, pores, or microchannels which are fabricated secondarily in the substrate and act as the cavities for growth of aligned nanostructures 4110.

Figure 30:
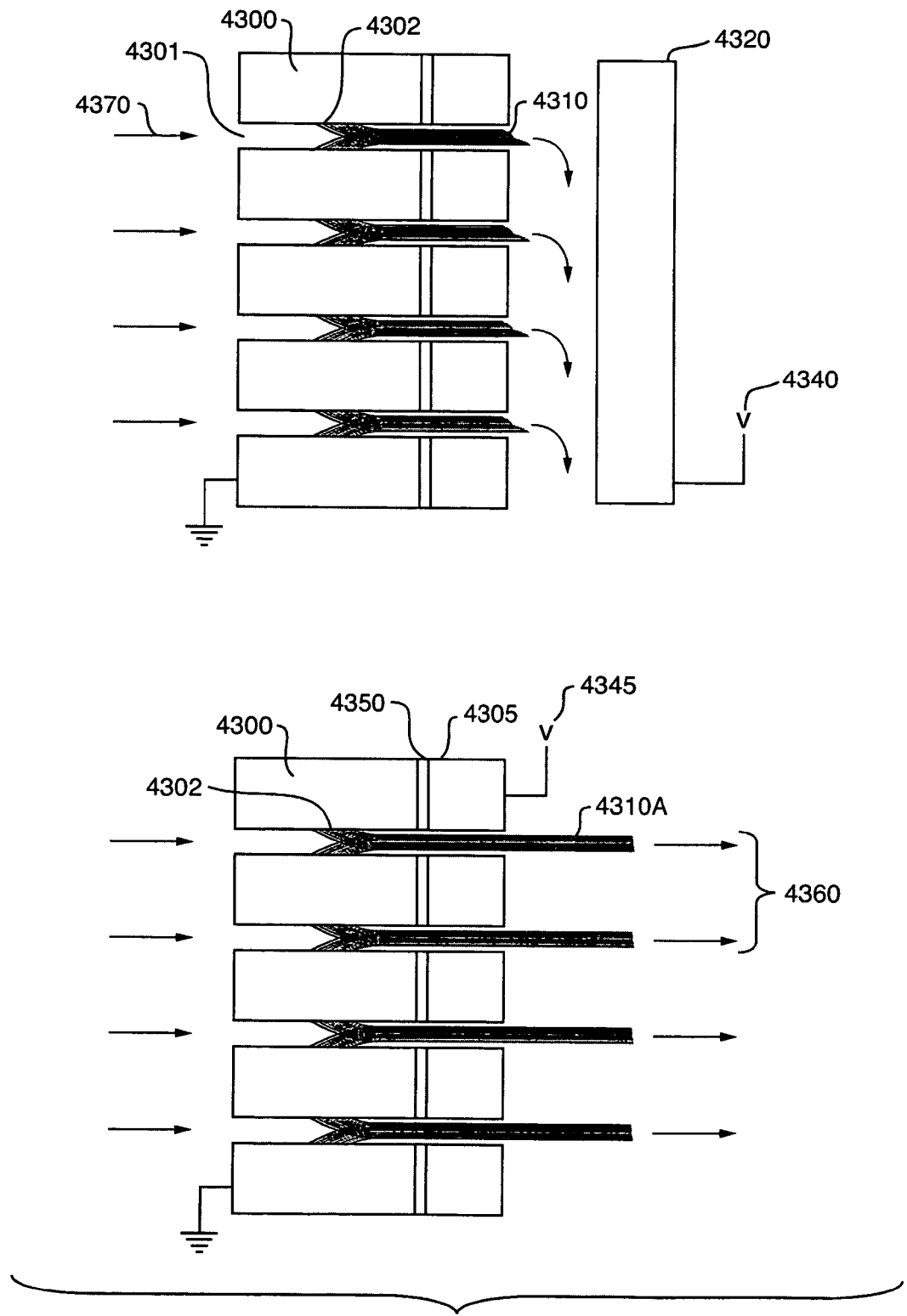
FIG. 30 shows an exemplary two-stage method for growing long nanostructures from a substrate.

FIG. 30 illustrates an exemplary two-stage method for growing long nanostructures from a substrate. A primary substrate 4300 contains holes, pores, or microchannels, for example microchannel 4301 as indicated, with growth sites such as 4302 arranged on the surfaces of the microchannel. In the first stage, the growth substrate is a first electrode, and in this case is grounded, and a secondary substrate acting as the second electrode 4320 is placed adjacent and spaced from the growth substrate. An electric field, indicated by 4340, is applied between the primary and secondary substrates. The electric field, in conjunction with gas flow 4330, causes growth of aligned nanostructures from the growth sites, and the nanostructures grow out of the microchannels in the substrate. In the second stage, the secondary substrate is removed, and the growth of nanostructures is continued, desirably in a continuous fashion, such that the nanostructures surpass the position of the secondary substrate in the first stage. The length of the nanostructures increases with continued growth, as in 4310A. The nanostructures may be handled downstream of the substrate, such as in region 4360, to facilitate assembly or collection of the nanostructures, in accordance with suitable embodiments described in the invention. An electric field indicated by 4345 may be applied between the growth substrate and a secondary portion 4305 of the growth substrate, separated by insulating layer 4350.

Figure 31:
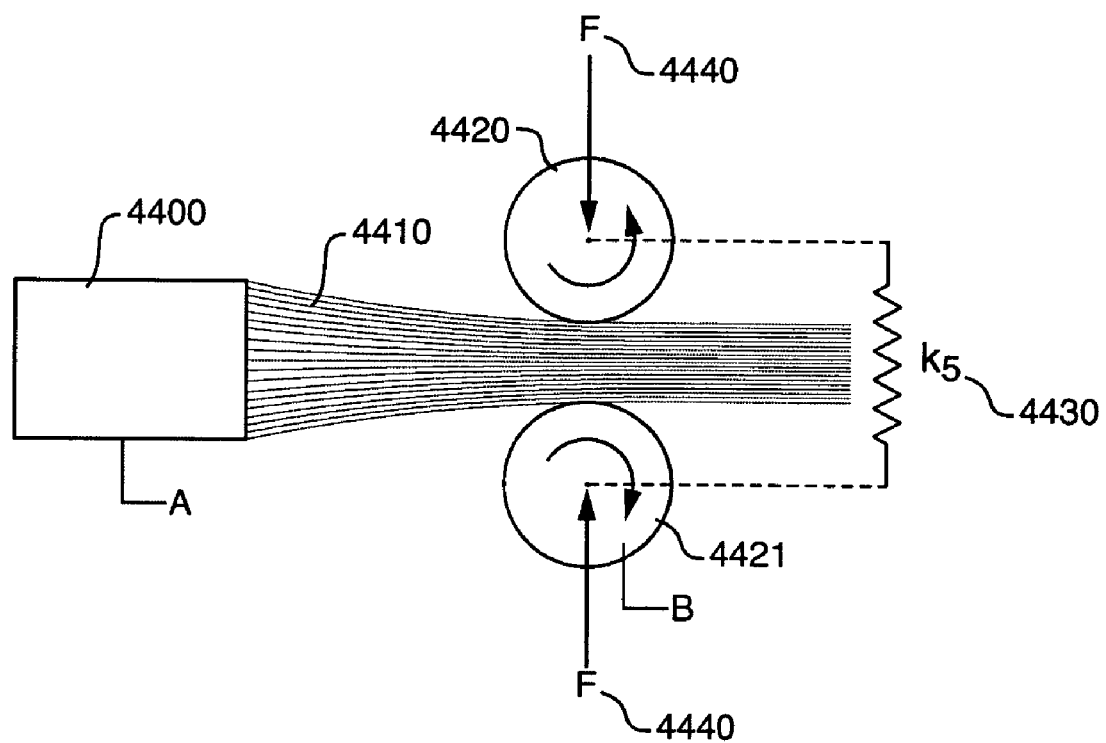
FIG. 31 shows how nanostructures can be collected, compacted, and pulled from a growth apparatus using rollers.

FIG. 31 illustrates an exemplary method for collecting nanostructures from a substrate apparatus in accordance with the present invention, such as from a resistively heated substrate containing growth sites arranged on the surfaces of holes, pores, or microchannels within the substrate. Nanostructures 4410 are produced from substrate apparatus 4400, and are captured by rollers 4420 and 4421, which act to densify the strand of nanostructures. A force 4440, through a mechanical stiffness 4430 connecting the rollers, may be applied to compact (densify) the arrangement the nanostructures, and to "pull" on the nanostructures, which can result on forces through the nanostructures and back to the growth sites contained within the substrate apparatus. While a single collection of nanostructures is shown, it is appreciated that multiple collections may be made from a single substrate apparatus, or a plurality of substrate apparatus may be arranged as desired to organize the collection of ordered configurations of nanostructures, such as by combining strands into larger strands or cables.

Figure 32A:
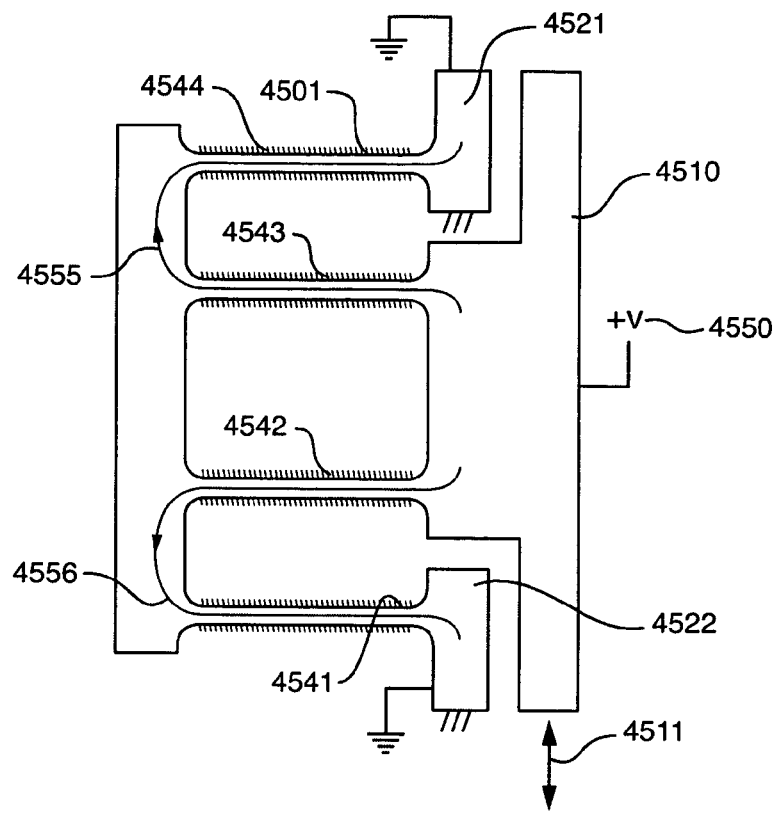
FIGS. 32A and 32B show two exemplary of applications of in-situ growth of nanostructures by resistive heating of microfabricated devices, or microelectromechanical systems (MEMS)

FIG. 32A shows an exemplary application of nanostructure growth on moving mechanical parts of a micro-fabricated device to increase damping. A double parallelogram straight-guiding mechanism, well known to those skilled in the art, is shown. A shuttle 4510, connected by two flexures 4542 and 4543 to an auxiliary shuttle 4530, which is in turn fixed to anchors 4521 and 4522 that are part of or rigidly connected to an essentially rigid base. The mechanism ideally allows motion of shuttle 4510 only in the direction indicated by arrow 4511. Before operation of the device which is fabricated from electrically conductive material, the flexures 4541, 4542, 4543, and 4544 are resistively heated to a temperature relevant for nanostructure growth, by applying a voltage 4550 between the shuttle 4510 and the base 4521 and 4511, resulting in a current 4555 and 4556 through the flexures. Upon the supply of reaction species (not shown) nanostructures 4501 form on the flexures, providing extra mechanical damping during operation.

Figure 32B:
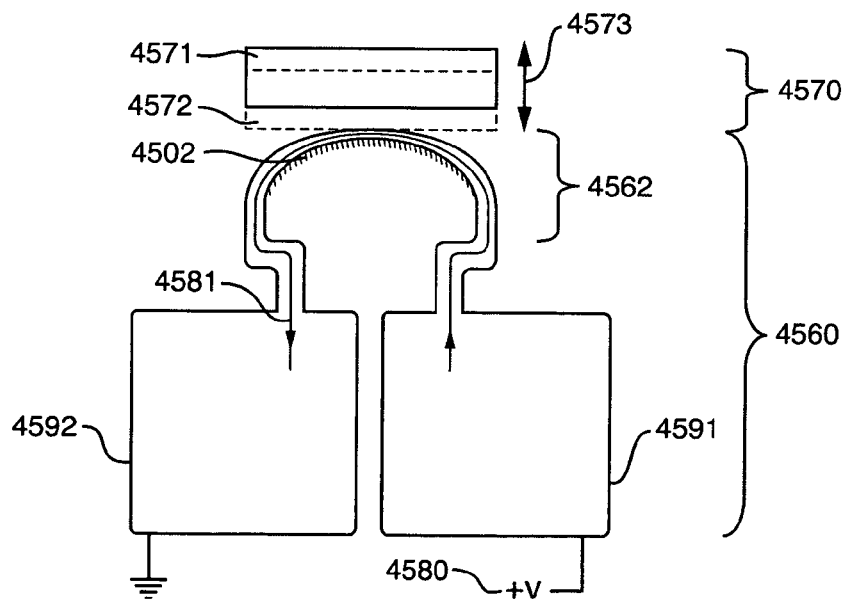

FIG. 32B shows an exemplary application of nanostructure growth on electrical contacts in a micro-fabricated device to improve contact characteristics. A moving electrode 4570 can be actuated to move relative to a fixed electrode 4560, in the direction of 4573, forming a relay. The moving electrode is shown in open position 4571 and in dashed line in closed position 4572. Before operation of the device, that is fabricated from electrically conductive material, compliant contact 4562 is resistively heated to a temperature relevant for nanostructure growth, by applying a voltage 4580 between one contact pad 4591 and another contact pad 4592, resulting in a current 4581 flowing through the compliant contact 4562. Upon the supply of reaction species (not shown) nanostructures 4502 form on the compliant contact, improving contact characteristics of the relay. During operation moving electrode 4570 contacts contact electrode 4562 and the contact 4575 is improved in terms of resistance, durability, and/or mechanical damping.

As suggested by the drawings, a primary embodiment of the invention is to place growth sites for nanostructures on internal surfaces of holes, pores, or microchannels in a substrate, and to produce nanostructures continuously from the substrate, where the nanostructures are directed along the primary axes of the holes, pores, or microchannels in the substrate. Preferably, each hole, pore, or microchannel constrains the growth of one, or several, or a large number of nanostructures, and the nanostructures are manipulated to form larger groupings, or placed in desired groupings, after exiting the substrate. Manipulation may occur continuously, as continuous nanostructures are "fed" out of the substrate, and for example are twisted or woven into larger groupings beyond the exit of the substrate apparatus.

A hole, pore, or microchannel in accordance with the present invention is defined as a cavity or series of interconnected cavities within a substrate, which enables passage of fluid (e.g. a gas or liquid) in from a first external surface of the substrate, through the interior of the substrate, and out a second external surface of the substrate. In one embodiment, the substrate is a plate geometry such as a silicon wafer, having two of its three orthogonal cross-sectional dimensions much greater than the third dimension (e.g. 150 mm diameter, 0.6 mm thickness). Holes or microchannels extend from one face of a substrate to the opposite face, and may have primary axes positioned at any orientation with respect to the faces of the substrate, including being parallel to each other and primarily perpendicular to the surfaces of the substrate, and/or may be networked (e.g. branching, splitting, or combining) within the substrate. Further, while the cavities can have any dimensions, it is appreciated that holes or microchannels typically have an aspect ratio greater than two and more typically greater than ten, and that the aspect ratio of the nanostructures which are grown from growth sites arranged on the surfaces of the holes or microchannels is typically greater than the aspect ratio of the holes or microchannels. Further, a porous substrate typically contains a large number of interconnected, arbitrarily shaped, voids, which may be any dimension but are typically much smaller in cross-section than all external surfaces of the substrate. For example, a porous substrate may be additively fabricated, for example by pressing or sintering a plurality of small elements so as to leave an interconnected network of pores between the elements, or may be subtractively fabricated, for example by electrochemical etching or electrical discharge machining. The material (e.g. catalyst metal) constituting the growth sites, or precursors to the growth sites, may be mated with the structure of the porous substrate during the fabrication process, for example by pressing a $Fe/Al_2O_3$ powder or by placing Fe salt in a solution used during electrochemical etching of Al.

The method of arranging the growth sites primarily on internal surfaces of holes, pores, or microchannels within a substrate substantially increases the number of nanostructures which can be grown from the substrate, compared to a method which arranges the growth sites primarily on external surfaces of the substrate. To quantitatively illustrate this advantage, we consider an example. In the first case, the substrate is a silicon wafer with an array of microchannels etched through the wafer. The wafer face has surface area A, the wafer has thickness t, and the microchannels each have a circular cross-section with diameter d. The microchannels are patterned such that the spacing between the central axes of the microchannels is 2d, and the microchannel pattern fully covers the face of the wafer. The microchannels extend fully through the wafer thickness, so the channels have length l=t. Therefore, the total area of the internal surfaces of the microchannels is $$A_{mc} = \left(\frac{\sqrt{A}}{2d}\right)^2 (\pi d)t = \frac{A\pi t}{4d} \quad (1)$$

Therefore, the ratio of the area of the wafer face to the total internal surface area of the microchannels is $$\frac{A}{A_{mc}} = \frac{\pi t}{4d} \quad (2)$$

For example, if the wafer has t=1000 μm, and the microchannels have d=25 μm, the area ratio is 31.4. Assuming growth sites can be distributed at an equal density on all surfaces of the wafer, 31.4 times the number of nanostructures can be grown from the substrate when the growth sites are distributed on the internal surfaces of the microchannels, and the nanostructures are guided to exit the microchannels in a continuous growth fashion. Similar advantages can be achieved using a porous substrate, rolled substrate or a substrate with an array of holes, where each hole contains a rolled substrate.

By guiding the nanostructures from the internal cavities in a substrate, and out of the substrate, it is appreciated that the nanostructures may be necessarily bent or deformed during growth; however in most cases this deformation will be reversible. Forces applied to the nanostructures during growth cause this bending, such as forces induced on the nanostructures by fluid flows through the apparatus or electric fields introduced in the growth apparatus.

Further, The continuous growth of nanostructures refers to growth of nanostructures having continuous and indefinite length, as well as production of assemblies of nanostructures having prescribed lengths, using apparatus in accordance with the present invention.

A number of important coupled mechanical and chemical effects on continued growth of aligned CNT structures from substrates can be observed when studying growth of films and microstructures of vertically-aligned CNTs in a tube furnace system. These observations motivate the embodiments of the present invention, in establishing simultaneous chemical and mechanical control of the process of growing nanostructures. This example also suggests chemical processes, namely combinations of reactants and catalysts, which can be used in accordance with the embodiments of the invention.

For example, a catalyst film of $^1/_{10}$ nm $Fe/Al_2O_3$ is deposited by e-beam evaporation in a single pump-down cycle using a Temescal VES-2550 with a FDC-8000 Film Deposition Controller. The film thickness is measured during deposition using a quartz crystal monitor, and later confirmed by Rutherford backscattering spectrometry (RBS). The substrates are plain (100) 6" silicon wafers (p-type, 1-10 Ω-cm, Silicon Quest International), which have been cleaned using a standard piranha (3:1 $H_2SO_4:H_2O_2$) solution. Because the $Al_2O_3$ is deposited by direct evaporation from a crucible of high-purity crystals, rather than by evaporation of Al, or by other methods such as spin-coating of a sol-gel precursor, we do not need to consider a dedicated oxidation or curing step prior to CNT growth. Catalyst patterns are fabricated by lift-off of a 1 μm layer of image-reversal photoresist (AZ-5214E): the photoresist is patterned by photolithography, catalyst is deposited over the entire wafer surface, and then the areas of catalyst on photoresist are removed by soaking in acetone for 5 minutes, with mild sonication.

CNT growth is performed in a single-zone atmospheric pressure quartz tube furnace, having an inside diameter of 22 mm and a 30 cm long heating zone, using flows of Ar (99.999%, Airgas) or He (99.999%, Airgas), $C_2H_4$ (99.5%, Airgas), and H (99.999%, BOC). The furnace temperature is ramped to the setpoint temperature in 10-30 minutes and held for an additional 5-15 minutes. The flows of Ar and $H_2$ used during growth are established 15-45 minutes prior to introducing $C_2H_4$ to appropriately pre-condition (e.g., chemically reduce) the catalyst, then the $C_2H_4/H_2/Ar$ mixture is maintained for the growth period of 15-60 minutes. Finally, the $H_2$ and $C_2H_4$ flows are discontinued, and Ar is maintained for 10 more minutes to displace the reactant gases from the tube, before being reduced to a trickle while the furnace cools to below 100° C.

Samples are characterized by SEM using a Philips XL30-FEG-ESEM typically at 5 keV, by HRTEM using a JEOL-2010 typically at 200 keV, and by Raman spectroscopy using a Kaiser Hololab 5000R Raman Microprobe, with 514.5 nm (2.41 eV) Argon-Ion excitation (Coherent). TEM samples are prepared by removing a piece of the aligned CNT film with tweezers, dispersing the CNTs in methanol by vortexing for 2 minutes and sonicating mildly for 30 minutes, and air-drying a drop of the solution on a copper grid coated with a holey carbon film. For Raman spectroscopy, a piece of the CNT film is placed on a clean silicon substrate and covered by a few drops of isopropanol. Surface tension forces during drying compact the CNTs on the substrate, and the microscope is focused to maximize the G-band intensity from a strand of CNTs oriented mainly perpendicular to the laser beam.

Millimeter-tall vertically-aligned CNT (VA-CNT) structures are grown from the Fe/$Al_2O_3$ film processed in 100/500/200 sccm $C_2H_4$ at 750° C. The structures grow rapidly, reaching 0.9 mm height in 15 minutes, and terminating at 1.8 mm height after 60 minutes. The average growth rate of 1 µm/s during the first 15 minutes indicates that approximately 9,300 circumferential floors of carbon atoms per second are added to each CNT. The CNTs are oriented primarily perpendicular to the substrate and are isolated or are clustered in bundles as large as 0.1 µm diameter, in which the CNTs are held closely together by surface forces. HRTEM examination shows that the CNTs are primarily multi-walled and tubular without bamboo-like crossovers. The CNTs average approximately 8 nm OD and 5 nm ID, and most have 3-7 concentric parallel walls. By SEM examination, metal clusters are routinely observed at the roots of CNTs ripped from the substrate; however, in thorough TEM examination, we did not observe any metal particles along the CNTs. Therefore, the CNTs grow by a base growth mechanism, where the catalyst particle remains on the substrate and new carbon is added there. The alignment and density of CNTs appears the same (excluding stress effects discussed later) from the top to bottom of the film walls, suggesting that the structures consist primarily of CNTs extending fully through the thickness. A Raman spectrum of samples shows a typical signature of MWNTs, having a G-band peak centered near 1582 $cm^{-1}$, a G/D ratio slightly greater than unity, and a shoulder peak near 1620 $cm^{-1}$. This is compared to the Raman spectrum of a SWNT film grown from a Mo/Fe/$Al_2O_3$ film in $CH_4$/$H_2$, which has a much sharper G-band peak near 1591 $cm^{-1}$ and a much higher G/D ratio.

When the catalyst film is patterned, CNT structures having identical cross-sections can be grown in large arrays, and complex shapes can be defined. Growth depends strongly on the areal density of catalyst, as the growth rate and the final height of a CNT structure vary with its cross-sectional size and shape, and with the size and arrangement of nearby features. This is a reverse analogue to loading and microloading effects observed in plasma etching processes, where the etch rate is affected by the local pattern density, and high-density patterns etch at a slower rate due to local depletion of etchant species. In general, for catalyst shapes having roughly equal length and width such as squares and circles, larger cross-sections grow into taller CNT structures, and high-density arrangements of shapes grow taller than low-density arrangements. This behavior is mediated by the local supply of active hydrocarbon to the catalyst, where larger features starve smaller features of reactants. Significant loading effects are typically observed over 0.1-1 mm distances on the substrate, and are more pronounced when a high partial flow of Ar is used. At these length scales, and among growing structures which obstruct the gas flow, gas circulation near the substrate is dominated by diffusion and natural convection. The observed loading effects further suggest that preconditioning the reactants by increasing the contact time with suitable catalytic compounds can significantly increase CNT yield.

Furthermore, smaller cross-sectional shapes are more prone to bend and collapse during growth, particularly due to differences in growth rate across the base. For example, circular features wider than approximately 20 µm typically remain self-standing. The CNTs growing from the smallest features patterned (3 µm diameter circles) are roughly aligned with one another and form single structures, which are often sharply bent and rest on the substrate. CNTs growing from much smaller patterned areas of catalyst would not be self-aligned. Oblong catalyst shapes, which grow into aligned CNT blades, are very prone to leaning. Self-stability depends strongly on the packing density of CNTs within the aligned structure, which is related to many factors including the structure and particle density of the catalyst film, as well as the initial activity of the growth process in nucleating CNTs from the catalyst particles. Gravitational effects are insignificant for millimeter-scale growths, as the height of CNT structures is no different when the substrate is inverted so the catalyst faces downward during growth. Also, the weight of the CNT structures is far less than the force necessary to deflect the structures into the observed conformations.

The pattern of VA-CNT growth depends on the placement of the substrate in the furnace and the duration of $H_2$ pre-treatment prior to introduction of $C_2H_4$. These effects have been studied using three substrate configurations: open, where the growth substrate is rested in the center of the furnace tube, 40 mm downstream of the control thermocouple; capped, where a bare $Si_3N_4$ coated silicon substrate is placed on top of the growth substrate and held by gravity; and shielded, where a wider $Si_3N_4$ coated silicon substrate is spaced above the growth substrate by approximately 2.5 mm.

In the capped configuration, gas reaches the catalyst by diffusing into the gap (approximately 1 µm) between the substrates, and VA-CNT growth lifts the cap and therefore exerts a force. In the shielded configuration, flow proceeds through the gap and over the growth substrate at a lower velocity than in the open configuration, and flow circulation in the gap is smoothed by natural convection between the substrates.

The capped substrate has aligned growth around the periphery, with gradually decreasing thickness leading to a tangled region in the center area. The shielded substrate is fully covered with VA-CNTs. For 2.5 and 5 minutes of $H_2$ pre-treatment, the open and shielded substrates are fully covered with thick VA-CNTs, and the capped substrate shows increased VA-CNT coverage toward the center area. In all 1-5 minute cases, the film thickness on the shielded substrate is more uniform than on the open substrate, owing to the smooth gas flow pattern over the growth substrate. For $H_2$ pre-treatment exceeding 5 minutes, VA-CNT coverage decreases, and occurs primarily at the periphery of the substrates as well as in circular pillars at the center areas.

When CNT growth begins, a vertically-aligned morphology emerges if there is a sufficient density of growth sites (nanoparticles) to cause crowding among the CNTs. The growth sites must be chemically active, and there must be a sufficient carbon supply to feed all the sites simultaneously. If alignment is not achieved, tangled growth terminates shortly because of steric hindrance among the CNTs. Results demonstrate that $H_2$ promotes increased activity of $Al_2O_3$ supported Fe, and emphasize coupling between the flow distribution around the substrate and the reactant chemistry in mediating CNT growth. $H_2$ can increase the activity of metal catalysts for cracking hydrocarbons, as well as clean catalytic surfaces by etching polycyclic hydrocarbon species which tend to encapsulate metal surfaces. Reduction of the catalyst to metallic Fe by $H_2$ may promote improved CNT nucleation, yet prolonged treatment with $H_2$ may suppress growth by causing sintering of metal particles or altering metal-support interactions.

The shape of flow field around the substrate affects the pattern of growth because rapid growth of a VA-CNT film converts a large quantity of gaseous carbon into solid carbon. For example, assuming a 10 percent conversion rate of the hydrocarbon source, growth of VA-MWNTs (10 percent areal activity of catalyst, 5 walls per CNT) at 60 μm/min. requires approximately 16 sccm $C_2H_4$, while growth of 1 $cm^2$ of tangled SWNTs (1 percent areal activity of catalyst film) at 1 μm/min. requires approximately 0.35 sccm $CH_4$. In the latter case, the CNT growth rate is easily limited by the reaction rate at the catalyst particle and uniformity of growth is relatively unaffected by the flow profile around the substrate; in the former case, the conversion rate is a substantial fraction of the total carbon supply flowing through the furnace, and therefore spatial and temporal non-uniformities in the flow directly affect the growth pattern in areas where the catalyst does not receive enough feedstock.

The supply of gas to the catalyst is governed by the flow circulation within the boundary layer over the substrate. Therefore, as observed on the open substrate with 1 minute $H_2$ pre-treatment, areas in the wake of the leading edge of the boundary layer do not receive a sufficient circulation of active carbon species, leading to tangled growth in these areas. Overall, continuous spatial gradients in the rate of carbon supply to the catalyst cause nearly discrete spatial transitions from tangled to aligned growth. On capped substrates, gaseous carbon is consumed by the VA-CNT growth reaction around the periphery, and tangled growth occurs in the center area because the gas is restricted from and/or consumed before reaching the center area. Further, $H_2$ pre-treatment may increase the initial conversion rate of hydrocarbon at the catalyst, so areas receiving less circulation of $C_2H_4$ during the growth period are activated in the VA-CNT mode. For a given substrate size, the flow field around the substrate is relatively independent of the gas mixture, so changing the mixture to increase the concentration of active carbon species also increases the area on which vertical growth is active. However, once VA-CNT growth is established, it can proceed in a lesser supply of active species than is necessary for initiation. Furthermore, the gas activity depends on the time the gas spends at high temperature before reaching the catalyst. The film thickness varies by as much as an order of magnitude based on the position of the growth substrate along the hot zone of our furnace, and we find a sweet-spot giving the highest yield at 40-80 mm downstream from the location of the thermocouple.

The sharp transition and extreme yield (height) difference of approximately $10^3$ between neighboring tangled and vertically-aligned regions shows the importance of both mechanical and chemical effects in maintaining growth of continuous CNTs for long durations. When the CNTs become tangled, mechanical interactions between CNTs and with the substrate exert forces which oppose growth and may lead to deactivation; conversely, a self-aligned configuration reduces these unfavorable interactions. Further, strong effects of the areal density of catalyst, fluctuations in the supply of active carbon species, and film stresses, suggest that uniform and time-controlled chemical and mechanical conditions are essential for growing long CNTs over large areas.

Figure 33:
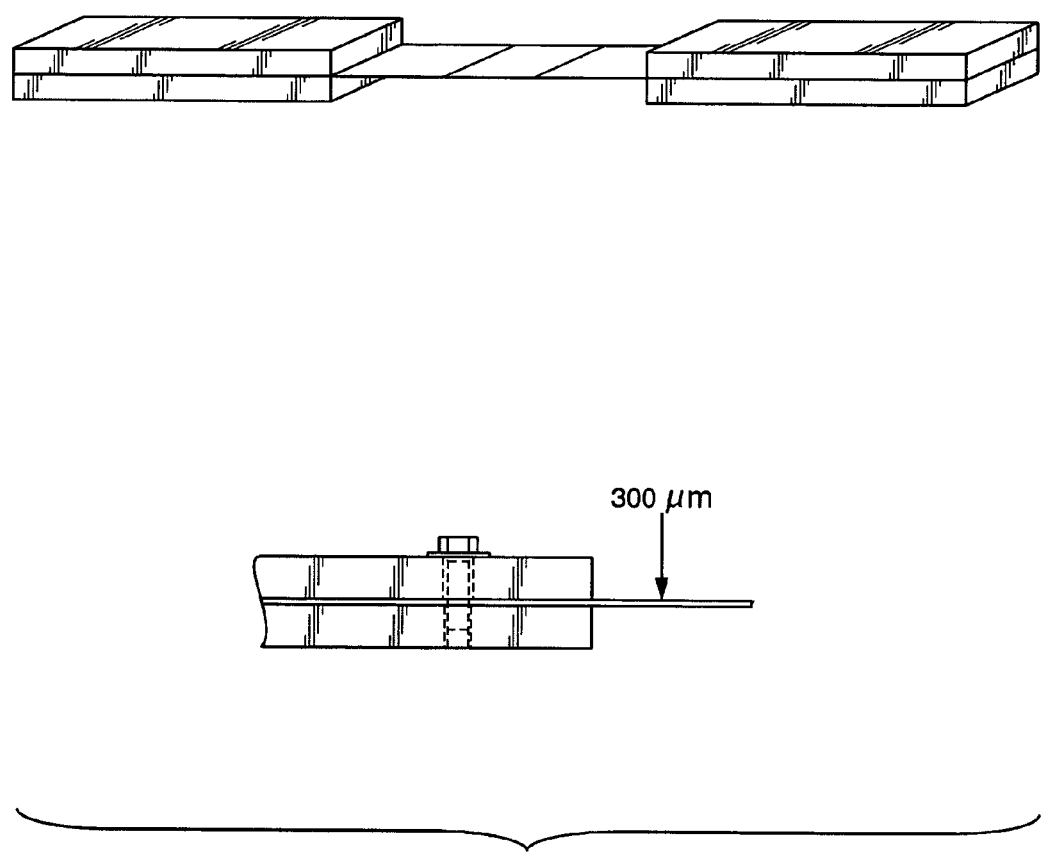
FIG. 33 shows a drawing of a suspended platform heater for rapid thermal control of a surface reaction.

In accordance with the present invention a silicon heater element (85×10×0.3 mm, shown in FIG. 33 is suspended and connected to a manually controlled current source, to enable rapid heating and cooling. This configuration minimizes thermal mass, thus decreasing the input power needed for given slew rate of heating as well as the time constant for cooling. The suspended resistive element (heated platform) is cleaved from a highly-doped silicon wafer ($N_A > 10^{18}$). The suspended platform is clamped between stainless steel (AISI 304) blocks, which serve as mechanical anchors and electrical contacts, and are allowed to move freely in response to thermal expansion. The contacts act as heat sinks to the platform, and remain below 500° C. without active cooling, as predicted by simulation and verified by measurement.

The resistivity of silicon is higher than that of steel, resulting in selective heating of the silicon, yet it is low enough to induce significant heating at limited voltage. Further, silicon is thermally stable to above 850° C. (as long as the substrate is not mechanically stressed so as to cause creep), and its resistivity decreases sharply with temperature above the intrinsic temperature, which results in stable operation when a current source is used.

In one mode of operation, a silicon substrate ($\approx$10 mm×10 mm×600 μm thickness) coated with the catalyst film for CNT growth is rested on the heated platform. Here, the optical flatness of the silicon platform and growth substrate ensure good thermal contact and only a small temperature drop between the platform surface and the reaction surface. Alternatively, the heated platform itself can be coated with catalyst and serve directly as the growth substrate. The heated platform may contain holes or pores, e.g. formed by electro discharge machining. Like a substrate containing no holes or pores, a second substrate may be placed on the platform containing holes or pores, or the platform containing holes or pores may be coated (before of after the formation of the holes or pores) with catalyst and serve as the growth substrate.

A list of symbols for the model of the resistively-heated substrate is as follows:

ε emissivity [dimensionless]
ρ resistivity [m]
φ heat flux [W/$m_2$]
q mass density [kg/$m_3$]
σ Stefan-Boltzmann constant=$5.67 \times 10_{-8}$[W/($m_2$ $K_4$)]
$T_o$ overall time constant [s], see eq. 13
$T_d$ time constant for di_usion [s], see eq. 10
$T_c$ time constant for convection [s], see eq. 11
$T_r$ time constant for radiation [s], see eq. 12
A cross sectional area [$m_2$]
C heat capacity [J/(kg K)]
I current [A]
Nu Nusselt number [dimensionless]
p perimeter [m]
Q dissipated power density [W/$m_3$]
Q* scaling factor for dissipated power density, see eq. 16
$R_{thermal}$ thermal resistance [K/W]
R* scaling factor for thermal resistance, see eq. 17
V volume [$m_3$]
h convection heat transfer coefficient [W/($m^2$ K)]
k thermal conductivity [W/(m K)]
p pressure [Pa]
r internal radius [m]
t time [s]
$t_w$ wall thickness [m]
u temperature [K] or [° C.]
$u_\infty$ temperature of surroundings [K]
$u_{SB}^-$ temperature at contact on steel block side
$u_{SB}^+$ temperature at contact on half heater side
w heat loss to surroundings [W/($m_2$ K)]
x position [m]
~ scaled variable, for example ~t
i domain index (SB or HH)
SB steel block
HH half heater A detailed model was created to investigate the thermal response of a silicon platform suspended between steel contacts. Assuming symmetry about the center of the substrate, there are two domains: the steel block (index SB) and half of the heater (HH). Both domains can be described by a PDE of the same form, where the contact between the domains is expressed in the boundary conditions. The resulting coupled PDEs are made non-dimensional by appropriate scaling, and the system is solved numerically using the MATLAB™ function PDEPE.m. The model makes the assumptions listed below.

Symmetry about the center of the substrate

The system is one-dimensional; therefore, the platform temperature is constant over its cross-section.

The steel electrodes have zero electrical resistivity.

There is constant thermal resistance between the steel electrodes and the silicon platform.

There is constant Ohmic contact between the steel electrodes and the silicon platform.

The surrounding atmosphere circulates sufficiently to maintain a constant ambient temperature The electrical resistivity of silicon is approximated by the bulk value for thermal equilibrium, meaning that thermoelectric effects like the Thomson effect are neglected, and the electric field does not create excess carriers.

Appropriate temperature-dependent physical properties for silicon and steel are as supplied by the literature.

Figure 34:
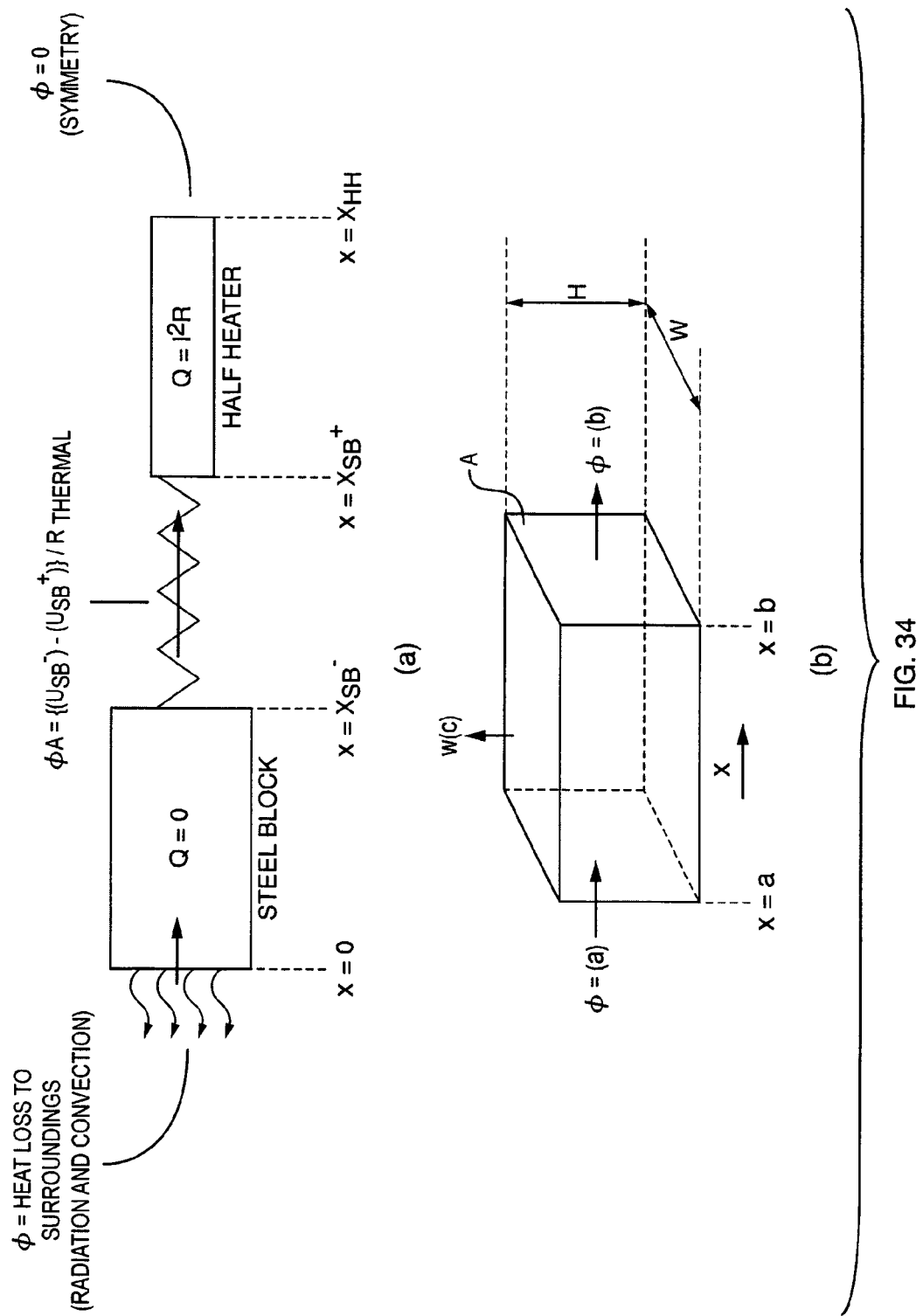
FIG. 34 shows elements of a thermal model describing a suspended heated platform for rapid thermal response.

First, conservation of energy is applied to an element having a constant cross-section, as depicted in FIG. 34(b). In integral form, $$\varrho C \frac{\partial u}{\partial t} = k \frac{\partial^2 u}{\partial x^2} + Q - \frac{P}{A} w \qquad (1)$$

From left to right, the terms represent heat storage (temperature change), diffusion (conduction), heat dissipation (the resistive heating source) and heat loss to surroundings (through convection and radiation).

Boundary conditions (equations 2 through equations 5) are applied to represent the following conditions:

heat loss at the end of the steel block by convection and radiation, $$\chi = 0 \rightarrow -\phi = h(u - u_\infty) + \sigma \epsilon (u^4 - u_\infty^4); \qquad (2)$$

thermal contact resistance at the interface, where $X_{SB}^-$ and $X_{SB}^+$ represent the contact on the side of the steel block and the heater, respectively, $$x = X_{SB}^- \rightarrow \frac{u_{SB}^- - u_{SB}^+}{R_{thermal}} = \phi A_{SB} \qquad (3)$$

$$x = X_{SB}^+ \rightarrow \frac{u_{SB}^- - u_{SB}^+}{R_{thermal}} = \phi A_{HH}; \qquad (4)$$

and symmetry about the center of the heater, i.e. no heat flux, $$\chi = X_{HH} \rightarrow \phi = 0. \qquad (5)$$

Then, the equations are made non-dimensional by appropriate scaling. Temperature u is scaled to the temperature of the surroundings.

$$\tilde{u}_i = \frac{u_i - u_\infty}{u_\infty}, (i = SB, HH) \qquad (6)$$

Position x is scaled according to the lengths of the respective domains, such that $\tilde{x}_{SB}, \tilde{x}_{HH} \in [0,1]$. This permits solving the problem using PDEPE.m, which can only solve multiple PDE's in parallel if they are on a common spatial grid. Considering this, the scaled dimensions $\tilde{x}_{SB}$, and $\tilde{x}_{HH}$ are chosen in opposing directions in real space; the contact between the steel block and the silicon heater exists at the same point in scaled space $\tilde{x}_{SB} = \tilde{x}_{HH} = 1$, which makes grid refinement around the contact more efficient. The scaled position vectors are $$\tilde{x}_i = \frac{x - x_{min}}{x_{max} - x_{min}} \Rightarrow \tilde{x}_{SB} = \frac{x}{X_{SB}}, \tilde{x}_{HH} = \frac{X_{HH} - x}{X_{HH} - X_{SB}}. \qquad (7)$$

Time is scaled by dividing by an overall time constant $$\tilde{t} = \frac{t}{\tau_o} \qquad (8)$$

which is composed of time constants for heat loss by diffusion $\tau_d$ (equation 10), convection $\tau_c$ (equation 11), and radiation $\tau_r$ (equation 12). The time constants are defined as the product of the thermal mass of domain i (where i indicates steel block or half heater) and the resistance for heat loss $R_{j,i}$ of that domain by diffusion ($R_{d,i}$), convection ($R_{c,i}$), and radiation ($R_{r,i}$), respectively.

$$\tau_{j,i} = (\varrho C V)_i R_{j,i}, (i = SB, HH) \qquad (9)$$

$$R_{d,i} = \left(\frac{L}{kA}\right)_i \Rightarrow \tau_{d,i} = \left(\varrho C V \frac{L}{kA}\right)_i \qquad (10)$$

$$R_{c,i} = \left(\frac{1}{hS}\right)_i \Rightarrow \tau_{c,i} = \left(\varrho C V \frac{1}{hS}\right)_i \qquad (11)$$

$$R_{r,i} = \left(\frac{\tilde{u}}{\sigma \epsilon u_\infty^3 S((\tilde{u}+1)^4 - 1)}\right)_i \Rightarrow \qquad (12)$$

$$\tau_{r,i} = \left(\varrho C V \frac{\tilde{u}}{\sigma \epsilon u_\infty^3 S((\tilde{u}+1)^4 - 1)}\right)_i$$

The definition of $\tau_o$ attempts to mimic the actual behavior of the system: radiation and convection from the heater, in parallel with conduction to the steel blocks and consecutive radiation and convection from there.

$$\tau_o = \tau_{c,HH} // \tau_{r,HH} // (\tau_{d,HH} + \tau_{d,SB} + (\tau_{c,SB} // \tau_{r,SB})) \qquad (13)$$

$$\tau_x // \tau_y \equiv (\tau_x^{-1} + \tau_y^{-1})^{-1} \qquad (14)$$

The physical interpretation of the time constants is especially meaningful for cooling of the silicon element. High heating rates can in principle be achieved by applying a high current, but (passive) cooling depends on heat loss. The definition of the time constants as a product of thermal mass and thermal resistance can be interpreted as the energy loss needed for a temperature decrease of one degree divided by the energy that is lost per second and per degree temperature difference by a certain mechanism: radiation, convection, or conduction. This represents the time it takes to lose the stored energy at the current temperature difference, i.e., the time it takes to cool to the temperature of the surroundings. Disregarding radiation or temperature-dependent properties, this time is truly constant, and the typical logarithmic decay results. Since radiation and temperature dependent properties are included, the time "constants" in fact depend on temperature and they only approximate the local dynamics. Calculated values of $\tau_o$ are $\tau_o<10$ s for T>425° C., and with $\tau_o<5$ s for T>770° C.

The formulation of a temperature-dependent time constant gives some insight in the dynamics of the system, but to ensure synchronization between the two domains while solving numerically, the overall time constant must be made independent of temperature by evaluating it at a certain temperature $\bar{u}$:

$$\tau_o = \tau_o|_{u_i=\bar{u}_i}. \qquad (15)$$

Power density is scaled by dividing by Q* defined as the energy density divided by the overall time constant:

$$\tilde{Q} = \frac{Q}{Q^*}, Q^* = \frac{\varrho_{HH}C_{HH}u_\infty}{\tau_0}. \qquad (16)$$

Thermal resistance is divided by R* defined as a resistance to heat transport by diffusion L/(k×A) times the ratio of $\tau_o$ to $\tau_d$:

$$\tilde{R}_i = \frac{R_{thermal}}{R_i^*}, R^* = \left(\frac{L\tau_0}{kA\tau_d}\right)_i. \qquad (17)$$

After scaling of the PDEs and boundary conditions, the following system results:

$$\frac{\partial \tilde{u}_{SB}}{\partial \tilde{t}} = \frac{\tau_o}{\tau_{d,SB}} \frac{\partial^2 \tilde{u}_{SB}}{\partial \tilde{x}_{SB}^2} - \left(\frac{\tau_o}{\tau_{o,SB}} + \frac{\tau_o}{\tau_{r,SB}}\right)\tilde{u}_{SB}, \qquad (18)$$

$$\frac{\partial \tilde{u}_{HH}}{\partial \tilde{t}} = \frac{\tau_o}{\tau_{d,HH}} \frac{\partial^2 \tilde{u}_{HH}}{\partial \tilde{x}_{HH}^2} - \left(\frac{\tau_o}{\tau_{c,HH}} + \frac{\tau_o}{\tau_{r,HH}}\right)\tilde{u}_{HH} + \tilde{Q}. \qquad (19)$$

and the following boundary conditions apply:

$$\tilde{x}_{SB} = 0 \rightarrow \frac{A_{SB}}{S_{SB}}\left(\frac{\tau_o}{\tau_{c,SB}} + \frac{\tau_o}{\tau_{r,SB}}\right)\tilde{u}_{SB} = \frac{\tau_o}{\tau_{d,SB}}\frac{\partial \tilde{u}_{SB}}{\partial \tilde{x}_{SB}} \qquad (20a)$$

$$\tilde{x}_{SB} = 1 \rightarrow \frac{1}{\tilde{R}_{SB}}(\tilde{u}_{HH} - \tilde{u}_{SB}) = \frac{\tau_o}{\tau_{d,SB}}\frac{\partial \tilde{u}_{SB}}{\partial \tilde{x}_{SB}} \qquad (20b)$$

$$\tilde{x}_{HH} = 0 \rightarrow \frac{\partial \tilde{u}_{HH}}{\partial \tilde{x}_{HH}} = 0 \qquad (20c)$$

$$\tilde{x}_{HH} = 1 \rightarrow \frac{1}{\tilde{R}_{HH}}(\tilde{u}_{HH} - \tilde{u}_{SB}) = \frac{\tau_o}{\tau_{d,HH}}\frac{\partial \tilde{u}_{HH}}{\partial \tilde{x}_{HH}} \qquad (20d)$$

Figure 35:
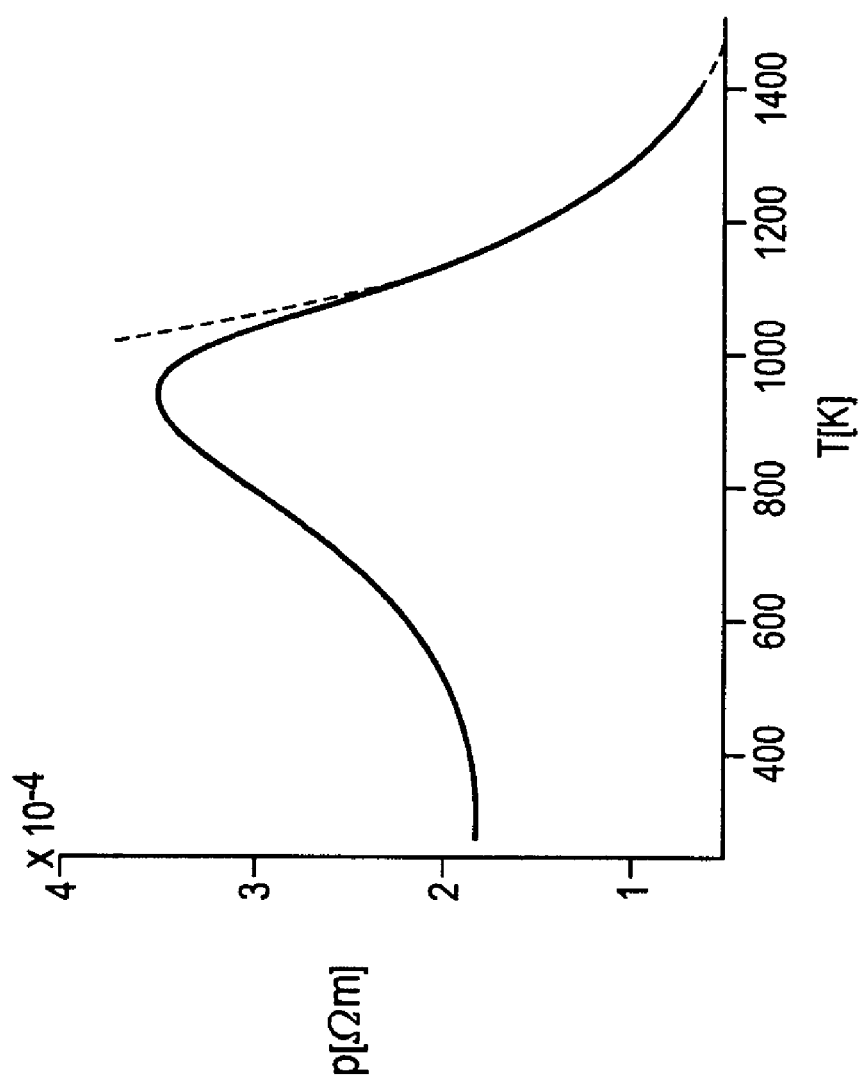
FIG. 35 shows the resistivity of silicon, doped with $N_A \approx 10^{19}$ cm$^{-3}$.

All material properties are temperature dependent, and are modeled as such, but resistivity of silicon has an especially important effect on the dynamics. Conductivity (the reciprocal of resistivity) is determined by the product of carrier concentration and carrier mobility. Two regions can be identified: at room temperature the heavily doped silicon is degenerate (extrinsic range), and carrier concentration is approximately equal to the impurity concentration. With increasing temperature, carrier mobility decreases due to scattering, resulting in an increase in resistivity. Above the intrinsic temperature, silicon is non-degenerate (intrinsic range), and a strong increase in carrier concentration through thermally activated formation of electron-hole pairs dominates a sharply decreasing resistivity. FIG. 35 shows resistivity as a function of temperature for boron-doped silicon having an impurity concentration of $N_A \approx 1019$ cm−3.

Thus when using a constant-current source, dissipated power decreases with increasing temperature, resulting in a very uniform temperature distribution, and natural feedback: the influence of local disturbances (e.g., a substrate placed on the heated platform) is compensated by this effect.

Figure 36:
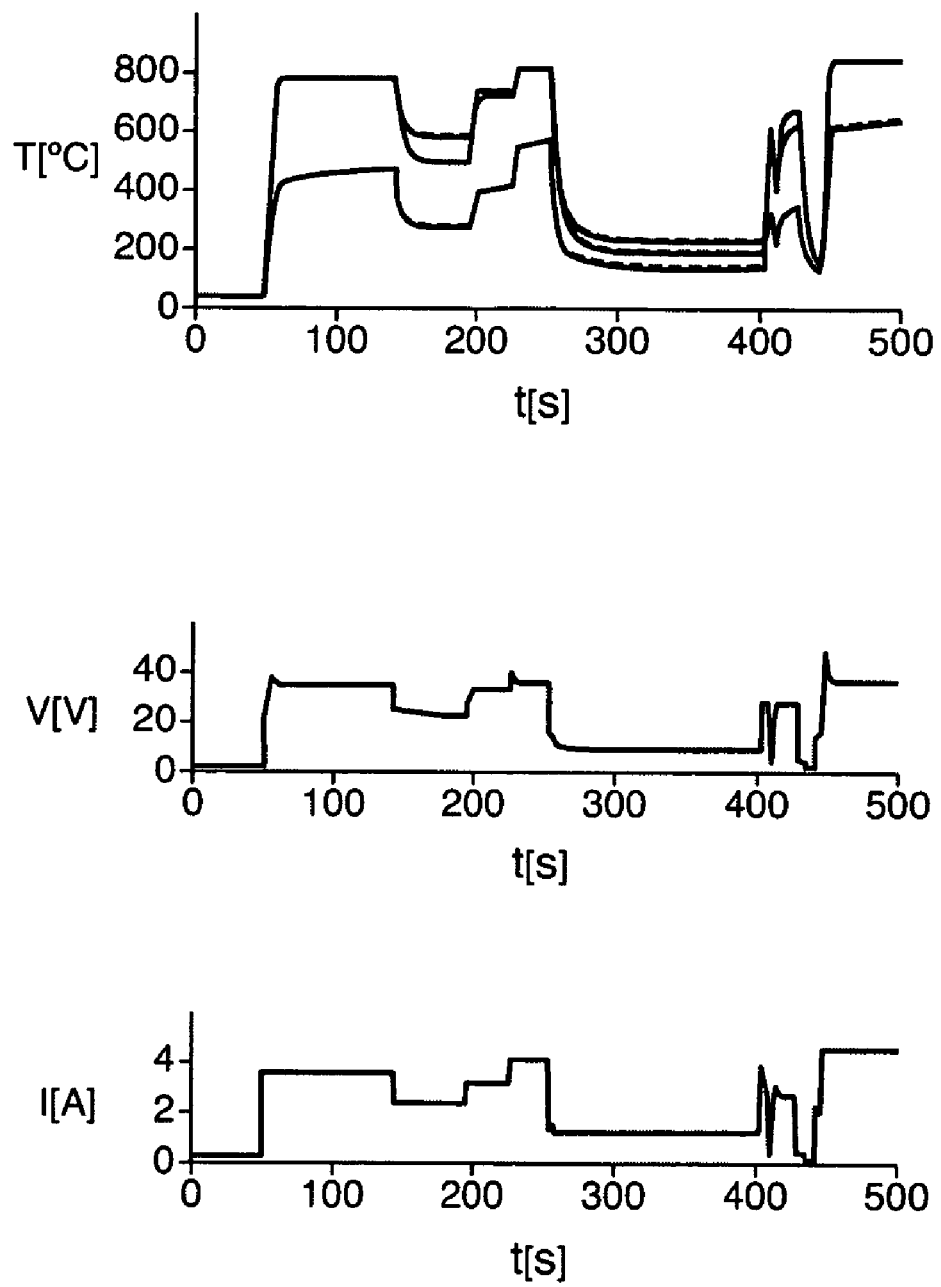
FIG. 36 shows simulated and measured thermal response of a 85×10×0.3 mm suspended element to a given input current; temperature is measured using 75 μm K-type thermocouples at the center of the heater (top graph), 17 mm from the end (middle graph), and 3\,mm from the end (bottom graph)

A dynamic input to a suspended heater (8×10×0.3 mm) shows its thermal performance, and the measured current is used as input for a simulation to verify the model. Temperature is measured with 75 μm K-type thermocouples attached to the heater at its center, at 17 mm from the contact block, and at 3 mm from the contact block using ceramic adhesive (Ceramabond 865, Aremco). Measured and simulated temperatures and voltage drop are shown in FIG. 36. With a geometrically simple model (1D), considering resistivity and other material properties' dependency on temperature, a very good match between simulation and measurement is achieved. The maximum errors are 5% in temperature and ≈2% in voltage.

A heating rate of dT/dt>100° C. is measured, and cooling from T>800° C. to T<600° C. (our reaction is stopped below 600° C.) takes ≈5 s. Thus, thermal cycling between a typical reaction temperature for CNT growth and temperature where the reaction is fully stopped is possible within a period of 7 s, without active cooling.

Figure 37:
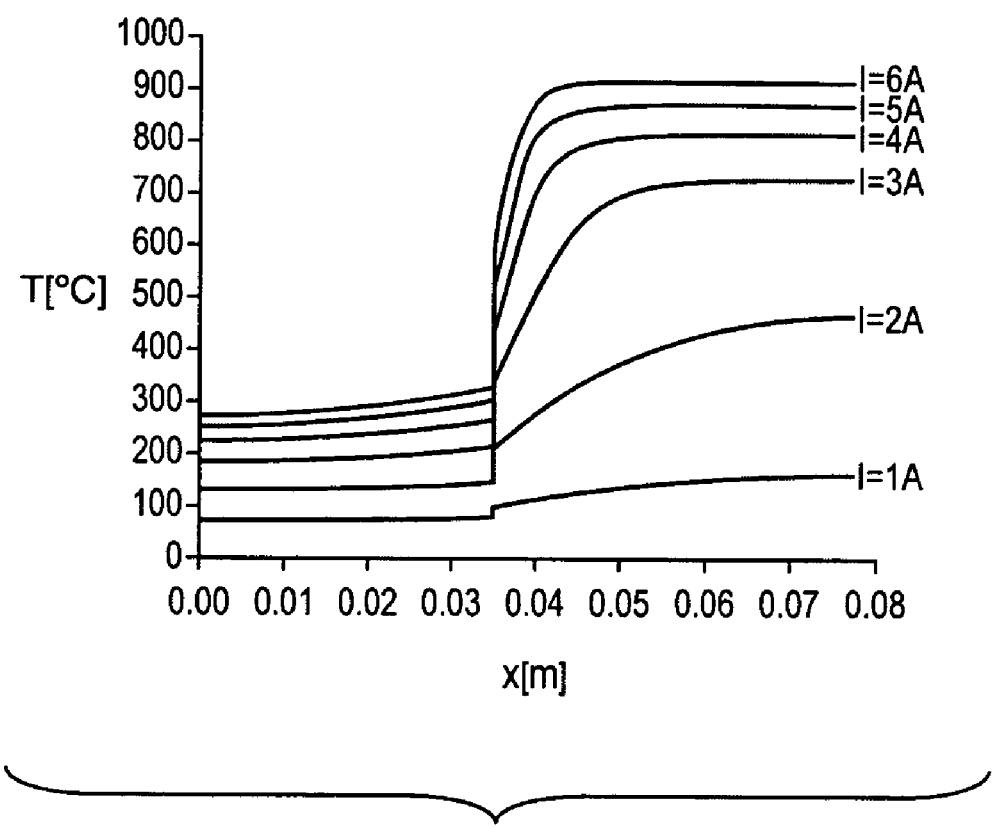
FIG. 37 shows simulated steady-state temperature profiles for given input current values; a uniform temperature extends over an increasingly large area of the heater with increasing current.

A stepwise increase of the input current from 0 to 8 A is also simulated, showing increasingly flat temperature profiles (FIG. 37). Further, the electrodes remain below 40° C., verifying their self-cooling performance.

It is concluded that the heater, as predicted by simulation and verified by measurement, in the described dimensions is capable of rapid heating with dT/dt>100° C.; cooling from T>800° C. to T<600° C. within ≈5 s; thermal cycling between a typical reaction temperature for CNT growth and temperature where the reaction is fully stopped is possible within a period of 7 s, without active cooling.

Figure 38:
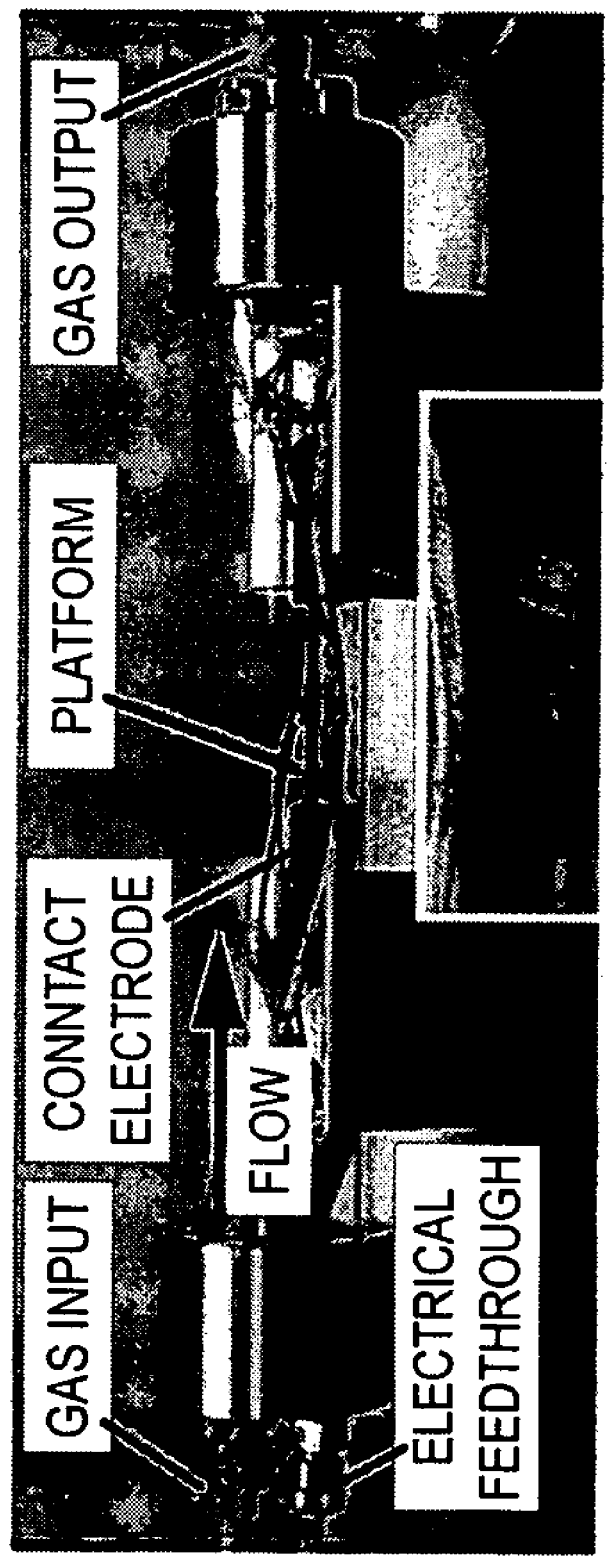
FIG. 38 shows a prototype "platform-in-tube" reactor apparatus, where a suspended heated platform is mounted on stainless steel contact electrodes and sealed inside a horizontal quartz tube, where the inset shows oblique view of the platform at 825° C., with VA-CNT microstructures growing from lithographically-patterned catalyst film.

A suspended platform clamped between steel blocks is placed inside a quartz tube (48 mm ID, 52\,mm OD, 300\,mm length, Finkenbeiner Glass) to provide a controllable gas atmosphere for experiments with surface-bound reactions, such as CVD growth of CNTs. The tube is simply placed on aluminum stands, rendering the heated platform and the growth substrate available for full-field optical observation (FIG. 38).

Figure 39:
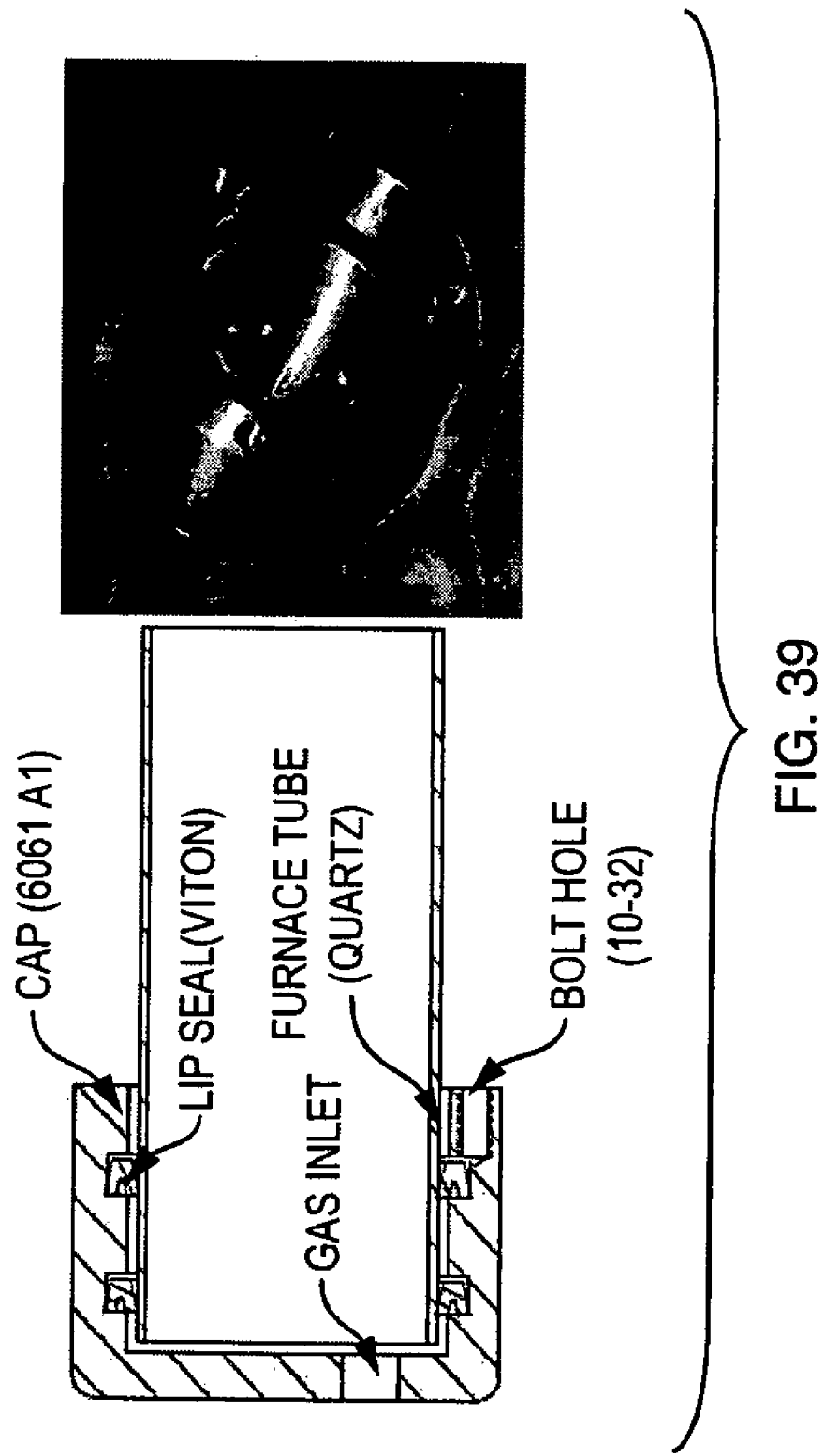
FIG. 39 shows the endcap used with the prototype "platform-in-tube" reactor apparatus.

The quartz tube is sealed with end-caps, which feature Viton lip seals (Chicago Rawhide) recessed in grooves in a turned aluminium piece (standard 6061 alloy), as shown in FIG. 39. Commonly used end-caps with face seals can be cumbersome to align; the new design easily slides over the end of the tube and self-aligns using the principle of self-help. The seals are spaced to impart sufficient pitch stiffness when the seals soften upon heating, yet the radial compliance of the seals results in a low-stress connection. The initial fit preloads the seals and increased pressure further engages the seals. The end-caps seal against overpressure up to ≈30 kPa, but slide off if pressure is increased further, thus protecting against possibly dangerous over-pressure in case of an accidental ignition of the reaction gases or a clogged gas exit line. The hoop stress $\sigma_h$ in the quartz tube wall remains far below the modulus of rupture of fused quartz ($\sigma_h$<<60 MPa).

For CNT growth, gases are supplied to the quartz tube via manual needle-valve rotameters (Gilmont, Matheson Tri-Gas). One rotameter is used for each line of $CH_4$ (99.995\%, BOC), CCH$_4$(99.5\%, Airgas), H$_2$(99.999\%, Airgas), and Ar (99.999\%, Airgas). The output lines of the rotameters join at a manifold, and the gas mixture is fed to the quartz tube through a 4-bore ceramic~pipe (6.35 mm OD, 1.8 mm bore ID, 99.8\% purity Al$_2$O$_3$, Omega). The delivery pipe is held in a Cajon-type (Swagelok Ultra-Torr) fitting in one of the end caps.

The exhaust gas passes through a bubbler that provides a constant back-pressure to stabilize the flow inside the tube. Therefore, the pressure in the apparatus is ≈0.1 psi above atmospheric, as established by the oil level in the bubbler.

In this configuration, the reaction gases are first heated upon contact with the heated platform. In an alternative setup, gases are pre-heated while passing through the delivery pipe. For this purpose, a resistance wire of ≈10Ω is wrapped around the pipe over a distance of 75 mm and 30V is applied to heat the wire.

We demonstrate growth of both tangled films of SWNTs (process 1) and vertically-aligned films of MWNTs (process 2) on the heated platform, using CVD reactions which we previously developed using a conventional tube furnace. To start, a piece of silicon wafer (≈10 mm×10 mm×600 µm thickness) coated with a catalyst film deposited by electron beam evaporation (3.0/1.5/20 nm Mo/Fe/Al$_2$O$_3$ for SWNT growth, and 1/10 nm Fe/Al$_2$O$_3$ for MWNT growth) is rested at the center of the heated platform. The platform assembly is placed inside the quartz tube, and the end caps are mounted to seal the atmosphere. Next, the tube is flushed with 600 sccm Ar for 10 minutes, and then the platform is heated by stepping the power supply to a pre-set value. After 2 minutes, the flow into the tube is adjusted to H$_2$/Ar (2 minutes at 200/200 sccm H2/Ar for process 1; 5 minutes at 400/140 sccm H$_2$ for process 2). Then, the flow is adjusted to include the carbon source (800/200 sccm CH$_4$/H$_2$ for process 1; 115/140/400 sccm C$_2$H$_4$/H$_2$/Ar process 2) and maintained for a typical growth period of 15 minutes, during which the supply current is held constant.

Figure 40:
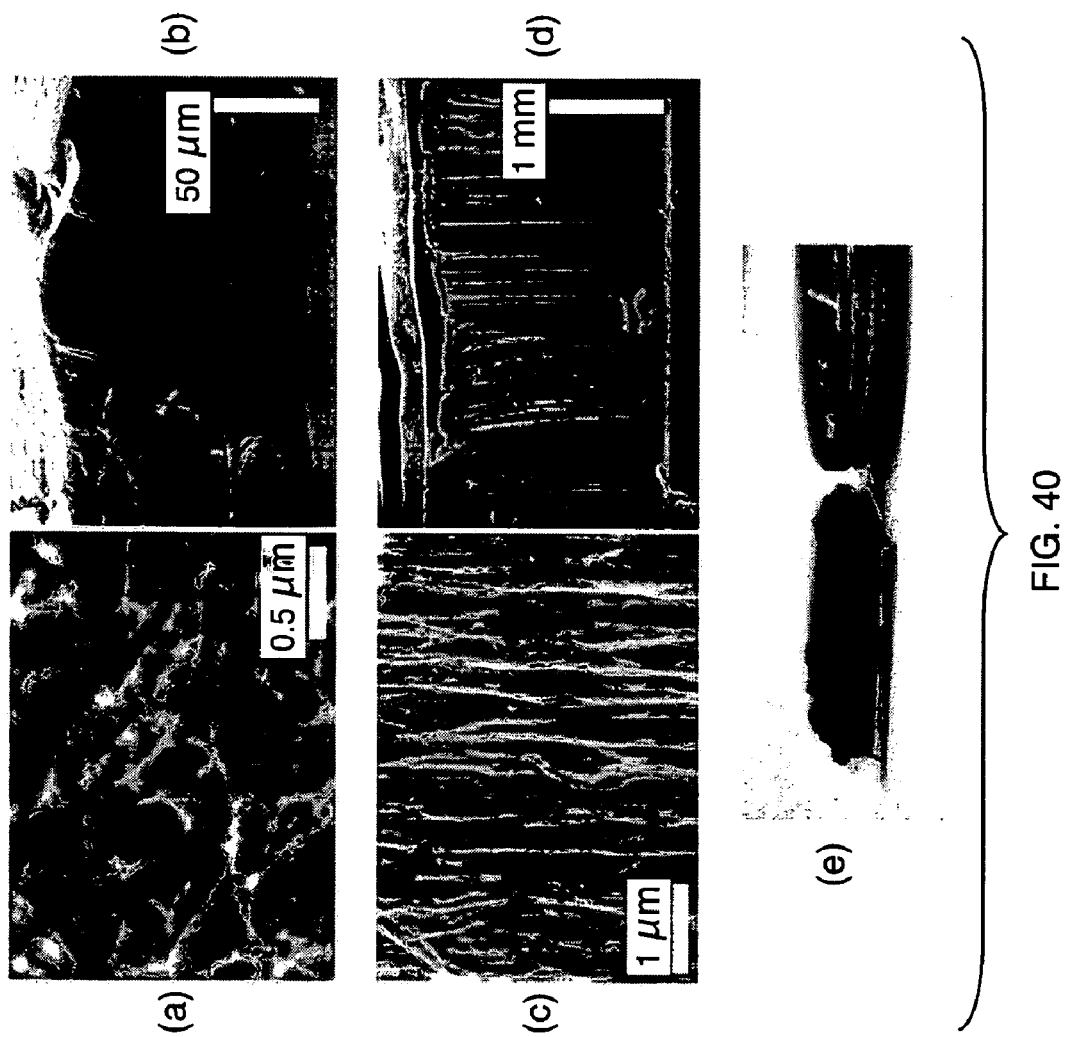
FIG. 40 shows SEM and optical images of CNT films grown using the prototype "platform-in-tube" reactor apparatus.

Using the heated platform, process 1 yields a dense film of tangled CNTs, as shown in FIG. 40*a*. Using Raman spectroscopy and transmission electron microscopy (results not shown), these are confirmed to be primarily SWNTs. Alternatively, process 2 yields a film of vertically-aligned CNTs (FIG. 40*b*), which are shown to be MWNTs (≈10 nm OD) by TEM examination. In process 1, the SWNTs begin growing at a relatively low areal density on the substrate, and quickly become entangled due to surface interactions among the CNTs and the substrate. This hindrance limits the film thickness to ≈1 µm. In process 2, the CNTs grow at a higher areal density and self-orient perpendicular to the substrate surface due to initial crowding. This vertically-aligned (FIG. 40*c*) conformation enables the CNT film to grow to mm-scale thickness.

However, the VA-MWNT film grown using process 2 with the heated platform is only 0.1 mm thick, compared to ≈1 mm thickness which is routinely obtained by growth in the conventional tube furnace. This implies that thermal decomposition of the reactant mixture significantly affects its chemical activity for CNT growth. When the gas flows through a heated tube before reaching the substrate, gas-phase reactions form additional species (e.g., C$_2$H$_4$ homogeneously reforms into C$_2$H$_2$, CH$_4$, C$_2$H$_6$, C$_3$H$_6$, C$_3$H$_8$, C$_4$H$_4$, C$_4$H$_6$, and H$_2$) which contribute significantly to the growth reaction. Alternatively, when only the growth substrate is heated there is less time for thermal decomposition of the reactants prior to reaching the catalyst.

To qualitatively study this effect, we next replicated process 2 while first flowing the reactant through the heated delivery pipe. In this case, the film grows to ≈2.0 mm minutes (FIG. 40*d*), roughly doubling the growth rate obtained in the tube furnace. We attribute this increase to thermal decomposition of the reactant when it is rapidly heated to ≈1000° C., which exceeds the temperature of 750° C. reached in the tube furnace and is also above the self-pyrolysis temperature of C$_2$H$_4$. However, the brief residence time in the heated pipe prevents excessive sooting. Further, the gas cools as it exits the heated pipe before it reaches the heated platform, suggesting that the thermal pre-treatment step creates more reactive species rather than unstable radicals.

Figure 41:
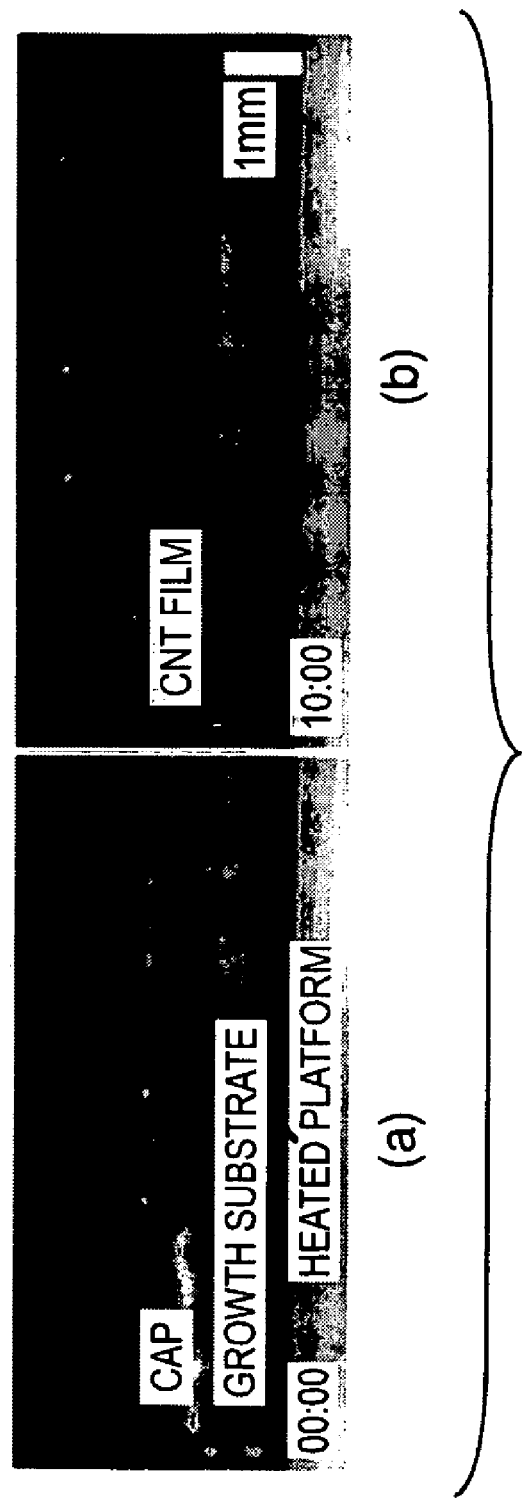
FIG. 41 shows in situ optical imaging of VA-CNT film growth on the suspended heated platform, with platform at 825° C.

As a first example of optical reaction diagnosis using the heated platform apparatus, we imaged VA-CNT film growth by focusing a digital still camera (Nikon) on the platform mounted inside the quartz tube. We can monitor the thickness of the film versus time by mounting the camera in a side-view configuration (FIGS. 41*a* and 41*b*).

It can be concluded that using a simple first-generation apparatus growth of CNT films using CVD of hydrocarbon gases on silicon substrates coated with transition metal catalyst films can be studied. We have replicated processes for growth of tangled SWNT and aligned MWNT films which we previously developed using traditional externally-heated tube furnaces. This investigation has led to a qualitative understanding of the importance of thermal decomposition on the activity of gaseous reactants for CNT growth. The localization of heating at the suspended platform is enabling further study by independent thermal pre-treatment of the reaction gases, coupled with real-time optical characterization of the film growth kinetics. Going forward, the suspended platform apparatus could be used to study a wide variety of surface reactions including growth of semiconducting nanowires and catalytic reforming of gas streams. It can also serve as a simple benchtop apparatus for thermal control of microreactors, and for rapid thermal processing of thin films and semiconductor and micromechanical devices.

Figure 42:
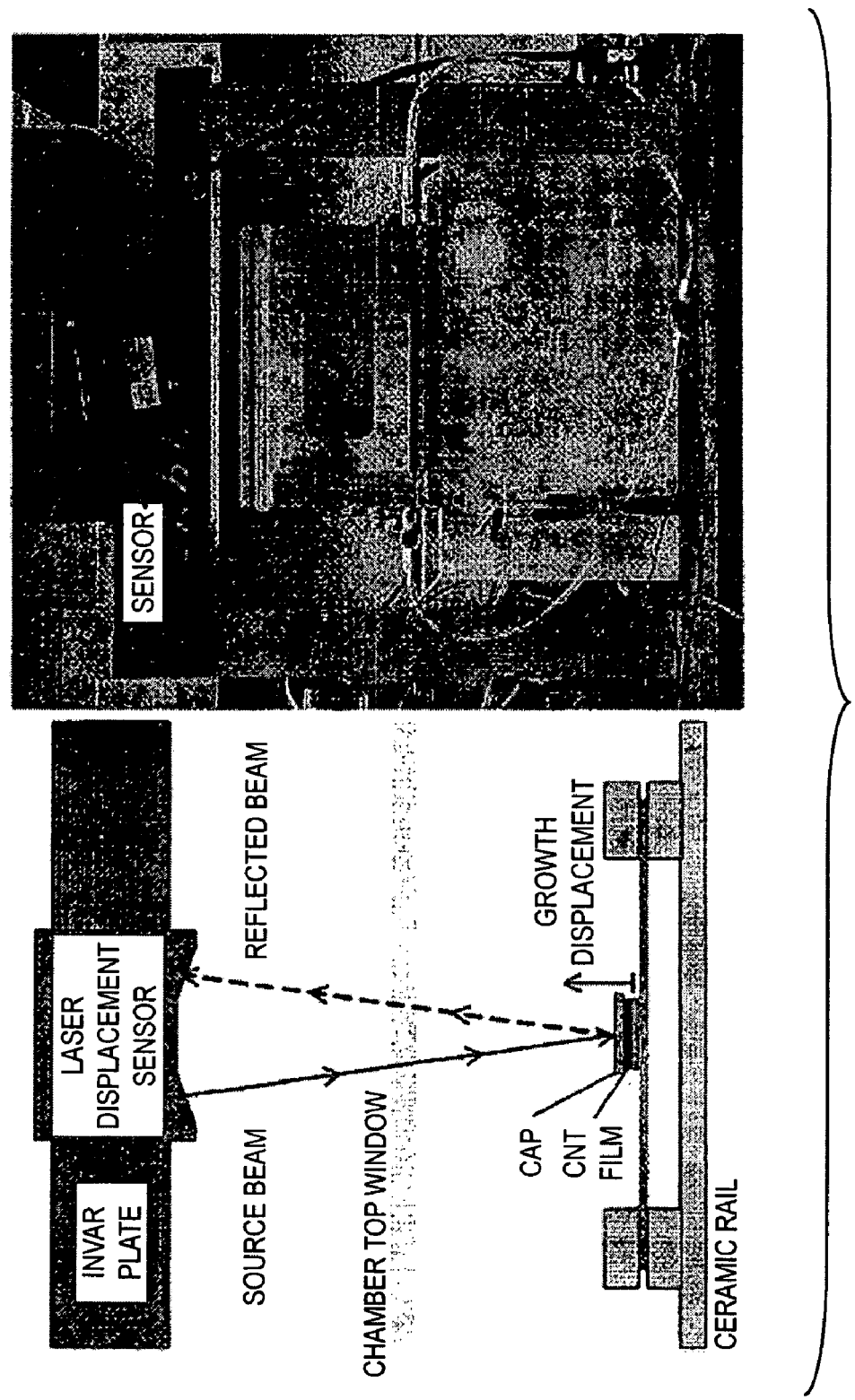
FIG. 42 shows an apparatus for real-time measurement of growth kinetics of a film of nanostructures, using a laser displacement sensor.
Figure 43:
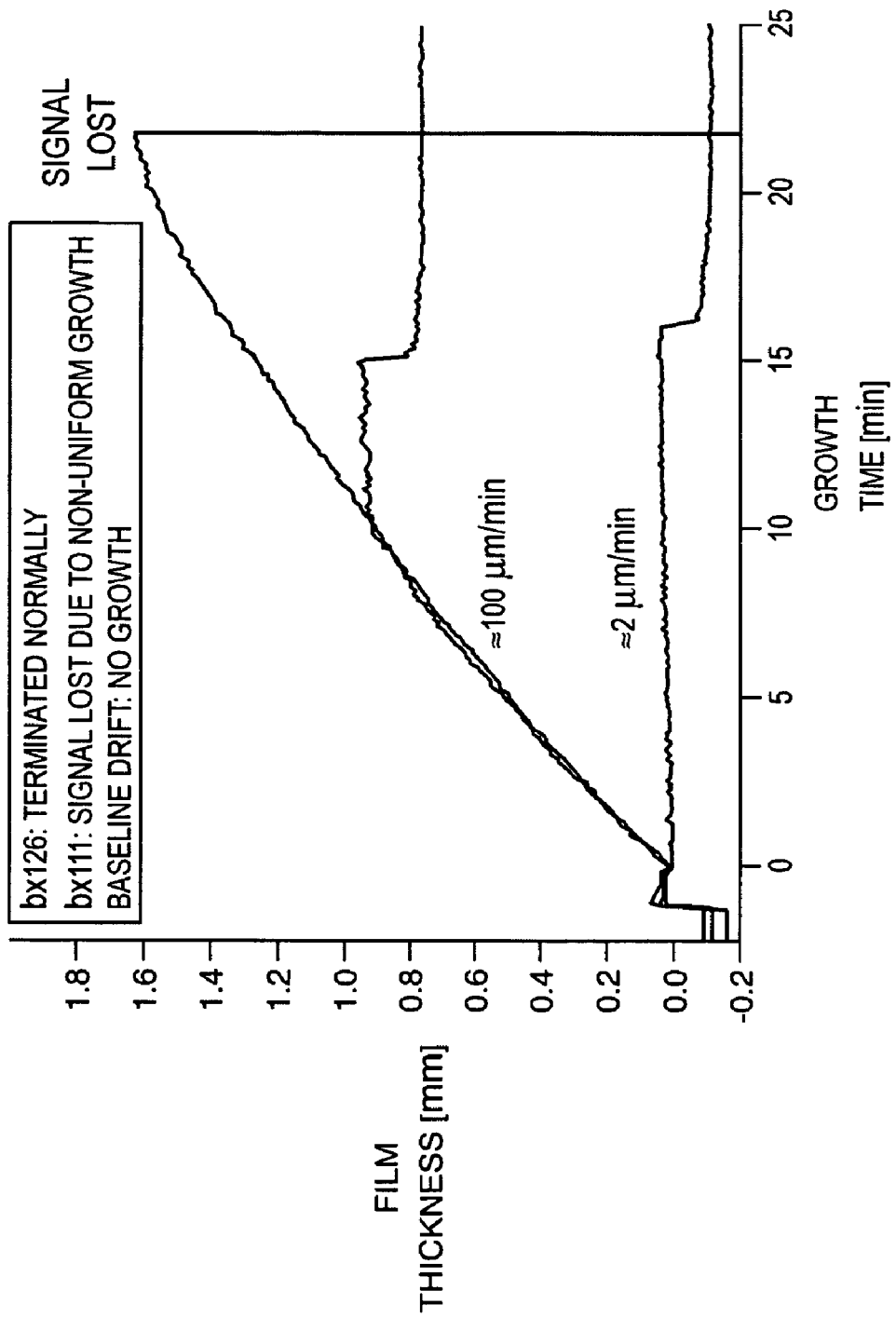
FIG. 43 shows representative measurements of the growth kinetics of a carbon nanotube film, compared to the background signal from thermal drift of the signal and resistively-heated substrate.

Optical access to the growth substrate by resistive heating in accordance with the present invention enables direct measurement of the film thickness by reflecting a laser beam from the top surface of the film. For example, a laser-based displacement sensor (Keyence LK-G152) is mounted on an arch which is built around the reactor apparatus as shown in FIG. 42. In this configuration, the measurement of the sensor is the displacement of the top surface of the cap substrate corresponds to the CNT film thickness, plus thermal expansion of the platform, contact electrodes, and surrounding hardware. Representative displacement curves in FIG. 43 demonstrate that these effects can be straightforwardly decoupled to give an accurate measurement of the film thickness versus time. A baseline experiment conducted with a bare silicon substrate instead of a catalyst-coated substrate indicates that the displacement measurement drifts upward at <2 µm/min, while typical growth experiments give an upward displacement of ≈100 µm/min under typical reaction conditions. This growth rate can be adjusted to both much slower and much faster rates by appropriately controlling the chemistry of the reaction and the substrate temperature.

Figure 44:
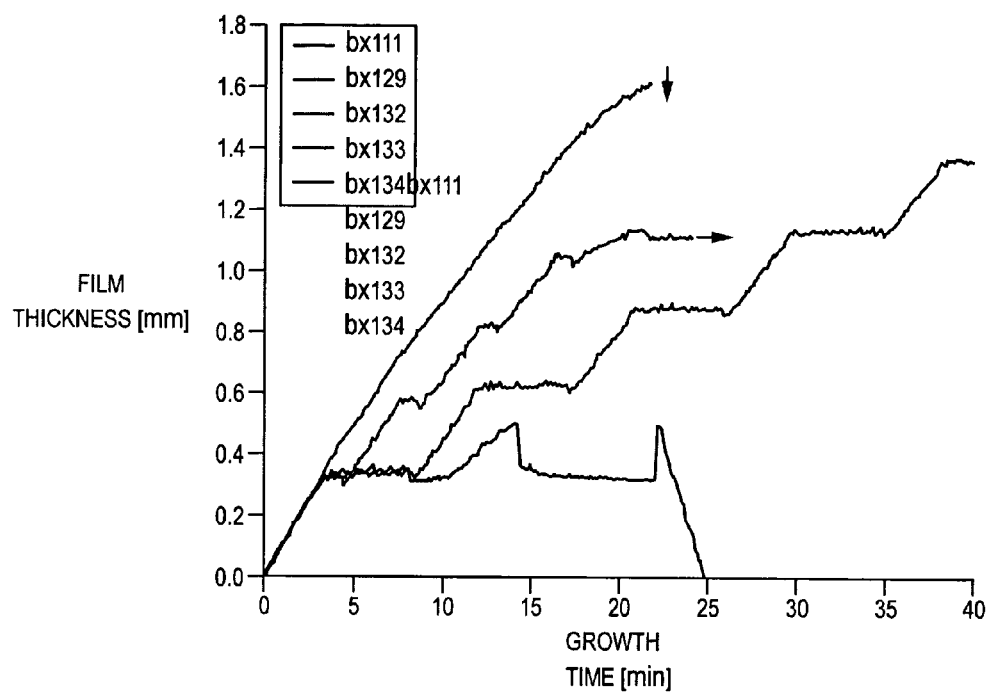
FIG. 44 shows the thickness of carbon nanotube film growth versus time, measured in real-time using a laser displacement sensor, when the composition of the reactant mixture is oscillated.
Figure 44:
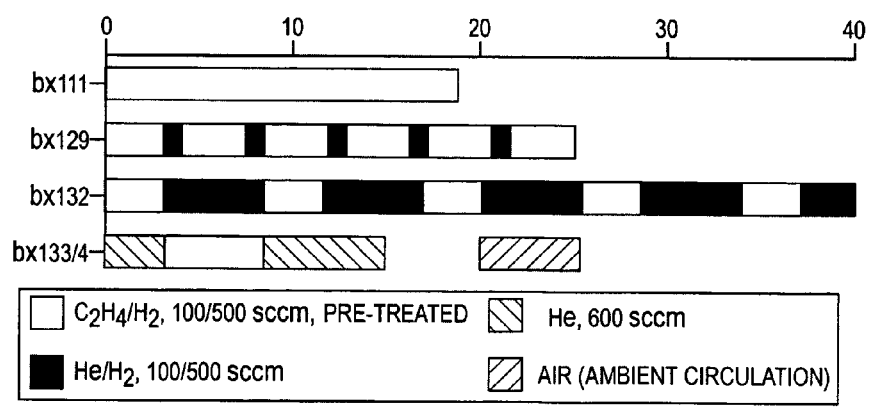
Figure 45:
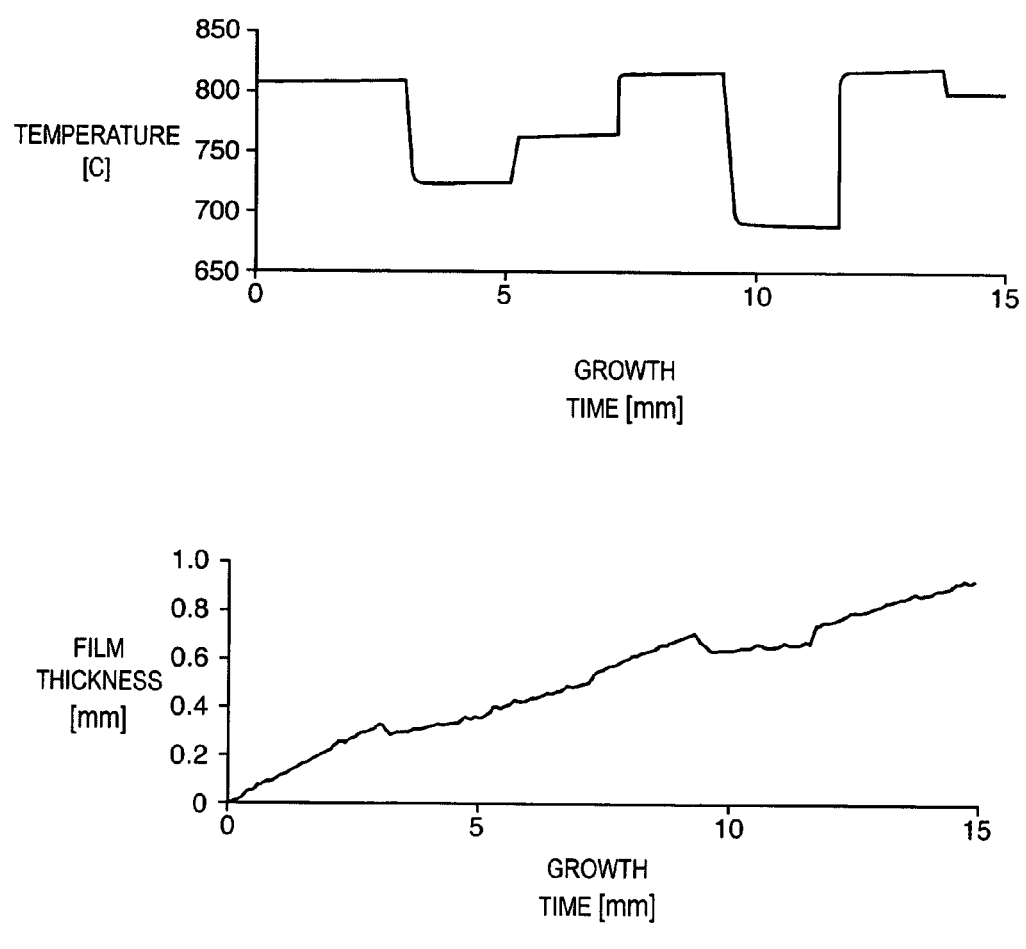
FIG. 45 shows the thickness of carbon nanotube film growth versus time, measured in real-time using a laser displacement sensor, when the reaction temperature is varied by changing the current which causes resistive heating of the growth substrate.
Figure 46A:
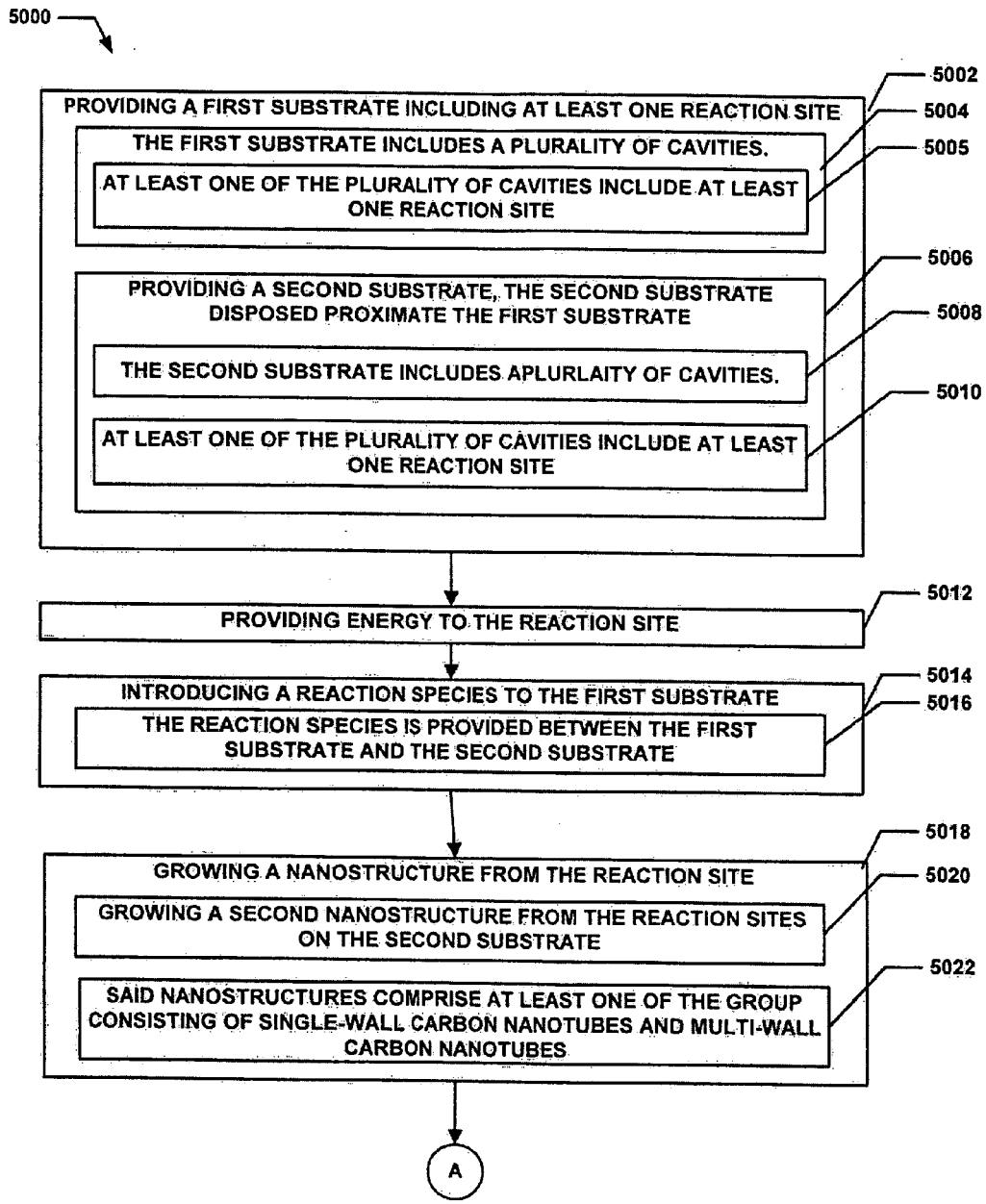
FIGS. 46A-46C depict a flow diagram of a particular method of providing controlled growth and assembly of nanostructures in accordance with the present invention.
Figure 46B:
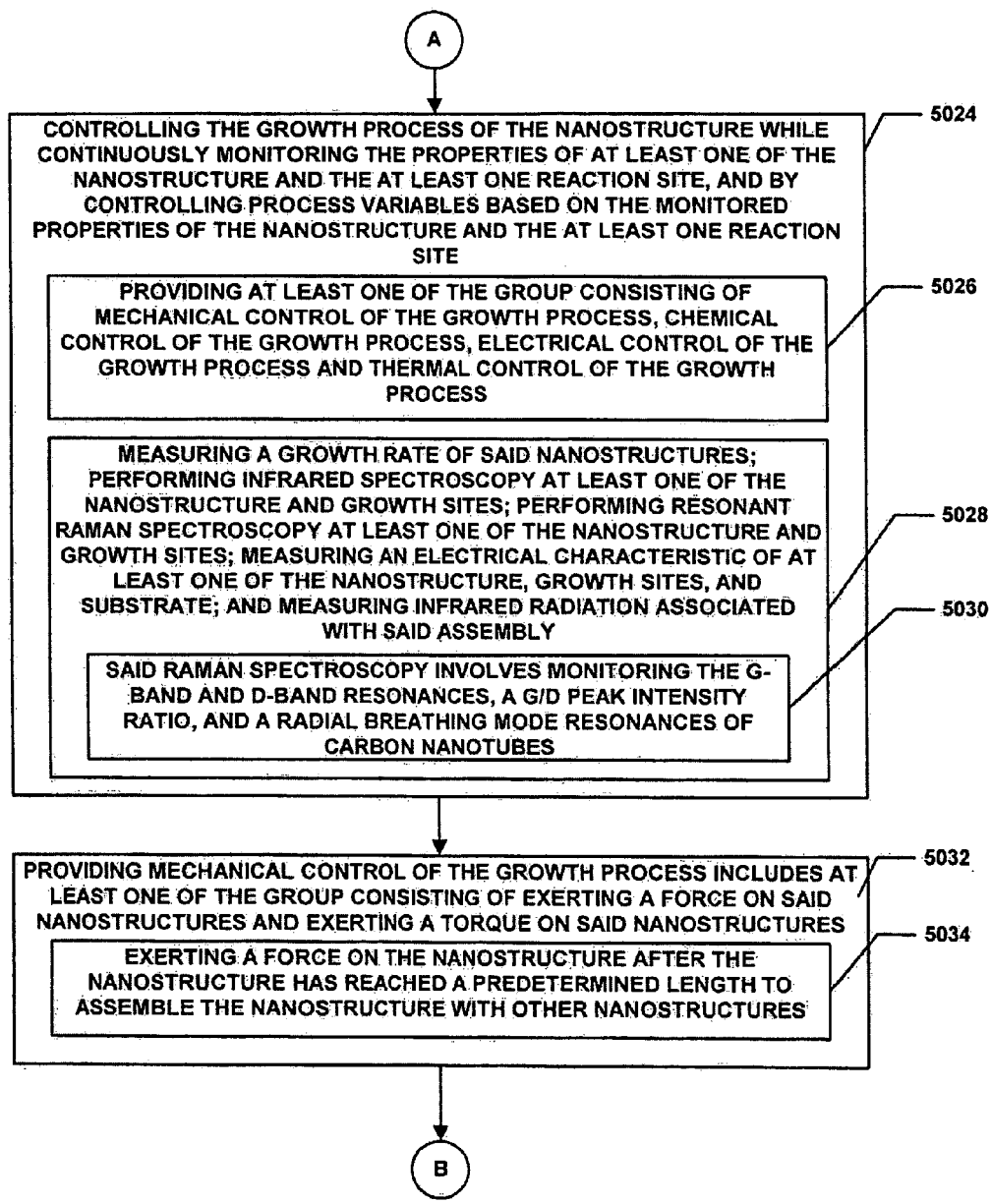
Figure 46C:
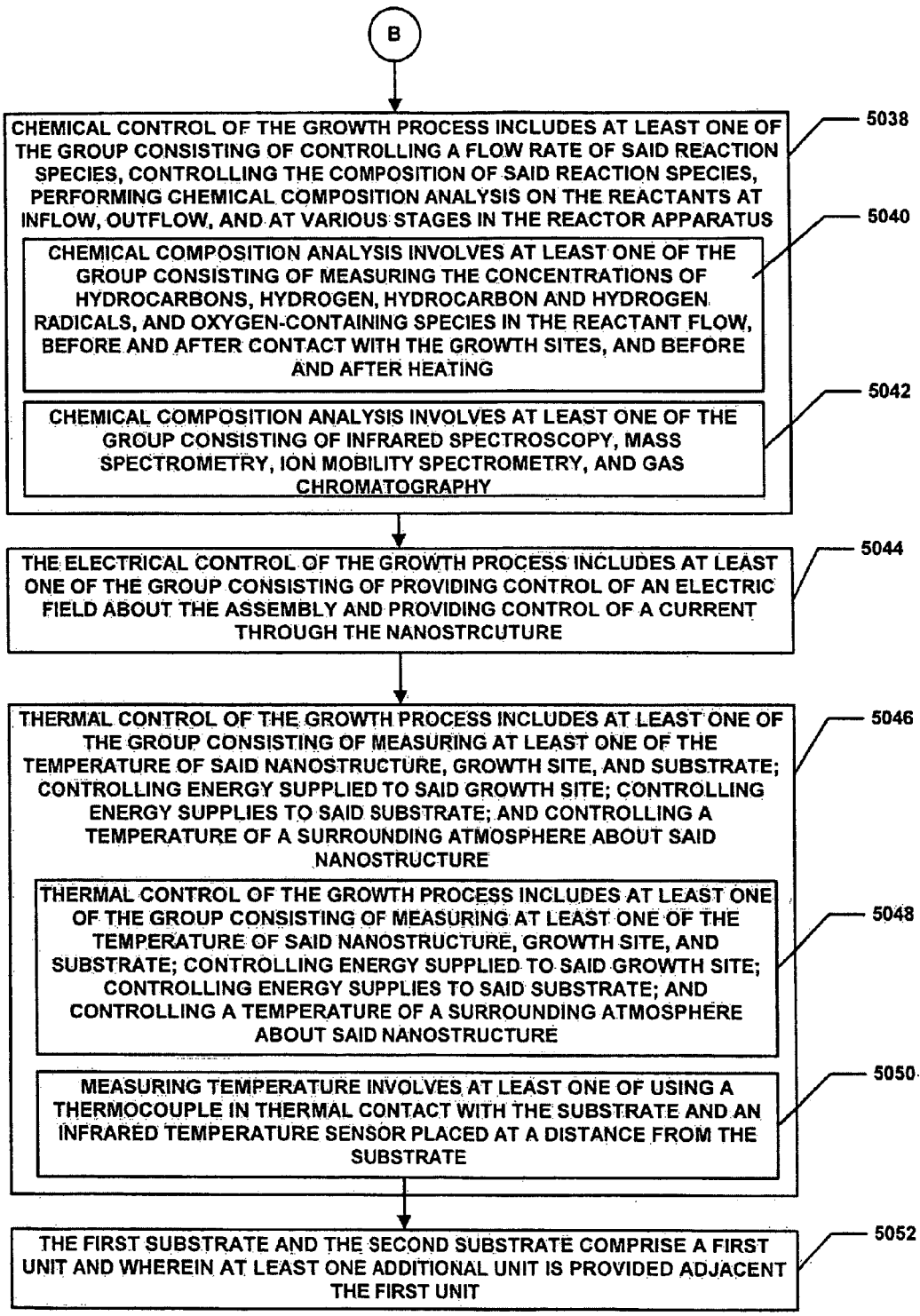

Chemically controlling the growth process by alternating flows of C$_2$H$_4$/H$_2$ with He/H$_2$ demonstrates that the growth reaction (as monitored by the film thickness and therefore the nanotube length) can be paused and re-started, as shown in FIG. 44. Thermally controlling the growth process by adjusting the substrate temperature (i.e., by varying the current setpoint of the resistive heating circuit) while measuring the nanotube length further demonstrates that the growth rate can be monitored and controlled in real-time, as shown in FIG. 45.

A flow chart of the presently disclosed method is depicted in FIGS. 34A-34C. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

In a particular embodiment, a method 5000 of providing controlled growth and assembly of nanostructures begins with processing block 5002 which discloses providing a first substrate including at least one reaction site. As further shown in processing block 5004 the first substrate includes a plurality of cavities. Processing block 5005 states at least one of the plurality of cavities include at least one reaction site. Additionally, as shown in processing block 5006 the providing a first substrate including at least one reaction site further comprises providing a second substrate, the second substrate disposed proximate the first substrate. Processing block 5008 recites the second substrate includes a plurality of cavities, and further (shown in processing block 5010) at least one of the plurality of cavities include at least one reaction site.

Processing continues with processing block 5012 which discloses providing energy to the reaction site. This is followed by processing block 5014 which states introducing a reaction species to the first substrate. As shown in processing block 5016, the reaction species is provided between the first substrate and the second substrate.

Processing block 5018 recites growing a nanostructure from the reaction site. This may further include, as recited in processing block 5020 growing a second nanostructure from the reaction sites on the second substrate. Processing block 5022 states the nanostructures comprise single wall carbon nanotubes and/or multiwalled carbon nanotubes.

Processing block 5024 discloses controlling the growth process of the nanostructure while continuously monitoring the properties of at least one of the nanostructure and the at least one reaction site, and by controlling process variables based on the monitored properties of the nanostructure and the at least one reaction site. As shown in processing block 5026, the controlling the growth process comprises providing at least one of the group consisting of mechanical control of the growth process, chemical control of the growth process, electrical control of the growth process and thermal control of the growth process. As further shown in processing block 5028 the monitoring the properties includes measuring a growth rate of said nanostructures; performing infrared spectroscopy at least one of the nanostructure and growth sites; performing resonant Raman spectroscopy at least one of the nanostructure and growth sites; measuring an electrical characteristic of at least one of the nanostructure, growth sites, and substrate; and measuring infrared radiation associated with said assembly. Processing block 5030 discloses Raman spectroscopy involves monitoring the G-band and D-band resonances, a G/D peak intensity ratio, and a radial breathing mode resonances of carbon nanotubes.

Processing block 5032 states the providing mechanical control of the growth process includes at least one of the group consisting of exerting a force on the nanostructure, and exerting a torque on the nanostructures. Further, as shown in processing block 5034, mechanical control can also include exerting a force on the nanostructure after the nanostructure has reached a predetermined length to assemble the nanostructure with other nanostructures.

Processing block 5038 states the chemical control of the growth process includes at least one of the group consisting of controlling of a flow rate of the reaction species, controlling of composition of the reaction species, performing chemical composition analysis on the reactants at inflow, outflow, and at various stages in the reactor apparatus. Processing block 5040 states chemical composition analysis involves at least one of the group consisting of measuring the concentrations of hydrocarbons, hydrogen, hydrocarbon and hydrogen radicals, and oxygen-containing species in the reactant flow, before and after contact with the growth sites, and before and after heating. Processing block 5042 recites chemical composition analysis involves at least one of the group consisting of infrared spectroscopy, mass spectrometry, ion mobility spectrometry, and gas chromatography.

Processing block 5044 recites the electrical control of the growth process includes at least one of the group consisting of providing control of an electric field about the assembly and providing control of a current through the nanostructure.

Processing block 5046 discloses thermal control of the growth process includes at least one of the group consisting of measuring at least one of the temperature of said nanostructure, growth site, and substrate; controlling energy supplied to said growth site; controlling energy supplies to said substrate; and controlling a temperature of a surrounding atmosphere about said nanostructure. Processing block 5048 discloses thermal control of the growth process includes at least one of the group consisting of measuring at least one of the temperature of said nanostructure, growth site, and substrate; controlling energy supplied to said growth site; controlling energy supplies to said substrate; and controlling a temperature of a surrounding atmosphere about said nanostructure. Processing block 5050 recites measuring temperature involves at least one of using a thermocouple in thermal contact with the substrate and an infrared temperature sensor placed at a distance from the substrate.

Processing block 5062 shows wherein the first substrate and the second substrate comprise a first unit and wherein at least one additional unit is provided adjacent the first unit.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of providing controlled growth and assembly of nanostructures comprising:
   providing a first substrate including at least one reaction site;
   providing energy to said reaction site;
   introducing a reaction species to said first substrate;
   growing a nanostructure from said reaction site; and
   controlling the growth process of the nanostructure, wherein said controlling the growth process comprises providing mechanical control of the growth process, wherein said mechanical control comprises providing an extrusive force during growth which pushes said nanostructures away from said reaction site, while continuously monitoring the properties of at least one of the nanostructure and the at least one reaction site wherein said properties being monitored include at least one of the group consisting of a quality of at least one of said nanostructures and a length of at least one of said nanostructures, and by controlling process variables based on the monitored properties of the nanostructure and the at least one reaction site wherein said process variables controlled include at least one of the group consisting of temperature of the reaction process, infra-red radiation produced by said reaction process, resistance of said nanostructures, capacitance of said nanostructures, and gas composition analysis of effluent gases produced by said reaction process.

2. The method of claim 1 wherein said nanostructures comprise at least one of the group consisting of single-wall carbon nanotubes and multi-wall carbon nanotubes.

3. The method of claim 1 wherein said monitoring the properties of the nanostructure and growth sites includes at least one of the group consisting of measuring a growth rate of said nanostructures; performing infrared spectroscopy at least one of the nanostructure and growth sites; performing resonant Raman spectroscopy at least one of the nanostructure and growth sites; measuring an electrical characteristic of at least one of the nanostructure, growth sites, and substrate; and measuring infrared radiation associated with said assembly.

4. The method of claim 3 wherein said Raman spectroscopy involves monitoring the G-band and D-band resonances, a G/D peak intensity ratio, and a radial breathing mode resonances of carbon nanotubes.

5. The method of claim 1 wherein said providing a first substrate including at least one reaction site further comprises providing a second substrate, said second substrate disposed proximate said first substrate.

6. The method of claim 5 wherein said second substrate has reaction sites and said growing further comprises growing a second nanostructure from said reaction sites on said second substrate.

7. The method of claim 5 wherein said second substrate includes a plurality of cavities.

8. The method of claim 1 wherein said first substrate includes a plurality of cavities.

9. The method of claim 8 wherein at least one of said plurality of cavities include at least one reaction site.

10. The method of claim 7 wherein said at least one of said plurality of cavities include at least one reaction site.

11. The method of claim 5 wherein said reaction species is provided between said first substrate and said second substrate.

12. The method of claim 5 wherein said first substrate and said second substrate comprise a first unit and wherein at least one additional unit is provided adjacent said first unit.

13. The method of claim 1 wherein said mechanical control further comprises at least one of the group consisting of exerting a force on said nanostructures, exerting a force on said nanostructures after said nanostructures have reached a predetermined length to assemble said nanostructures with other nanostructures, and mechanically confining growth of a group of said nanostructures.

* * * * *